INVENTORS
R. I. ROTH
A. H. DICKINSON
J. N. WHEELER
BY W. M. Wilson
ATTORNEY

INVENTORS
R. I. ROTH
A. H. DICKINSON
J. N. WHEELER
BY W. M. Wilson
ATTORNEY

RECORDING GAUGE SYSTEM

Filed March 31, 1945 20 Sheets-Sheet 3

INVENTORS
R. I. ROTH
A. H. DICKINSON
J. N. WHEELER

BY [signature]
ATTORNEY

May 2, 1950 R. I. ROTH ET AL 2,506,470

RECORDING GAUGE SYSTEM

Filed March 31, 1945 20 Sheets-Sheet 4

INVENTORS
R. I. ROTH
A. H. DICKINSON
J. N. WHEELER
BY
ATTORNEY

INVENTORS
R. I. ROTH
A. H. DICKINSON
J. N. WHEELER
BY [signature]
ATTORNEY

INVENTORS
R. I. ROTH
A. H. DICKINSON
J. N. WHEELER
BY
ATTORNEY

INVENTORS
R. I. ROTH
A. H. DICKINSON
J. N. WHEELER

BY

ATTORNEY

May 2, 1950 R. I. ROTH ET AL 2,506,470

RECORDING GAUGE SYSTEM

Filed March 31, 1945 20 Sheets-Sheet 8

INVENTORS
R. I. ROTH
A. H. DICKINSON
J. N. WHEELER

BY [signature]

ATTORNEY

INVENTORS
R. I. ROTH
A. H. DICKINSON
J. N. WHEELER
BY W. M. Wilson
ATTORNEY.

May 2, 1950 R. I. ROTH ET AL 2,506,470

RECORDING GAUGE SYSTEM

Filed March 31, 1945 20 Sheets-Sheet 10

INVENTORS
R. I. ROTH
A. H. DICKINSON
J. N. WHEELER
W. M. Wilson
ATTORNEY.

INVENTORS
R. I. ROTH
A. H. DICKINSON
J. N. WHEELER
BY
ATTORNEY.

INVENTORS
R. I. ROTH
A. H. DICKINSON
J. N. WHEELER
BY
W. M. Wilson
ATTORNEY

RECORDING GAUGE SYSTEM

Filed March 31, 1945

INVENTORS
R. I. ROTH
A. H. DICKINSON
J. N. WHEELER
BY
ATTORNEY

INVENTORS
R. I. ROTH
A. H. DICKINSON
J. N. WHEELER
BY
[signature]
ATTORNEY

May 2, 1950 R. I. ROTH ET AL 2,506,470

RECORDING GAUGE SYSTEM

Filed March 31, 1945 20 Sheets-Sheet 15

INVENTORS
R. I. ROTH
A. H. DICKINSON
J. N. WHEELER

BY [signature]

ATTORNEY

RECORDING GAUGE SYSTEM

Filed March 31, 1945

INVENTORS
R. I. ROTH
A. H. DICKINSON
J. N. WHEELER

BY [signature]
ATTORNEY

RECORDING GAUGE SYSTEM

Filed March 31, 1945 20 Sheets-Sheet 17

INVENTORS
R. I. ROTH
A. H. DICKINSON
J. N. WHEELER
BY [signature]
ATTORNEY

INVENTORS
R. I. ROTH
A. H. DICKINSON
J. N. WHEELER
BY W. M. Wilson
ATTORNEY

May 2, 1950 R. I. ROTH ET AL 2,506,470

RECORDING GAUGE SYSTEM

Filed March 31, 1945 20 Sheets-Sheet 19

INVENTORS
R. I. ROTH
A. H. DICKINSON
J. W. WHEELER
BY
ATTORNEY

INVENTORS
R. I. ROTH
A. H. DICKINSON
J. N. WHEELER
BY
W. M. Wilson
ATTORNEY

UNITED STATES PATENT OFFICE 2,506,470

RECORDING GAUGE SYSTEM

Robert I. Roth, Hawthorne, N. Y., Arthur H. Dickinson, Greenwich, Conn., and John N. Wheeler, Hawthorne, N. Y., assignors to International Business Machines Corporation, New York, N. Y., a corporation of New York Application March 31, 1945, Serial No. 585,996

31 Claims. (Cl. 346—33)

This invention relates to measuring apparatus with indirectly operated means to take readings of the measurements.

Such measuring apparatus may be a weighing scale, a testing machine, a pressure gage, a unit of a self-synchronous motor system, a dynamometer, and so on. Any such measuring apparatus includes a device deflectable according to a variable. Such variable may be weight, pressure, voltage, current, displacement of an object, etc.

An object of the invention is to provide novel means for taking readings of the deflection of the device operable according to a variable.

An object of the invention is to provide novel means for hunting the variably displaceable device. By "hunting" is meant the continual reciprocation of a sensing means to and from the position of the displaceable device.

An object of the invention is to provide sensing means operated in one direction into sensing coaction with an element and controlled by the sensing coaction to move in the opposite direction to depart from sensing coaction.

An object of the invention is to provide means for taking readings of a variably displaceable device as a result of sensing coaction effected while a sensing means is movable in either of opposite directions. This is called double sensing, distinguished from single sensing in which a reading is taken only as a result of sensing coaction effected while the sensing means is moving in only one direction.

An object of the invention is to provide means for continually intermittently taking readings dependent on the deflection of a variable-responsive device.

An object of the invention is to provide novel sensing circuit means controlled by coaction of a follower with a variably deflectable device.

An object of the invention is to provide novel means for taking readings of a device movable linearly according to a variable.

An object of the invention is to provide novel means for taking readings of a device angularly movable according to a variable.

An object of the invention is to provide novel means for controlling the follower of a variably positionable device to function at different rates of speed.

An object of the invention is to provide an automatic drive for the follower of a variably positionable device in combination with means for stopping the drive when the follower travels past a limit position.

An object of the invention is to provide a variably positionable device with a rider which is sensed by a follower and which may be displaced by the follower relative to the device to obviate reaction between the follower and device.

An object of the invention is to provide a recording unit which is remote from the gage unit and controlled thereby in a novel manner to record readings taken by the gage unit.

An object of the invention is to provide means controlled in novel manner for recording measurements, made by a plurality of gage units, upon a single recording medium.

An object of the invention is to provide a novel arrangement of electronic control means in a gage unit or the like.

Other objects of the invention will be pointed out in the following description and claims and illustrated in the accompanying drawings, which disclose, by way of examples, the principle of the invention and the best mode, which has been contemplated, of applying that principle.

Figs. 19*a* to 19*h*, taken together, show the circuits of the gage and recording units.

Figure 19A:
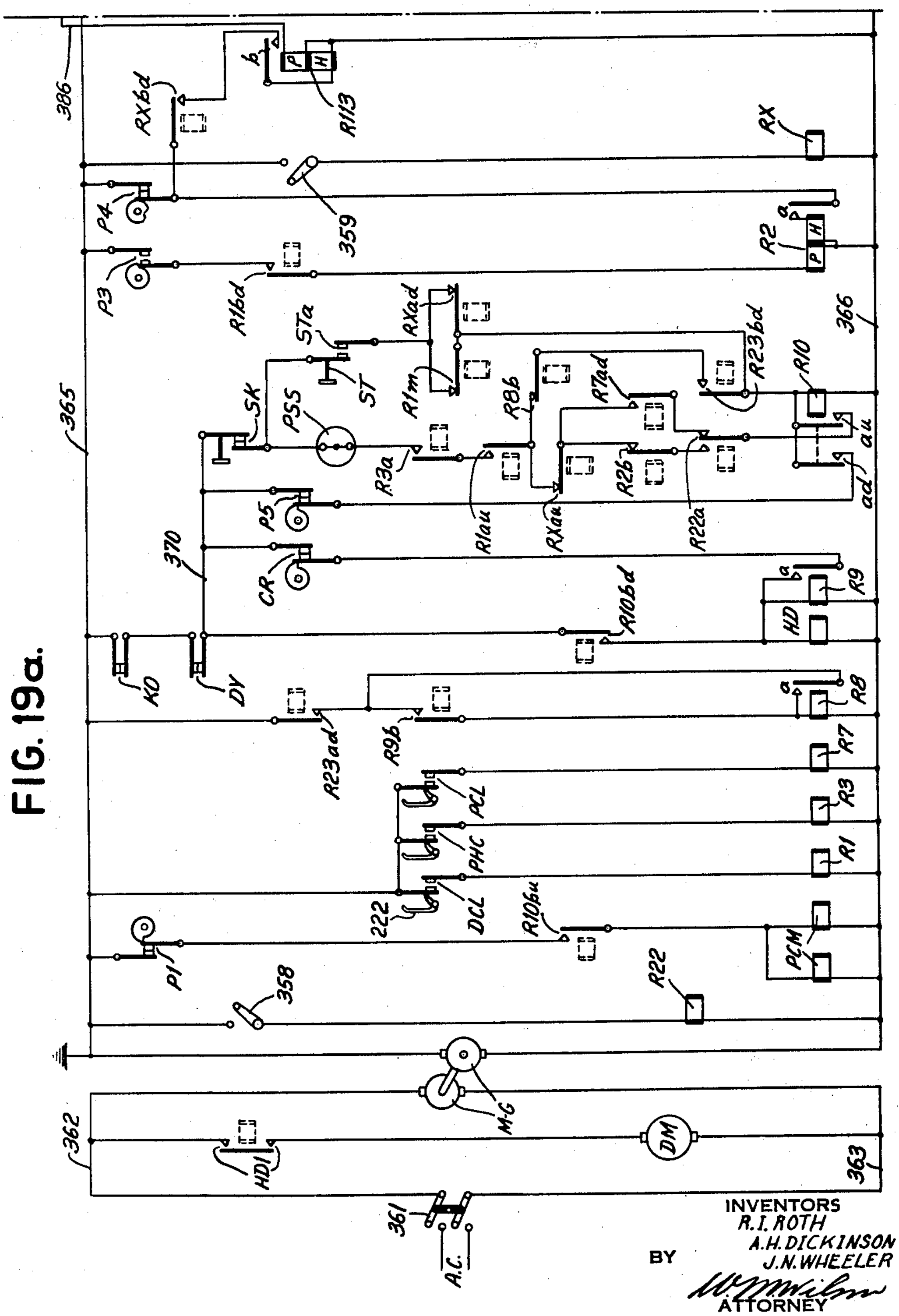
Figure 19B:
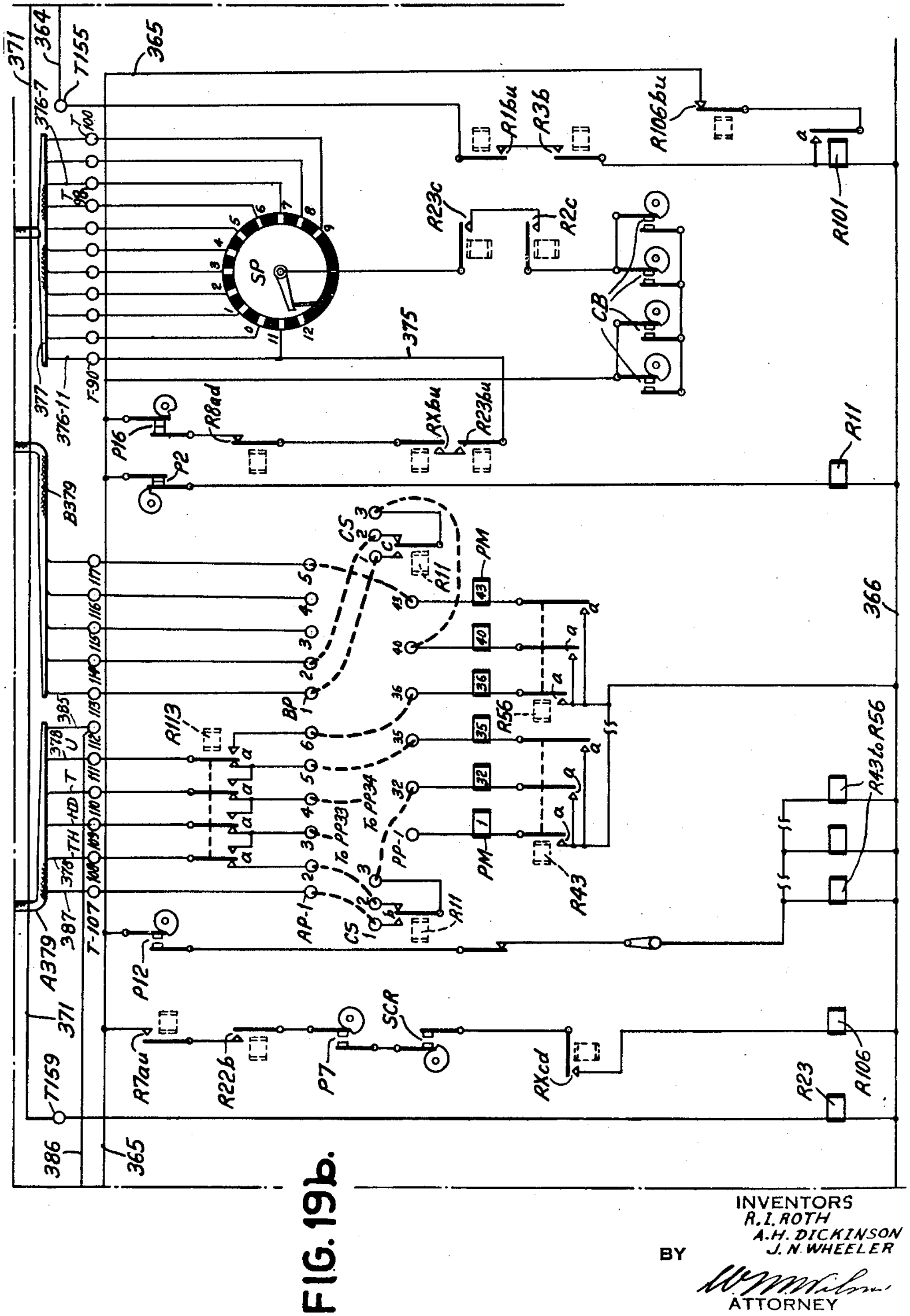
Figure 19C:
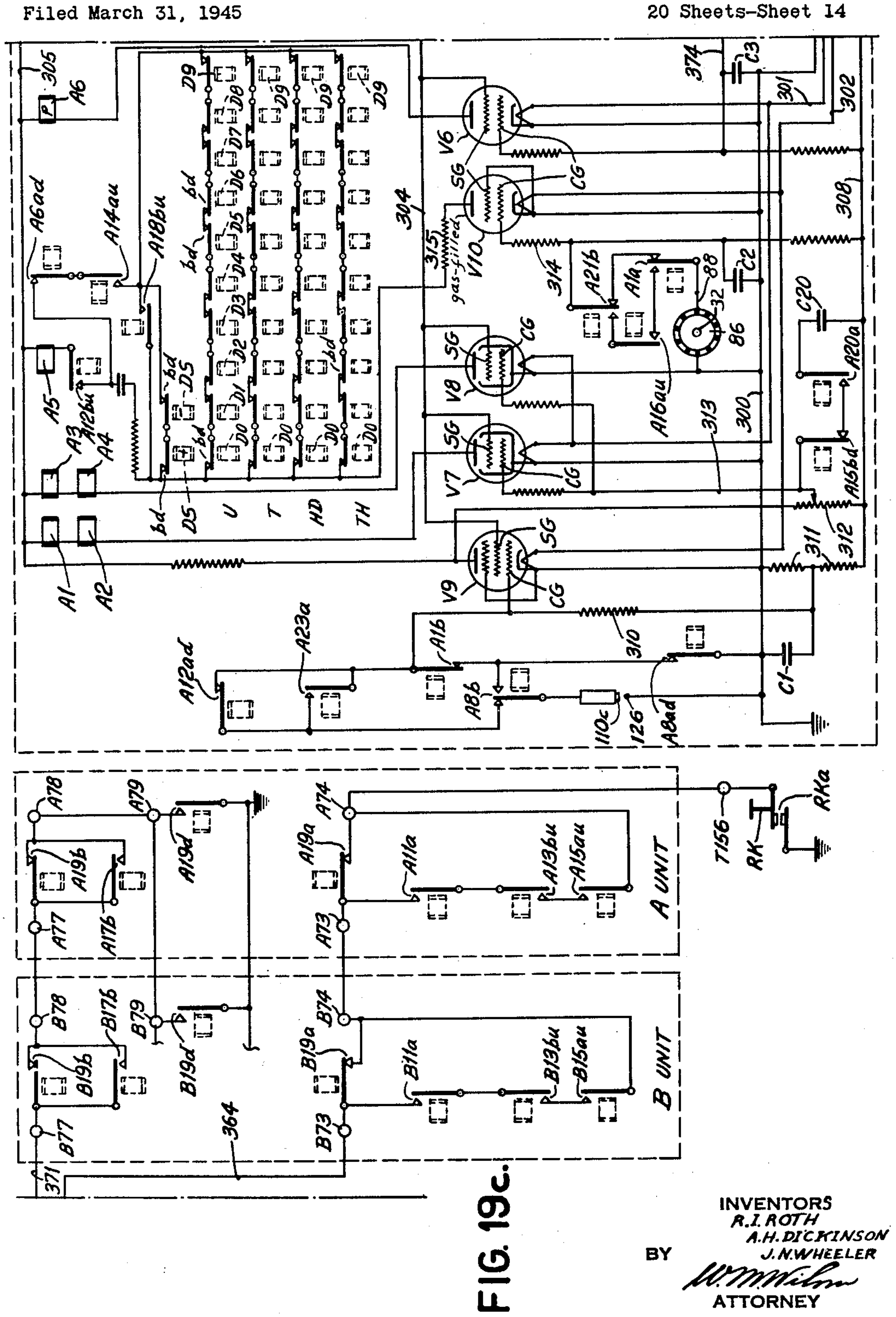
Figure 19D:
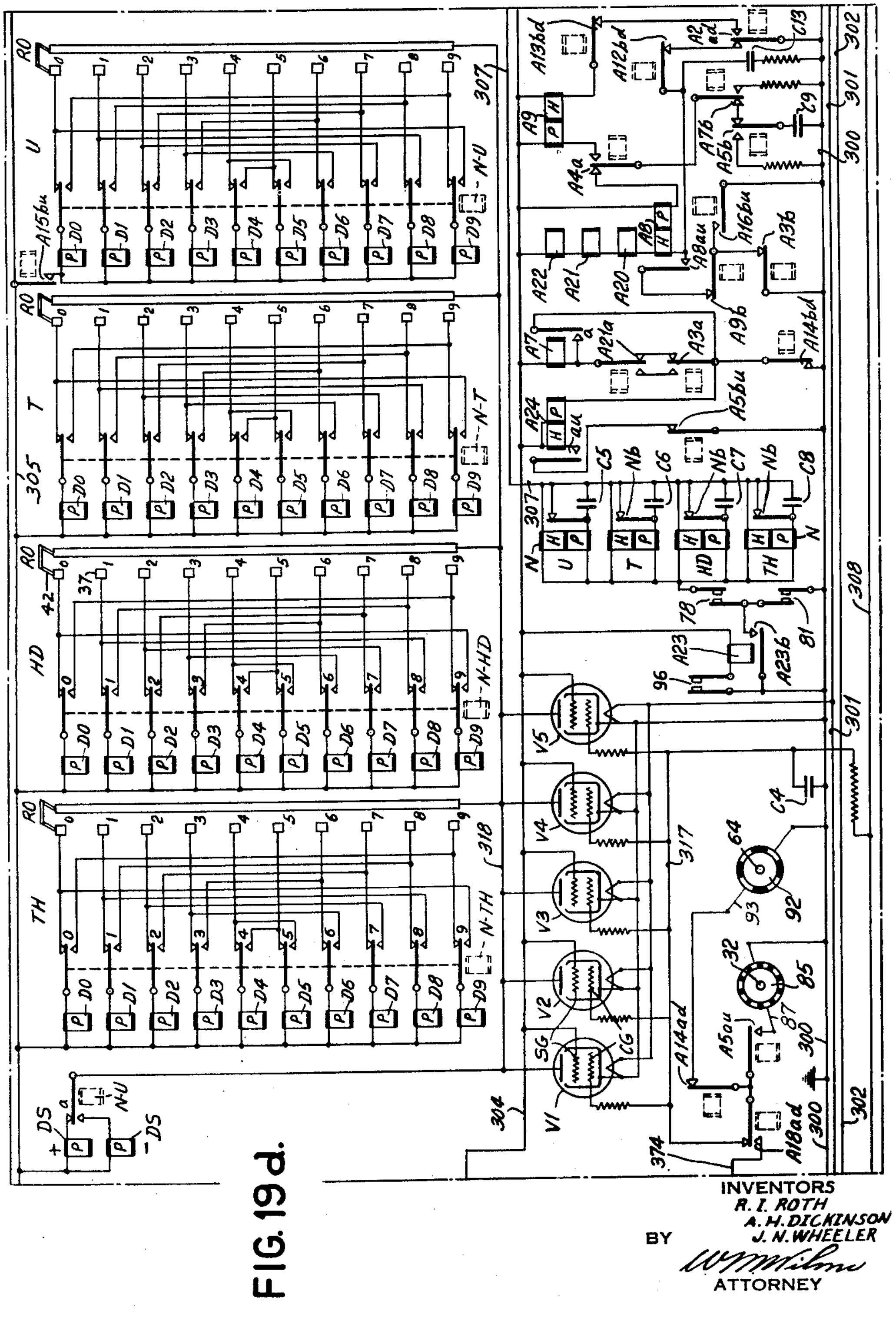
Figure 19E:
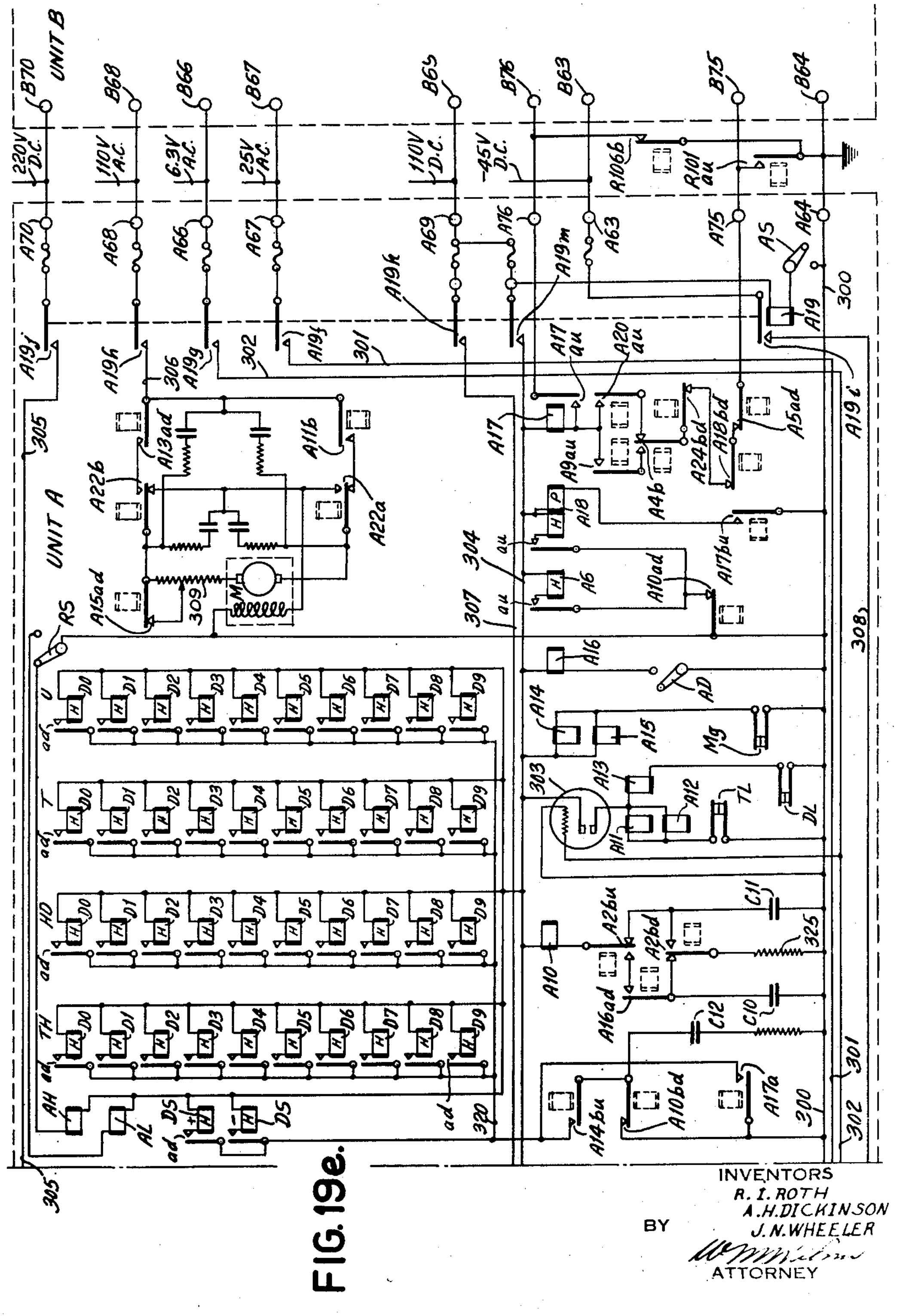
Figure 19F:
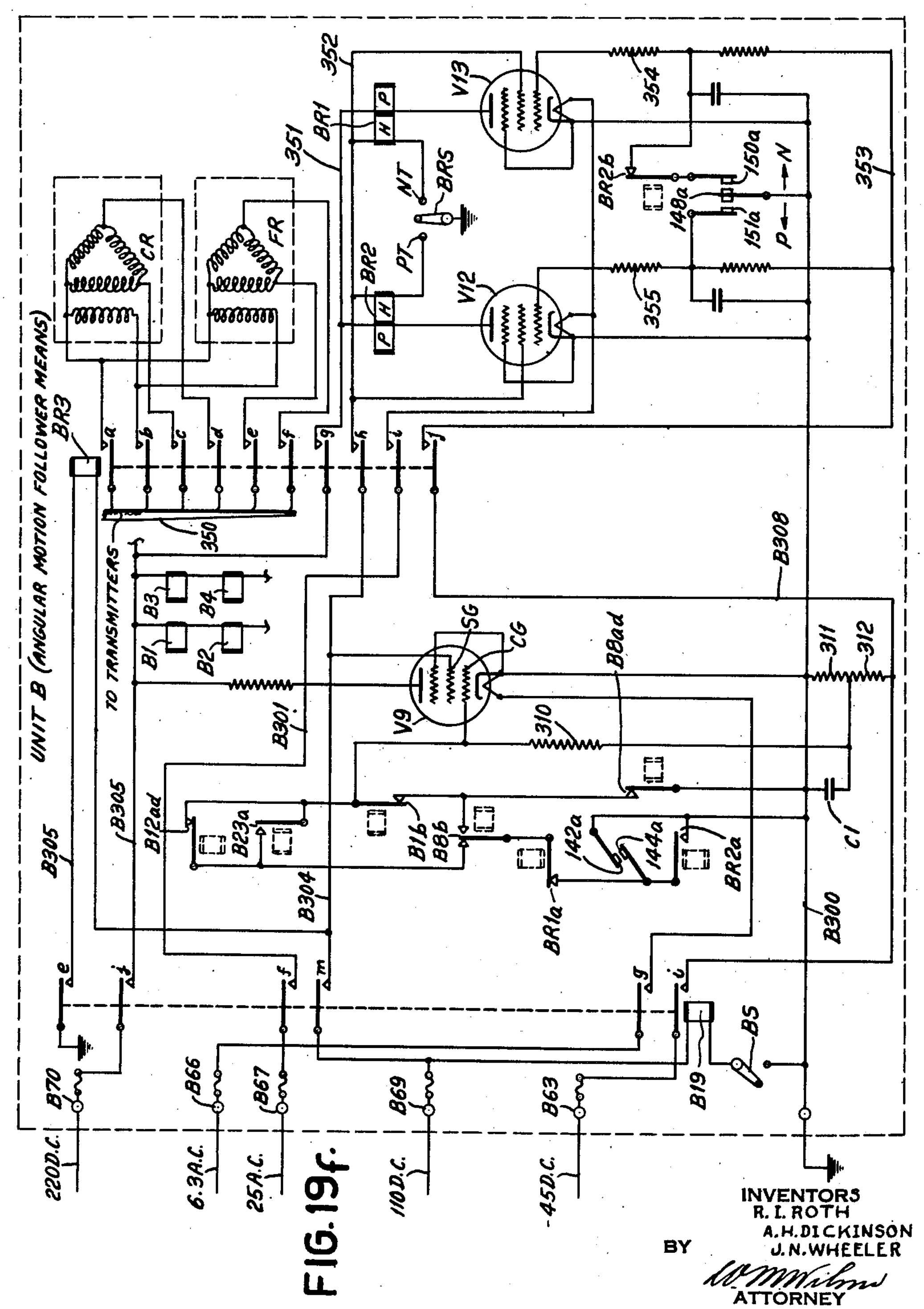
Figure 19G:
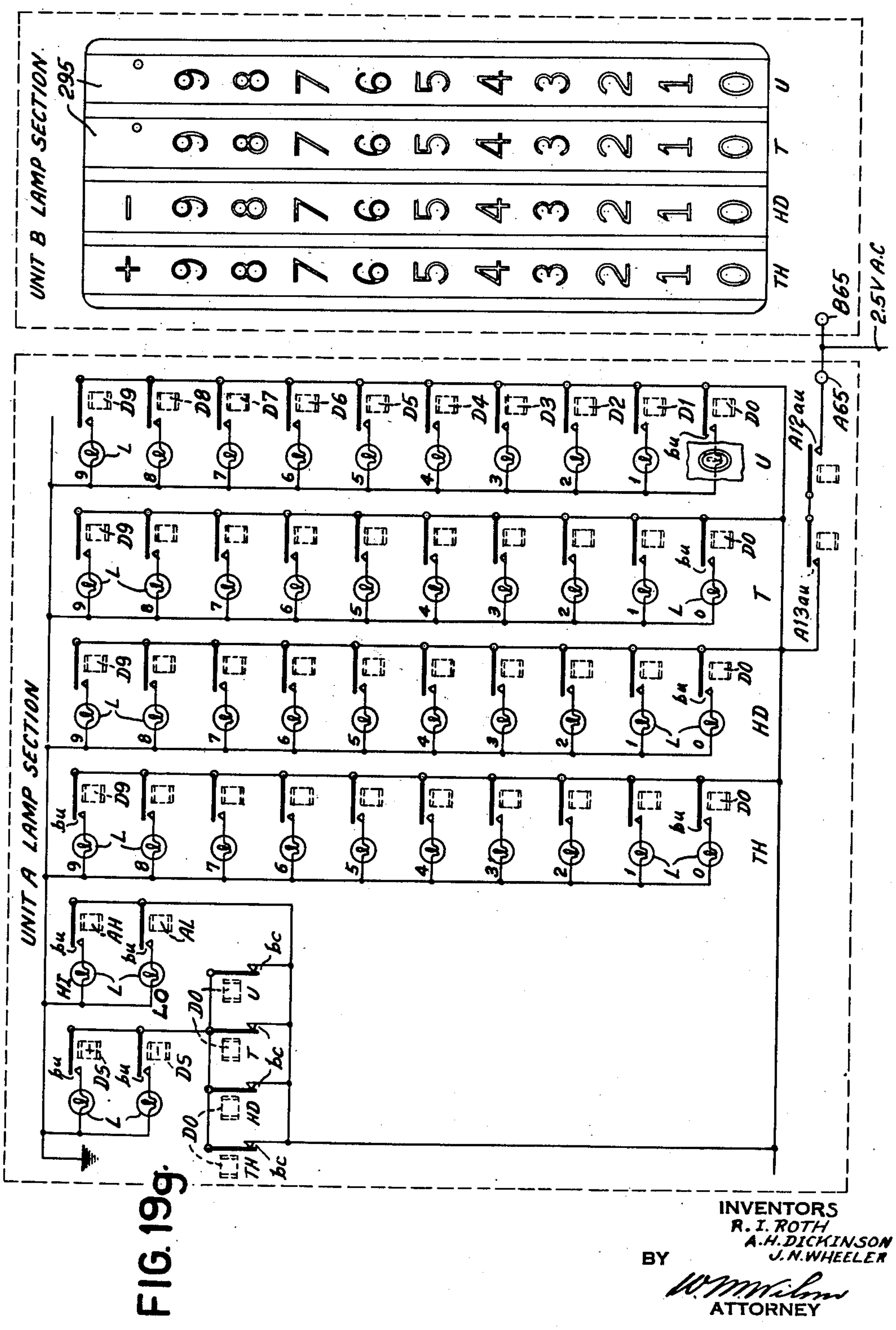
Figure 19H:
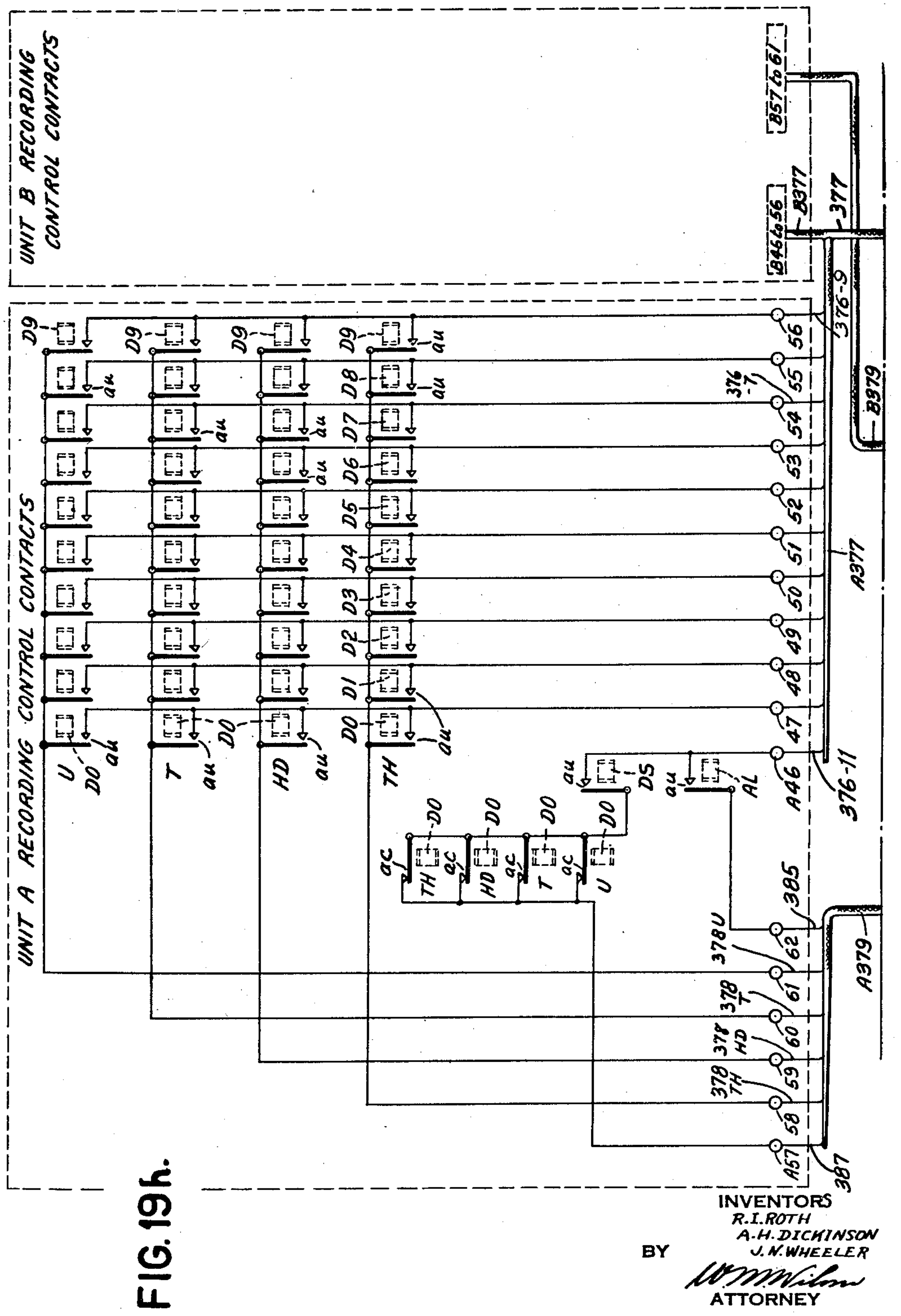
Figures 19I, 20:
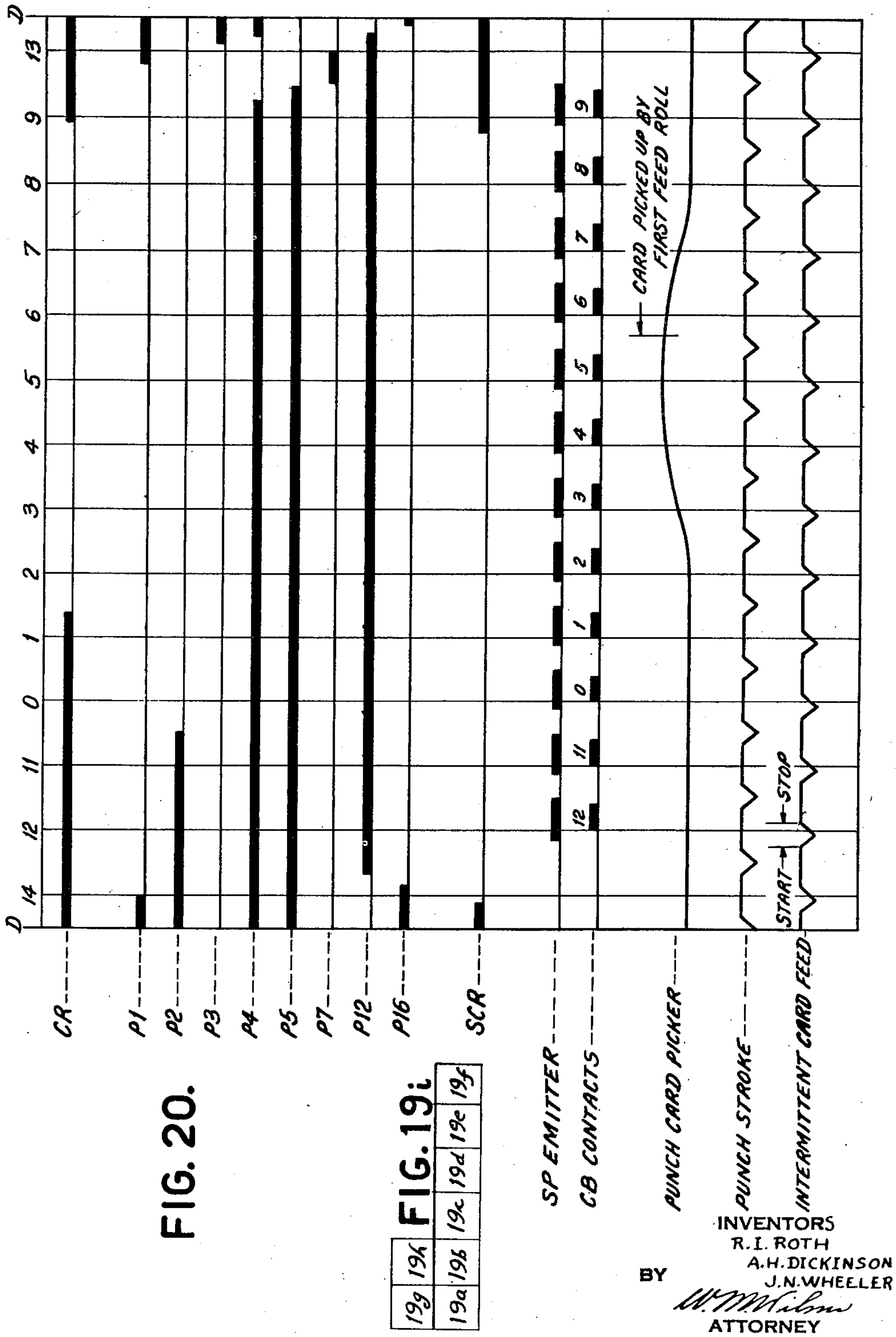

Fig. 19*i* is a box diagram of the arrangement of Figs. 19*a* to 19*h*.

Fig. 20 is a timing chart for the punch unit.

*General description*

The apparatus includes means to sense the displacement of an element movable according to a variable. Such element is a suitable part of a measuring instrument or gage, examples of which are weighing scales, testing machines, pressure gages, dynamometers, and angular deflection measuring devices. Each gage includes an element linearly or angularly movable in accordance with a variable. A different sensing means is employed to sense a linearly movable element than to sense an angularly movable element. In each case, however, the sensing is electrical. The means to sense displacement of a linearly movable element may be called a linear motion sensing or follow-up device. The means to sense displacement of an angularly movable element may be called an angular motion sensing or follow-up device.

The apparatus further includes, for either type of sensing means, register means controlled by the sensing means for registering the value of the displacement and means controlled by the register means to indicate and record the value. The register means, indicating means, and recording means are self-contained units which may be used with either of the types of sensing means. The unit which includes the register means is constructed as an attachment which may be mounted to a gage for coaction with the sensing device, whether such device be an angular motion follow-up or linear motion follow-up. The indicating means includes a lamp bank which is electrically controlled by the register and may be mounted in any convenient place, as remote from the measuring instrument as desired. The recording means may be a printing or punching machine or both. However, for the purposes of the disclosure, a punching machine will be used as the recording means. The punching machine will be electrically controlled by the register means and may be located as remotely from the measuring instrument as desired.

The attachment which includes the register means also mounts an electric motor with drive means for the register elements. In addition, the motor drives the follow-up or sensing device. The register and the sensing means are driven in predetermined relation in such manner that the register counts chosen increments of movement of the sensing means.

Both positive and negative displacements of the variable-responsive element of the gage may take place. The positive displacement of the element is its displacement in one direction from a zero position; the negative displacement is in the opposite direction from zero. Correspondingly, the register means will be moved in one direction to receive a positive value and in opposite direction to receive a negative value. When the variable-responsive element passes through its zero position into the negative range, the register means moves in the negative direction past zero value position. In so doing, it controls means to identify the negative nature of the registered amount. Positive and negative directions of movement of the various parts may be identified in the drawings by arrows P and N, respectively.

The follow-up means will continually seek the position of the variable-responsive element. Each time it finds the position of the element, its movement will be reversed. When it loses contact with the element, the follow-up means will again be reversed. In this manner, the follow-up means will continually reciprocate about the position of the variable-responsive element. Such action of the follower means is called "hunting." Each time the follow-up means finds the position of the element, it initiates reversal of the motor, in the register attachment, which drives both the follow-up means and the register means. Prior to motor reversal, however, the follow-up means, when it finds the position of the variable-responsive element, brings means into operation for clearing a previous reading taken from the register, and for taking a new reading. The reading is taken by setting up digit relays under control of the register means and in accordance with the register amount. The lamp bank which visually indicates the registered amount is directly controlled by the digit relays. Thus, each time the digit relays are cleared, the lamp bank is extinguished, and when the digit relays are reset with the new amount, they cause the lamp bank to indicate this amount. Since the follow-up means is continually hunting, readings will be continually cleared and taken even if the position of the variable-responsive element does not change. Hence, the lamp bank will continually, recurrently flash the quantities represented by the positions of the variable-responsive gage element. When a record is to be made of the quantity represented by the position of the element, a recorder key is depressed by the operator. The digit relays thereupon control the recording means to record the quantity manifested by the relays.

The operation of the follow-up means, variable-responsive gage element, and register means will not be interrupted while a reading is being taken and indicated or indicated and recorded. Instead, the follow-up means and register means will continue in operation uninterruptedly. In other words, readings will be taken on the fly, so to speak, and the follow-up and registering means will not pause in their operations for hunting and registering the positions of the variable-responsive gage element.

In so-called single sensing, the follow-up means will initiate the taking of a new reading only when it finds the position of the gage element while it (the follow-up means) is moving in one direction. In so-called double sensing, the follow-up means also will initiate the taking of a new reading while it is moving in the opposite direction. When moving in one direction, the follow-up means will make contact with the gage element. The follow-up means thereupon will reverse and will lose contact with the gage element. The point at which the follow-up means makes contact or loses contact with the follow-up means depends on the position of the gage element. Hence, by detecting the positions of the gage element both upon making and losing contact, the double sensing operation, in comparison with the single sensing operation, affords about twice as many readings in a given time. Therefore, the double sensing operation affords readings at shorter intervals, whereby a rapidly changing condition, reacting on the gage element, may be studied more closely with double sensing than with single sensing.

Each gage has associated therewith an appropriate follower, register attachment, and indicating lamp back. These associated structures may be called, for convenience, a gage unit. A single installation may include a plurality of such gage units and a recording unit for all the gage units. The recording means will be brought into operation by depressing a recorder button and will then record readings, from the different gage units in operation, upon a single record medium. Each gage unit is separately placed in operation. If at least one of the gage units remains in operation, then the recorder unit will be allowed to function, but if all the gage units are out of operation, the recorder unit will not function upon depression of the recorder key.

The register attachment will now be described in detail.

2. *The register attachment*

Figure 1:
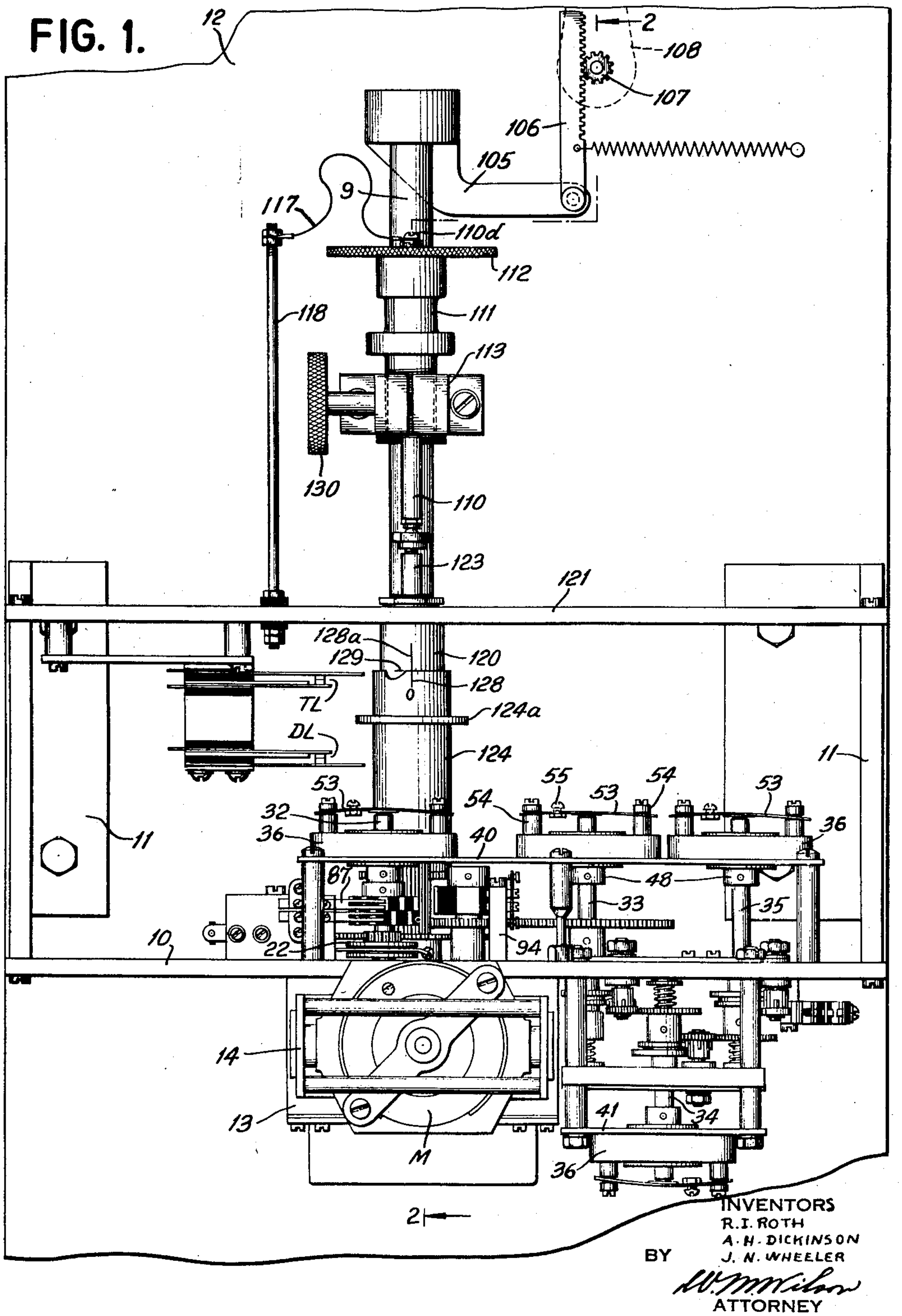
Fig. 1 is a front view of a gage unit with a linear motion follower.

Referring to Fig. 1, the register attachment comprises a base plate 10. The base plate will be suitably attached to the frame of the gage. As shown in Fig. 1, the base plate is attached to brackets 11 which are bolted to the frame plate 12 of the gage.

Figures 2, 3:
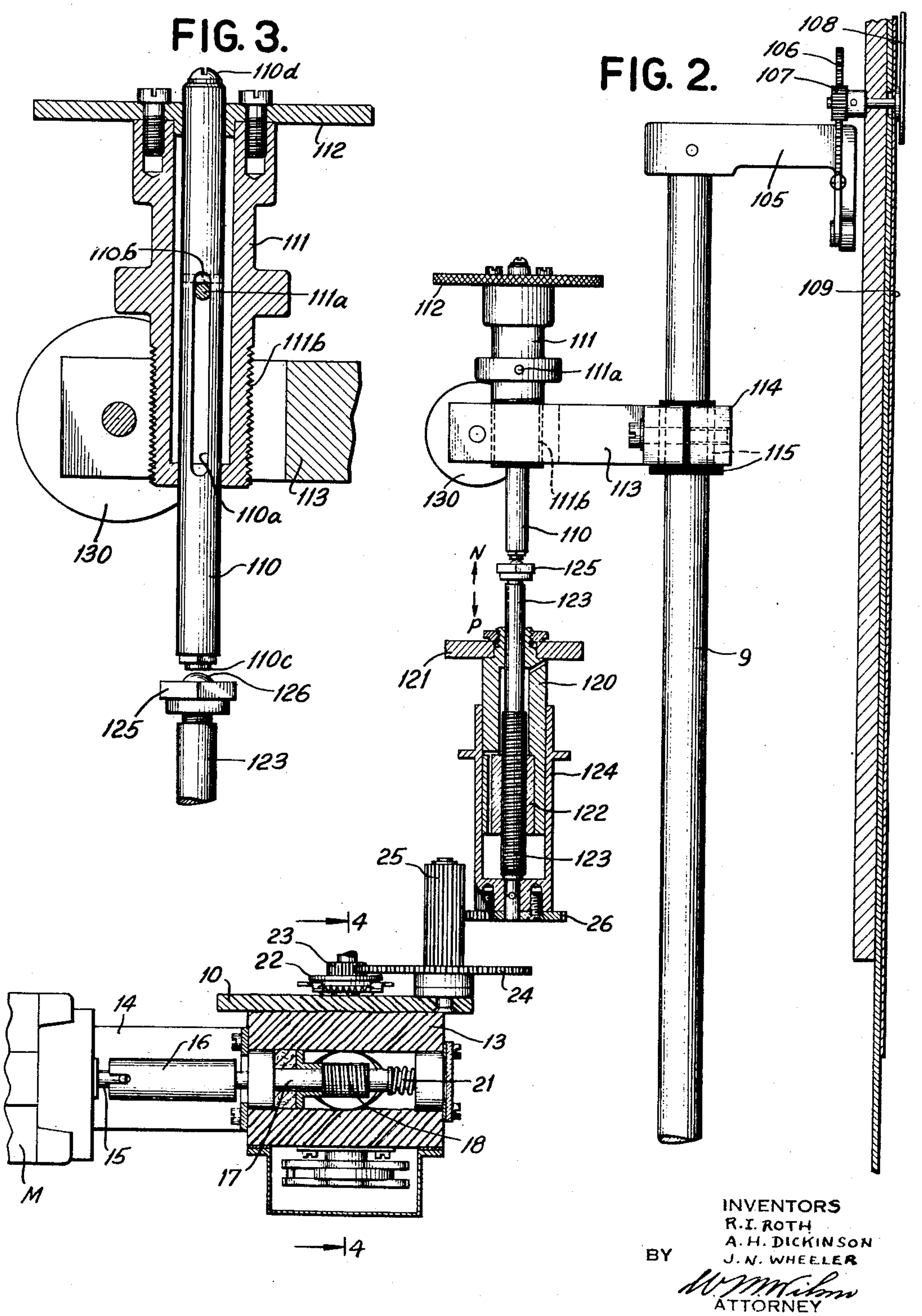
Fig. 2 is a section along lines 2—2 of Fig. 1.
Fig. 3 is an enlarged sectional view of a portion of Fig. 2.

Secured to the bottom of the base plate 10 is a block 13 to which are bolted the brackets 14 for mounting the drive motor M (also see Fig. 2). The shaft 15 of motor M is connected by a coupling 16 to a shaft 17 on which is a worm 18 (also see Fig. 4) for driving a worm wheel 19 on a sleeve shaft 20. A coil spring 21 (Fig. 2) surrounding the shaft 17 prevents end play of the worm 18.

Figure 11:
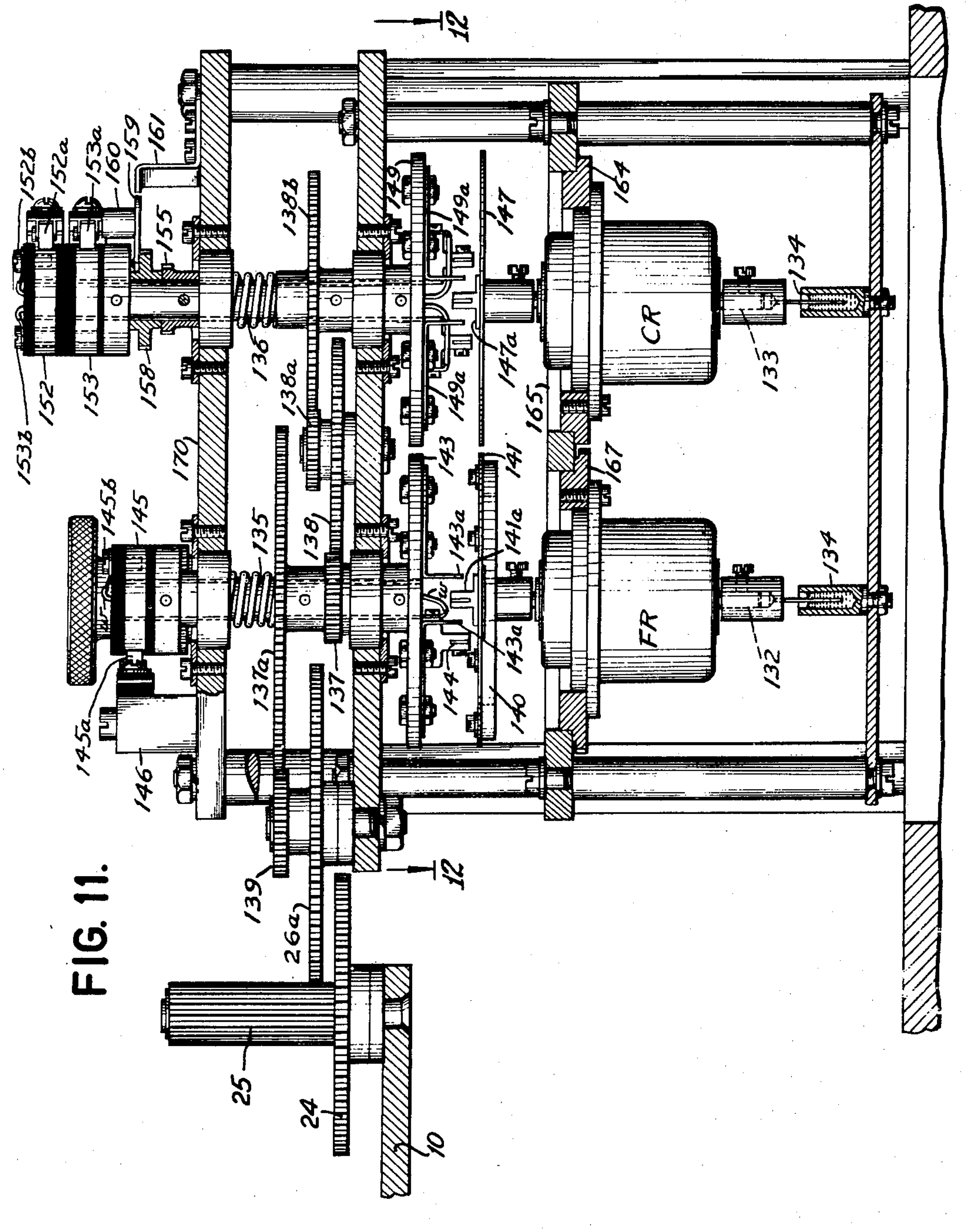
Fig. 11 is a section along lines 11—11 of Fig. 10.

Fixed to the upper end of sleeve shaft 20 is a grooved wheel 22 to the top of which is fixed a pinion 23. Pinion 23 meshes with a gear 24 (see Figs. 2 and 5). Rigid with the gear 24 is a pinion 25. When the register attachment is mounted to the gage, the pinion 25 meshes with a gear of the follow-up means. As shown in Fig. 2, pinion 25 is meshed with a gear 26 of a linear motion follow-up means. Gear 26 is vertically movable and pinion 25 is long enough to allow the gear 26 to remain meshed throughout its entire range of vertical travel. As shown in Fig. 11, a register attachment is applied to an angular motion follower means which includes a gear 26*a* driven by the pinion 25 of the associated register attachment.

Figure 4:
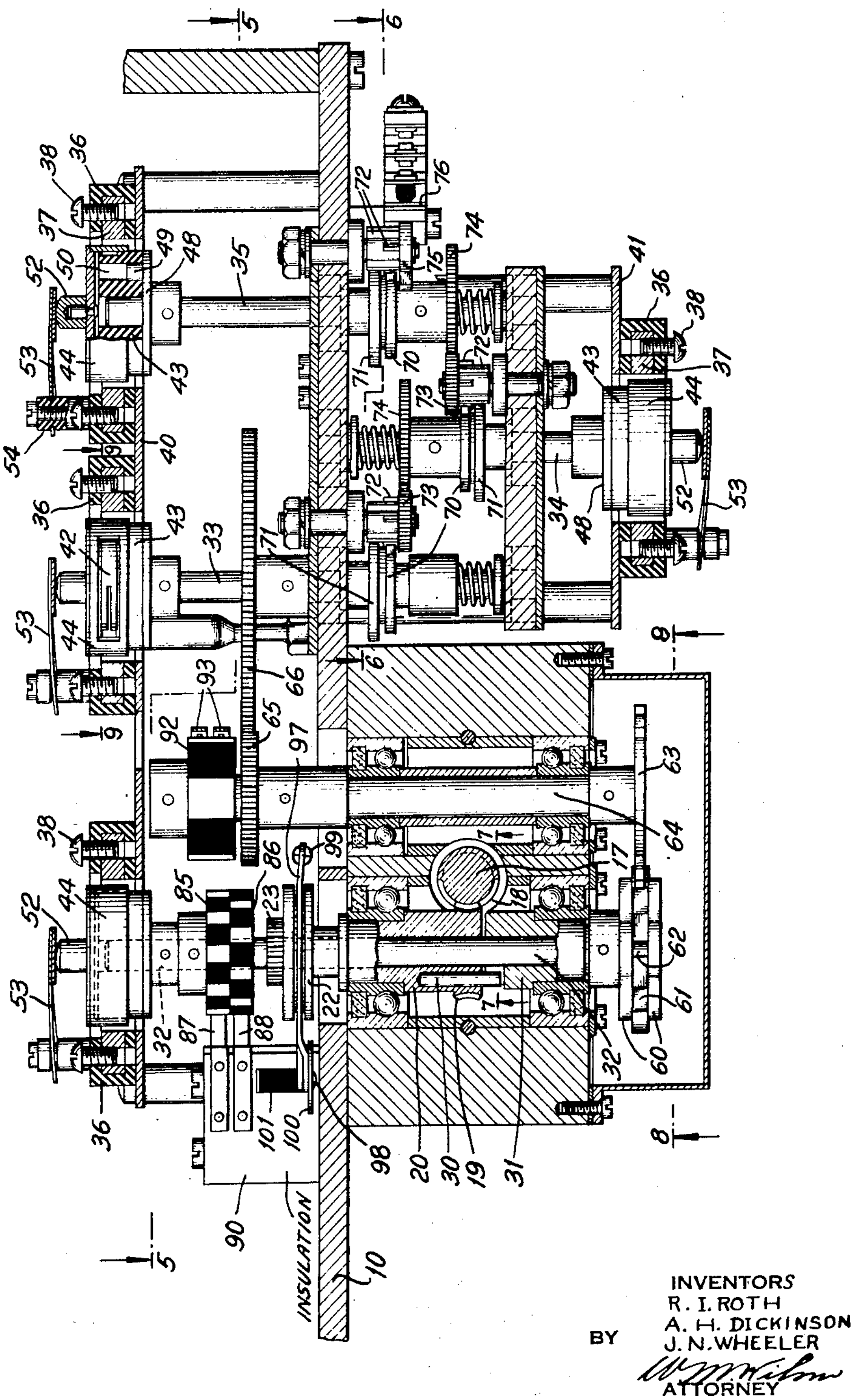
Fig. 4 is a section along lines 4—4 of Fig. 2.
Figure 7:
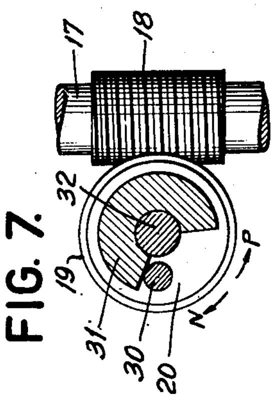

Referring to Figs. 4 and 7, a shaft 32 passes through the motor-driven sleeve shaft 20. The shaft 32 is provided with a bushing 31 which is formed with a segmental slot, and the sleeve shaft 20 is provided with a pin 30 which extends into the slot in the bushing 31. This slot is of such width as to allow the pin 30 to move about 75 degrees between the opposite walls of the slot. When the sleeve shaft 20 is rotating clockwise (as viewed in Fig. 7), it is driving the follow-up or sensing means in the negative direction and the pin 30, upon engaging one wall of the slot in bushing 31, will drive the shaft 32 also clockwise. Upon reversal of the motor M to actuate the sleeve shaft 20 counterclockwise (as viewed in Fig. 7), the shaft 20 effects movement of the sensing means in the positive direction. The pin 30, however, moves counterclockwise from the position shown in Fig. 7 for about 75 degrees before it meets the opposite wall of the slot in the bushing 31 to drive the shaft 32 also counterclockwise. The shaft 32 constitutes the units order shaft of the register means. Thus, the sleeve shaft 20 drives the units order shaft 32 of the register means through a lost motion connection which includes the drive pin 30 extending into a slot of bushing 31 fixed to the units order shaft.

Figure 9:
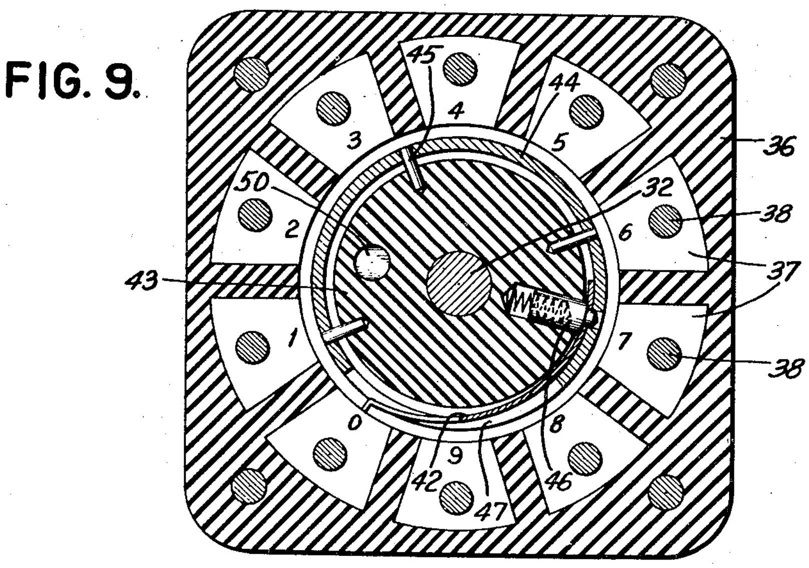

The register has four orders, the units, tens, hundreds, and thousands orders. The units order shaft 32 is driven through the lost motion connection to the sleeve shaft 20. When the capacity of the units order is exceeded, the shaft 32, by means of a Geneva gearing, effects a step of movement of the tens order shaft 33. Similarly, the tens order shaft 33, through an intermittent gearing transfer, steps along the hundreds order shaft 34, and the hundreds order shaft, through a similar transfer, steps along the thousands order shaft 35 (see Figs. 4 and 6). It is seen then that the register functions as a counter. The value positions of the orders are electrically registered by readout commutators. The readout commutator for each order comprises a moulding 36 of insulating material (see Figs. 4 and 9) in which are imbedded ten contact segments 37 relating to values 0 to 9 and which may be called the 0 to 9 segments. The distance between successive value segments, considering corresponding points thereof, may be referred to as the value step distance. Threaded into each segment is a terminal screw 38 which is wired into the register readout circuit, described subsequently. The mouldings 36 of the units, tens, and thousands orders are mounted on a support plate 40 and the moulding for the hundreds order is mounted on a plate 41 (see Figs. 1 and 4), both plates being secured to the base plate 10.

Each readout commutator includes a carrier for a brush 42 which is adapted to wipe the segments 0 to 9. The brush carrier comprises a collar 43 and a cup-shaped device 44 which surrounds the collar 43. Pins 45 connect the side of the device 44 to the collar 43 for common rotation. The collar 43 is formed with a circumferential groove whereby an annular space is left between the collar and the sides of the device 44. The brush 42 is made of spring metal, is curved, and its rear portion fits into the annular space between the collar 43 and the device 44. A spring-pressed plunger 46 is provided in the collar 43. The plunger has a reduced outer end which passes through a hole in the rear portion of the brush 42 and into a hole in the side of the device 44, whereby the brush is mounted for rotation with the collar 43 and the device 44. There is a slot 47 in the side of device 44 through which the forward portion of the brush protrudes into engagement with the inner circular periphery of the moulding 36 and the contact segment 37. Brush 42 is so tensioned as to maintain its wiping end in operative position. The wiping end extends radially so as to wipe the contact segments 37 with equal facility when the brush is turning in either positive or negative direction.

The collar 43 is of insulating material. It fits over the end of the shaft 32, 33, 34, or 35, Fig. 4, and rests against the flange of a collar 48 which is pinned to the shaft. An eccentrically located pin 49 projecting from the flange fits into a hole 50 in the collar 43, whereby the collar 43 and the shaft on which it is mounted are connected for common rotation.

The cup-shaped device 4 is made of conductive material. It is provided at the top with a knob 52 of conductive material. A leaf spring 53 is mounted between two insulating posts 54 and bears down, in the middle, on the knob 52. Carried by the leaf spring 53 is a terminal screw 55 (see Fig. 1) from which a wire is connected into the readout circuit, described hereinafter.

It will be seen that each of the denominational order shafts 32, 33, 34, and 35 of the register structure has ten rotative positions in which the connected brush 42 engages the contact segments 0 to 9. One step of value movement of the denominational order shaft is the movement required to move the brush from one contact segment to an adjacent segment.

Figure 8:
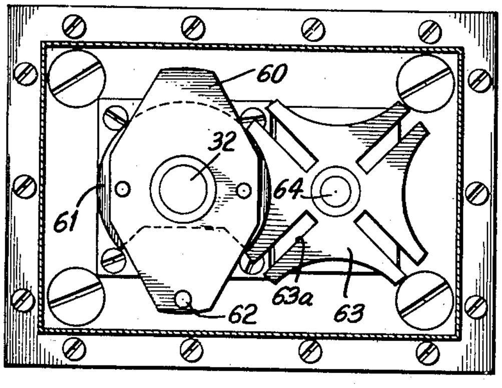

When the units order exceeds its capacity, it transfers one to the tens order. For this purpose, the units order shaft 32 carries a Geneva driver (Figs. 4 and 8) comprising a pair of plates 60 between which is sandwiched a locking plate 61, all three plates being rigidly secured to each other to form a rigid assembly which is fastened to the lower end of the shaft 32. The plates 60 are bridged by a driving pin 62 which is centrally located with respect to a recess 61*a* in the locking plate 61. The Geneva driver coacts with a Maltese cross-shaped wheel 63 fixed to an intermediate shaft 64. Wheel 63 has four radial slots 63*a* and concave arcuate peripheral portions between the slots to accommodate the circular portion of locking plate 61. As long as the circular portion of plate 61 rides in a concave peripheral portion of wheel 63, the wheel is locked against rotation. When the recess 61*a* begins to pass the wheel 63, the wheel is free to be moved and the pin 62 enters a slot 63*a* in the wheel. The pin 62 cams against a wall of the slot to move the wheel slowly at the start, then more rapidly, and then again slowly as the pin leaves the slot. The net effect is that when the shaft 32 moves from the 9 to 0 value position in the positive direction, or from the 0 to 9 value position in the negative direction, the wheel 63 and its shaft 64 are rotated through a quarter of a revolution.

Shaft 64 carries a gear 65 (Figs. 4 and 5) meshed with a gear 66 on the tens order shaft 33. The gear ratio is such that when shaft 64 makes one quarter of a revolution, the shaft 33 makes one tenth of a revolution. Thus, each time the units order shaft 32 passes through its carry position, it acts through the described gearing, to effect a carry step of the tens order shaft 33.

It will be noted that the carry means just described provides for a smooth, gradual carry, which is especially desirable because the units order shaft 32 is rotated at high speed.

Figure 6:
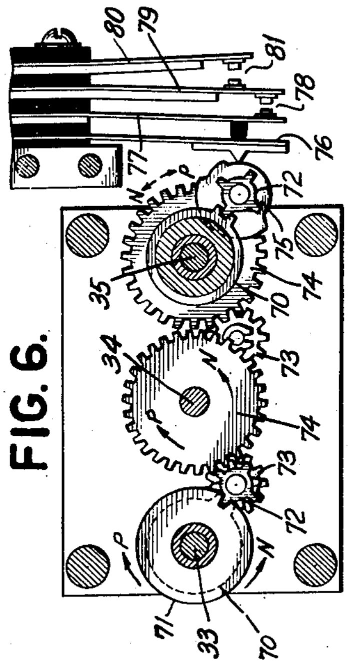

A known intermittent gearing transfer is provided between the tens and hundreds orders and between the hundreds and thousands orders. Referring to Figs. 4 and 6, the transfer device between the tens order and hundreds order includes a driver disk 70 and locking plate 71 fixed to tens order shaft 33. The disk 70 has two driving teeth, and the locking plate 71 has a notch alined with the space between the two teeth on disk 70. The driven element of the transfer includes an eight-toothed pinion 72 for coacting with the teeth of disk 70. Alternate teeth are cut short, leaving four widely spaced teeth opposite the locking plate 71. When the tens order shaft 33 is in positions 0 to 9, the circular periphery of the locking plate 71 is in the space between two of the long teeth of pinion 72, locking the pinion against rotation. When the tens order shaft moves in the positive direction, indicated by the arrow P, from 9 to 0 value position or when the shaft moves in the negative direction, indicated by the arrow N, from 0 to 9 value position, then the notch in the locking plate 71 meshes with a tooth of pinion 72 while the teeth of driver disk 70 coact with the teeth of pinion 72 to effect a quarter of a revolution of the pinion. Rigid with the pinion 72 is a pinion 73 meshing with a gear 74 on the hundreds order shaft 34. The ratio of pinion 73 to gear 74 is such that in one quarter of a revolution of the pinion 73, it drives the gear 74 and the hundreds order shaft 34 through one-tenth of a revolution. In this way, a carry is effected to the hundreds order upon the tens order going from 9 to 0 in the positive direction or from 0 to 9 in the negative direction. It is evident that the higher of two orders in receiving a carry from the lower one of the orders will move in the same direction as the lower order.

A similar transfer is provided between the hundreds order shaft 34 and the thousands order shaft 35.

As previously stated, the register may be operated to register negative, as well as positive values. A negative value will be registered if the register is operated in the negative direction past zero. If all four orders are at zero and the units order is moved one value step in the negative direction, it will go from 0 to 9 value position. As it does so, it produces a carry movement in the negative direction to the tens order, moving this order from 0 to 9. The carry means between the tens and hundreds orders and between the hundreds and thousands orders will successively move the hundreds and thousands orders in the negative direction to their 9 value positions. The register is then in the negative range and to manifest this fact, means are operated by the thousands order to distinguish a negative value from a positive value. For this purpose, a driver disk 70 and locking plate 71, such as provided in the intermittent gearing transfers, are fixed to the thousands order shaft 35 (see Figs. 4 and 6). The driver 70 and locking disk 71 coact, in the same way as described for the intermittent gearing transfer, with a pinion 72. Rigid with this pinion 72 is a cam 75 which has three levels. Normally, a spring blade follower 76 is on the low level of cam 75. Engaged, through insulation, with the back of the follower 76 is the spring blade 77 of a switch 78. The other blade 79 of this switch and a blade 80 carry the contacts of another switch 81. When the follower 76 is on the low level of cam 75, switches 78 and 81 are both open. As the thousands order shaft 35 moves in the negative direction from 0 to 9, the driver disk 70 carried thereby effects a quarter of a revolution clockwise of the associated pinion 72 and the connected cam 75. During the first portion of this movement of the cam, its intermediate level rides past the follower 76, forcing it to the right sufficiently to cause the switch 78 to close but not enough to close the switch 81. During the final portion of the movement of the cam 75, its high level moves into engagement with the follower 76, moving it further to the right, sufficiently to close contacts 81 along with contacts 78. Thus, when the register is moved into the negative range, the contacts 78 and 81 are successively closed. The closure of these contacts operates means for manifesting a negative value registration in a manner described later on in the description of the circuits. When the register moves back into its positive range, the thousands order returns in the positive direction from 9 to 0, causing the cam 75 to move counterclockwise one quarter of a revolution, back to its initial position shown in Fig. 6. The follower 76 first drops off the high level of cam 75, allowing contacts 81 to open and then drops off the intermediate level of the cam, allowing contacts 78 to open. Hence, when the register returns to its positive range, the contacts 81 and 78 open in succession.

The units order shaft 32 rigidly carries two timing commutators 85 and 86 (see Figs. 4 and 5) which may be called the digit and control commutators, respectively. Each has ten contact spots around its circumference, and corresponding points of successive segments are a value step distance apart. Commutators 85 and 86 are wiped by pairs of brushes 87 and 88, respectively. The brushes of each pair engage the related commutator at diametrically opposite points. One brush of each pair is connected to ground, as indicated in the circuit diagrams, Figs. 19*c* and 19*d*. When a contact spot reaches the other brush of the pair, it may be spoken of as in brush position. The brush positions are the same for both commutators 85 and 86, but the contact spots of one of these commutators are staggered with respect to the contact segments of the other commutator, so that the contact spot of one commutator reaches its brush position and then a following contact spot of the other commutator reaches its brush position. The tips of the brushes extend radially to enable them to wipe the commutator with equal facility when the commutator is moving in either direction. The brushes are carried by blocks 90, of insulating material, which are fastened to the base plate 10. The purpose of these commutators will be made clear hereinafter.

The intermediate shaft 64 (Figs. 4 and 5) which is rotated one-quarter of a revolution for each revolution of the units order shaft 32 rigidly carries a timing commutator 92. This commutator has four contact segments and is wiped by vertically spaced brushes 93, one of which is connected to ground (see Fig. 19*d*). The brushes 93 are mounted on an insulating block 94 secured to base plate 10 (also see Fig. 1). As will be brought out in the circuit description, the commutator 92 times the digit indication when the register is operating at the higher of two speeds.

A switch 96 (Fig. 5) is mounted on one of the insulating blocks 90. This switch is open when the register is operating in the positive direction and is closed when the register is operating in the negative direction. To control the status of switch 96, a pair of arms 97 (also see Fig. 4) frictionally clasp the grooved wheel 22. The arms 97 are pivoted to each other by a stud 98, the intermediate portions of the arms extend into the groove of wheel 22, and their free ends are connected by a spring 99. Carried by the pivot stud 98 is a disk 100 and a bushing 101, of insulating material. The arms 97 tend to rotate, as a unit, with the grooved wheel 22 which is fixed to the continuously driven sleeve shaft 20. However, the arms move only slight amounts in either direction before they are stopped by engagement of the disk 100 with the blocks 90. When the shaft 20 and wheel 22 are moving in the positive direction, the arms 97 are at their clockwise limit. When the shaft 20 and wheel 22 are moving in the negative direction, the arms 97 swing to their counterclockwise limit, and the insulating stud 101 abuts the adjacent spring blade of switch 96 to close the switch. The purpose of switch 96 will be brought out in the circuit description.

The linear motion follow-up and sensing means will now be described.

3. *The linear motion follow-up means*

The linear motion follow-up means follows and senses the position of an element linearly movable in accordance with a variable. Such element may be a part of a weighing scale, or a pressure gage, or other measuring instrument. For the present disclosure, the element may be considered as part of the force measuring instrument, hereinafter called a scale, disclosed in Patent No. 2,325,345 to M. C. Tate.

Referring to Figs. 1, 2, and 3, the rod 9 is a linearly movable element which is displaceable vertically in accordance with a force applied to the scale. This rod 9 may be considered as corresponding to the rod 9 of the scale disclosed in the patent just mentioned.

Rod 9, in the present case, is set at a neutral or zero position under the influence of a load which may be referred to as the index load. Loads added to the index load are called positive loads and will produce descending movement of the rod 9. Loads diminishing the index load are called negative loads and will produce rising movement of rod 9. Rod 9 may be given a predetermined range of travel under the influence of different ranges of loads, as disclosed in the aforementioned patent. Two ranges, high and low, will be considered here, the low range being $\frac{1}{10}$ the high range.

Rod 9 carries a crosshead 105 on which is a rack 106 meshed with a pinion 107 on the shaft of a pointer 108. The pointer coacts with a suitably graduated indicating chart 109. The pointer and chart provide an indication, directly at the scale, of the applied load. However, the indication given by the pointer and chart must be interpolated by the operator and, hence, cannot be read with the utmost accuracy. It is desired to furnish an accurate indication of the load value in numeral form not requiring interpolation, and for the indication to be given at a location remote from the scale. Further, provision is to be made for recording the load value. These considerations underlie the use of a follow-up means for the load responsive element, such follow-up means to control the register, previously described, which will control the remote indicating and recording means.

The follow-up means will be moved to sense the position of the rod 9. Thereby, any errors which derive from the drive connections between the rod 9 and the pointer 108 are avoided in the follow-up means. In order to avoid undesired reaction between the follow-up means and the load responsive means, the follow-up means does not sense the rod 9 itself but senses a control device movable with the rod. The control device comprises a contact rod 110 (Figs. 1, 2, and 3) which is made of a magnesium alloy and weighs about a quarter of an ounce, a weight which is a minute fraction of that of rod 9 and operating means (not shown) for the rod 9. The contact rod 110 is formed with an elongated slot 110*a* and provided with a round pin 110*b* which crosses the upper end of the slot. The greater portion of the contact rod is enclosed within a sleeve 111 to the top of which is fastened a knurled disk 112. Contact rod 110 is confined to vertical movement by guiding coaction with the lower end of the sleeve 111 and the collar of disk 112. The guiding fit is loose enough to allow the rod 110 to drop freely and without friction. Sleeve 111 carries a pin 111*a* which passes freely through the slot 110*a* of contact rod 110. The rod 110 may drop until its pin 110*b* rests on the pin 111*a*. The pins are of circular cross section and are at right angles to each other, providing a point engagement between them. Rod 110 is thus freely suspended from the pin 111*a* which is carried by sleeve 111. The sleeve has a threaded portion 111*b* which is screwed into furcations of a split clamp block 113. Block 113 and a complementary clamp block 114 clamp a split insulating ferrule 115 to the rod 9. The sleeve 111 and the parts supported thereby are thus rigidly carried, through insulation, by the load responsive rod 9. When the pin 110*b* of the contact rod 110 is resting on the pin 111a of the sleeve 111, the contact rod is in a position of support by the load-responsive means.

The pins 110a and 111a may separate. Their separation occurs when the rod 9 together with sleeve 111 move down relatively to the contact rod 110 or when the contact rod moves up relative to the sleeve 111 and rod 9. In order that the rest position of rod 110 on the load responsive means remain constant, the point of engagement between pins 110a and 111a should not be altered by dirt settling between the pins. The hazard of dirt settling between this single precise point of engagement between the pins is small, and is reduced further by the enclosure of the pin 111a and the portion of rod 110 carrying the pin 110a in the sleeve 111 which is practically sealed to the entry of dirt.

The contact rod 110 is provided at its lower end with a contact 110c which is ground smooth and flat. The upper end of the rod 110 has a terminal screw 110d from which a bent thin wire 117 leads to a fixed terminal rod 118. The wire 117 is of such length, flexibility, and form that it will not interfere with the movement of the rod 110.

The contact rod 110 is one element of a sensing circuit which senses the positions of the load responsive means. The other element of this sensing circuit is the linear motion follow-up means which will now be described. The linear motion follow-up means comprises a micrometer structure. The barrel 120 of the micrometer is secured to a metal shelf 121 which is rigidly carried by the brackets 11 bolted to the frame 12 (see Fig. 1). Secured to the barrel 120 (Fig. 2) is the nut 122 for the micrometer screw 123. The screw 123, at its lower end, is pinned to the base of the micrometer thimble 124. At its lower end, the thimble 124 rigidly carries the gear 26 which is meshed with the pinion 25. As previously explained, pinion 25 is rigid with gear 24 which is driven by pinion 23 on the shaft 20, and the shaft 20 is rotated, by worm gearing 18 and 19, from the motor shaft 15. Thus, the rotation of the gear 26, the micrometer thimble 124, and the micrometer screw 123 is proportional to the rotation of shaft 20. The vertical travel of the micrometer screw is proportional to its rotation. Also, as previously explained, shaft 20 drives the units order shaft 32 of the register. Hence, the rotation of shaft 32 and the operation of the register has a predetermined relation to the vertical travel of the micrometer screw 123.

The upper end of the micrometer screw 123 mounts a cage 125 (Fig. 3) for a ball contact 126. There is conductive engagement between the contact 126, screw 123, the micrometer barrel 120, and the shelf 121 which is grounded. When the contact 126 is separated from contact 110c, the motor M is operated, by a circuit explained in the subsequent circuit description, in a direction to cause upward travel of the micrometer screw. When the contact 126 meets the contact 110c, then the micrometer screw has reached a vertical position corresponding to the position of the contact rod 110. Since the contact 126 is a portion of a sphere and the contact 110c is smooth and flat, the contacts will meet at a single precise point. Both contacts are formed of hard metal so that their meeting point will not vary, whereby the position of the micrometer screw will always be determined by the same point of the load responsive controller comprised of contact rod 110 and contact 110c.

In a manner explained in the subsequent circuit description (section 7), the meeting of the contacts 126 and 110c establishes a sensing circuit. An ultimate result of the making of this circuit is that motor M is reversed to cause the micrometer screw to travel downwardly, whereby contacts 126 and 110c break. The ultimate result of the break of the contacts and sensing circuit is that the motor again reverses, causing the micrometer screw to move upwardly until contacts 126 and 110c again make. Such recurring reversals of the travel of the micrometer screw occur continually, so that the micrometer is constantly hunting the position of the load responsive means. It is, therefore, unnecessary to start the follow-up means from an initial position for sensing a load position and to return the follow-up means to the initial position before moving it to sense a new load position. In short, the follow-up means moves directly from its previous load sensing position to the new load sensing position and remains constantly alert to and immediately responsive to changes in the load position of the load responsive means.

There is no undesired pressure reaction between the load responsive means and the follow-up means. Should the load increase suddenly, the sleeve 111 may move down abruptly before the micrometer screw 123 follows. The screw will merely hold up contact rod 110 momentarily but will not resist downward movement of the sleeve 111 and its carrying rod 9. When the screw 123 rises to engage its contact 126 with contact 110c, it may rise sufficiently to lift the contact rod off the pin 111a. Again the screw will not exert back pressure on the sleeve 111 and rod 9. The contact rod weighs only about a quarter of an ounce which has a negligible effect on the operation of the load responsive means. In short, the load responsive means releasably carries a controller for the follow-up means, and the controller may momentarily be released from the load responsive means without any noticeable effect on the operation of the load responsive means.

In assembling the follow-up means and the register to the scale, the micrometer is first mounted in position. The thimble 124 is then turned until alinement is obtained of a vertical index line 128 (Fig. 1) on the thimble with a vertical index line 128a on barrel 120 and also of the top of the thimble with a horizontal index line 129 on the barrel. The micrometer screw is then in its zero or neutral position. The register is set in zero position before the register attachment is secured to the scale. In the zero position of the register, the readout brushes 42 of all the four register orders are engaging the midpoints of the zero segments 37 of all the four readouts, and the brushes 87 (Fig. 4) are at the midpoints of diametrically opposite contact segments of the digit commutator 85. The register attachment is then mounted on the scale and, in so doing, the pinion 25 is meshed with the micrometer pinion 26. The micrometer and register are now in correct zero relationship. To obtain correct zero relationship of the micrometer and register to the scale, the scale is set in zero load position. A knob 130 is then turned to loosen the grip of the threaded furcations of clamp 113 on the threaded portion 111b (Fig. 3) of the sleeve 111. The disk 112 now is turned to adjust the sleeve vertically until the pin 111a is supporting contact rod 110 and the contact 110c is engaging the contact 126. This is approximately the zero position of the contact rod 110. To find its exact zero position, the apparatus including the indicating bank of lamps (Fig. 19g) is brought into operation in a manner explained later in sections 6 and 7. The readings taken from the register will produce an indication on the lamp bank of zero value when the rod 110 is in zero position since the register, micrometer, and load responsive means are already set in zero positions. Having found the correct zero position of the contact rod 110, the sleeve 111 is fixed in position relative to rod 9 by turning the knob 130 to tighten the grip of the clamp 113 on the sleeve.

Since the register has four orders, it may count each 10,000th increment of movement of the load responsive means. Assuming, for example, that the scale has a capacity of 10,000 lbs. the units order will be moved one value step for each pound increment of movement of the load responsive means. If the capacity is reduced to 1000 lbs. the units order will count each increment of movement of the load responsive means resulting from a change in the load of one-tenth of a lb. The smallest increment of the load which may be counted will be referred to, for convenience, as the value increment. It is evident that the units order of the register will not count fractions of the value increment. However, the nearest even multiple of the value increments will be counted by the register.

In single sensing, one reading is taken from the register each time the contact 126 rises, meets the contact 110c and establishes a sensing circuit described later in section 7. The circuit initiates these successive operations: (1) clearing of the previous reading, (2) conditioning, under control of a contact spot on commutator 86, preliminary to taking a new reading, (3) taking a new reading under control of a contact spot on commutator 85, (4) initiation and carrying out of motor reversal. It is clear that at the time the contact spot on commutator 85 times the taking of a new reading, the register orders are in positions corresponding to the load, in view of the preliminary zero adjustments described before. In other words, since the register is registering zero when a zero load is on the scale, it is in correct registering position for all other loads. Time elapses between the making of the sensing operation and each of the following operations initiated thereby, and time elapses between each operation and the succeeding one. Meanwhile, contact 126 continues to rise, lifting controller rod 110 off its supporting pin 111a. Also, units order shaft 32 continues turning in negative or counterclockwise direction (Fig. 5), until motor reversal actually occurs.

Figure 5:
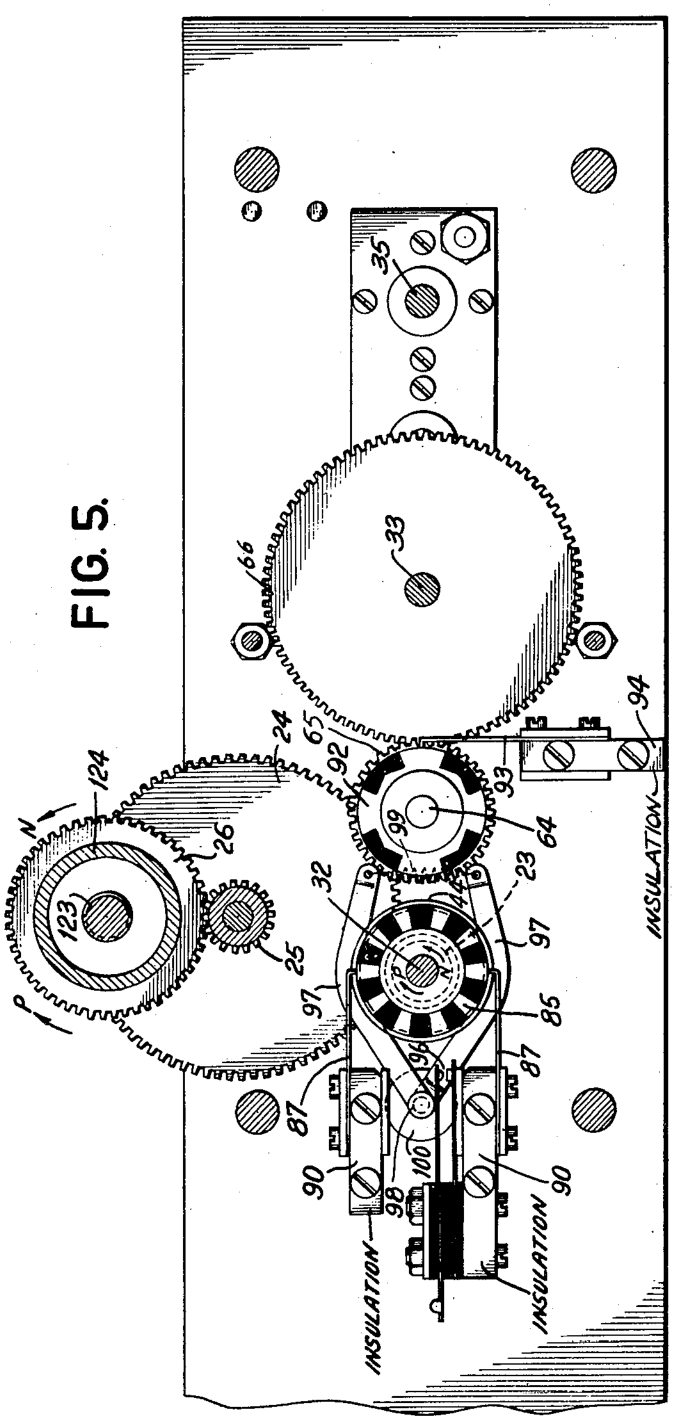
Figs. 5 to 9 are sections along lines 5—5 to 9—9, respectively, of Fig. 4.

In double sensing, one reading is taken each time contact 126 rises and meets contact 110c to establish a sensing circuit and, also, one reading is taken each time contact 126 descends and leaves contact 110c to break the sensing circuit. Hence, about twice as many readings can be taken in double sensing as in single sensing in a given time interval. In double sensing, the break of the sensing circuit initiates the same four successive operations as the make of the circuit. The reading is not taken at the exact time the sensing circuit makes or breaks but after a lapse of time required to clear out the previous reading and to condition for the new reading. Hence, if there were no lost motion between shafts 20 and 32 (Fig. 7), as described in section 2, different readings would be taken, even if the load remained the same, upon successive make and break of the sensing circuit. For instance, assume no lost motion and the making of a sensing circuit. The reading is taken a short time after the make of the sensing circuit under control of a contact spot on commutator 85. The motor is thereafter reversed. At the time the reading is taken, the follower contact 126 is above the sensing point. If there were no lost motion, shaft 32 and the commutator would reverse at the same time as the follower contact reversed. Before the follower contact return to the sensing point to break the sensing circuit, the same contact spot on commutator 85 which timed the taking of the previous reading would be past the brush position. A reading would be taken under control of a different contact spot on commutator 85 which would reach brush position after the break of the sensing circuit. Thus, even if the load had not changed, different readings would be taken if there were no lost motion between shafts 20 and 32. Accordingly, it is necessary for the purposes of double sensing, to provide the lost motion between shafts 20 and 32. The extent of lost motion is slightly more than two value steps. After the sensing circuit makes, as the follower contact and shaft 32 are moving in negative direction, a conditioning operation occurs when a spot on commutator 86 reaches brush position. A reading is taken when a following spot on commutator 85 reaches brush position. The reading spot on commutator 85 follows the conditioning spot in counterclockwise direction (Fig. 5). The shaft 32 continues rotating counterclockwise until the motor reverses. During the continued counterclockwise rotation, another contact spot on commutator 86, following the reading spot in counterclockwise direction, traverses brush position. The motor thereafter reverses, and the follower contact starts moving down, but the shaft 32 remains at rest because of the lost motion. If the load has not changed, the follower contact will disengage contact 110c at the same load point as it previously engaged contact 110c. The sensing circuit will break, the lost motion will be taken up at about the same time or a little before, and the shaft 32 will start rotating clockwise. The conditioning operation will then be timed by the contact spot, on commutator 86, to the right of the reading spot (as viewed in Fig. 5) and then the reading will be timed by the same reading spot which timed the reading after the previous make of the sensing circuit. In short, in double sensing and because of the lost motion, if the load remains the same, conditioning operations occur alternately under control of the spots on commutator 86 at opposite sides of the same reading spot on commutator 85. The lost motion thus compensates for the movement of the follower contact from its position past the make or break sensing point back to this sensing position.

The single and double sensing operations will be explained in detail subsequently in connection with the description of the circuits in section 7.

The range of travel of the load responsive rod 9 determines the distance which the micrometer screw 123 should move from the neutral or zero position. If the micrometer screw should move down past a position corresponding to the maximum positive position of rod 9, then a flange 124a on the micrometer barrel 124 will open lower limit contacts DL (Fig. 1). If the screw should move up past the position corresponding to the maximum negative position of the rod 9, the flange 124a will open upper limit contacts TL. The opening of either of the contacts DL and TL opens the circuit of motor M, as will be made clear in the subsequent circuit description (section 7).

4. *The angular motion follower means* (*Figs. 10 to 14*)

This type of follower is applicable to angularly movable means displaceable according to a variable. Means so displaceable may be found, for example, in weighing scales, testing machines, gages of various kinds, and in other measuring instruments. As with the linear motion follower means, the angular motion follower means will be associated with a register attachment for registering the value of angular displacement of the follower means from a zero position. The angular motion follower will constantly hunt, find, hunt, find, etc., the position of the angularly movable element displaceable according to a variable. Further, both negative and positive displacements of the element from a zero position will be followed and registered.

In the present case, the angularly displaceable element, to be followed, is electrically controlled to move in proportion to the displacement of an object on test. For this purpose, a self-synchronous motor system, comprising a transmitter motor and a receiver motor, is used. The transmitter is displaced coordinately with and in proportion to the displacement of the object and produces corresponding displacement of the receiver. In such motor systems, the transmitter and receiver are in stable equilibrium when the torque on the rotor of the receiver motor is zero. If either the transmitter or receiver be moved 360 degrees relative to the other, they are again in stable equilibrium relation. Assume the receiver and transmitter are in stable and, also, matching value relation. Now, if the transmitter or receiver be moved one or more revolutions with respect to the other, they are again in stable equilibrium relation but not in matching value relation. This could occur if the transmitter should move too rapidly for the receiver to follow, so that the transmitter would gain one or more revolutions on the receiver. A similar situation will arise if the power on the receiver is shut off and then the transmitter or receiver be moved through one or more revolutions before the power is again applied to the receiver. The receiver and transmitter would stay in matched value relation if the transmitter were to be limited to a movement of less than a complete revolution. However, it is desired to measure displacements of the object on test to a very small fraction; one-hundredth of a degree in the present case. In order that this be done with extreme accuracy, the transmitter will be moved in magnified relation to movement of the object; 36 to 1 in the present case. That is, one degree of displacement of the object will cause 36 degrees of displacement of the transmitter. Furthermore, it is desired to measure displacements of the object as high as 99.99 degrees. Therefore, the transmitter may move through a number of revolutions. Correspondingly, the receiver may move with the transmitter through a number of revolutions. Hence, under the conditions explained above, the receiver and transmitter could depart from matching value relation unless provisions were made to the contrary. Such provisions comprise a supplemental self-synchronous motor system which moves 3.6 degrees for each degree of displacement of the object; i. e., in 1 to 10 ratio to the other motor system. The system which moves in the smaller ratio to the object is called the course self-synchronous motor system, and the system which moves in the greater ratio to the object is called the fine system. The receiver of each system coacts with a follower. Normally, the follower of the fine receiver is in control of the movement of the register. But if the course receiver should move about 5 degrees relative to the course follower, the course follower will take over control of the movement of the register. The course motor system and follower will thereby prevent the fine receiver and follower from departing from matching value relationship to the fine transmitter and the object on test.

The self-synchronous motor system has a so-called unstable equilibrium condition when the receiver and transmitter are 180 degrees out of stable equilibrium position. The receivers could be uncoupled from the transmitters and then either the receivers or transmitters moved to produce unstable equilibrium condition. Upon re-coupling the receivers to the transmitters, the receivers might move in either clockwise or counterclockwise direction to stable equilibrium condition. It is desired, however, to move the receivers in the proper direction for bringing them into matching value, as well as stable, equilibrium position. With the receivers uncoupled from the transmitters, either the receivers or transmitters could be moved through one or more revolutions. Upon re-coupling the receivers to the transmitters, they should be moved in either clockwise or counterclockwise direction back to a matching value relation to the transmitters. Means, explained later in connection with the circuit description, are provided to produce movement of the receivers when they are re-coupled to the transmitters, in the proper direction from unstable equilibrium position or non-matching value stable position to matching value stable position.

The invention is not concerned with the structure of self-synchronous motor systems, per se, or with the means for moving the transmitters or the body on test. Accordingly, only the means at the receiving end are shown and will be described in detail.

Referring to Fig. 11, the fine and course receiving motors of the self-synchronous motor systems are designated FR and CR respectively. Their shafts 132 and 133 are electrically grounded by mercury contact means 134. Coaxial with and above the shafts 132 and 133, respectively, are the fine and course follow-up shafts 135 and 136, each of which is a hollow shaft. Shaft 135 carries a pair of gears 137 and 137*a* of which gear 137 meshes with a gear 138. A gear 138*a* is rigid with gear 138 and is meshed with a gear 138*b* fixed to shaft 136. The gear ratio is such that shaft 135 will move ten degrees for one degree of motion of shaft 136.

Gear 137*a*, on shaft 135, meshes with a gear 139 integral with gear 28*a* which is driven by a pinion 25 of a register attachment described in section 2. The register attachment has the gear 24 integral with pinion 25 and driven by gear 23 which is rigidly connected with the shaft 20 (see Fig. 4) by means of which the units order shaft 32 (also see Fig. 10) of the register is driven through the lost motion connection (see Fig. 7). The ratio of the gearing between the units order drive shaft 20 and the shaft 135 of the fine follow-up means is 100 to 1. That is, the units order shaft 32 will move in 100 to 1 ratio to the shaft 135. The shaft 135 will move 36 degrees for each degree of displacement of the body on test. Each step of value advance of the units order is its movement through 36 degrees. Since the units order is in 100 to 1 ratio to shaft 135, each step of the units order counts .01 of a degree of displacement of the body on test. A maximum angular displacement of 99.99 degrees of the body under test may be registered by the four register orders. Since the course follow-up shaft 136 is geared 1 to 10 to fine follow-up shaft 135, it will move 3.6 degrees for each degree of displacement of the body under test. It should be noted that the positive and negative directions of both follower shafts are their counterclockwise and clockwise directions, respectively.

Figure 12:
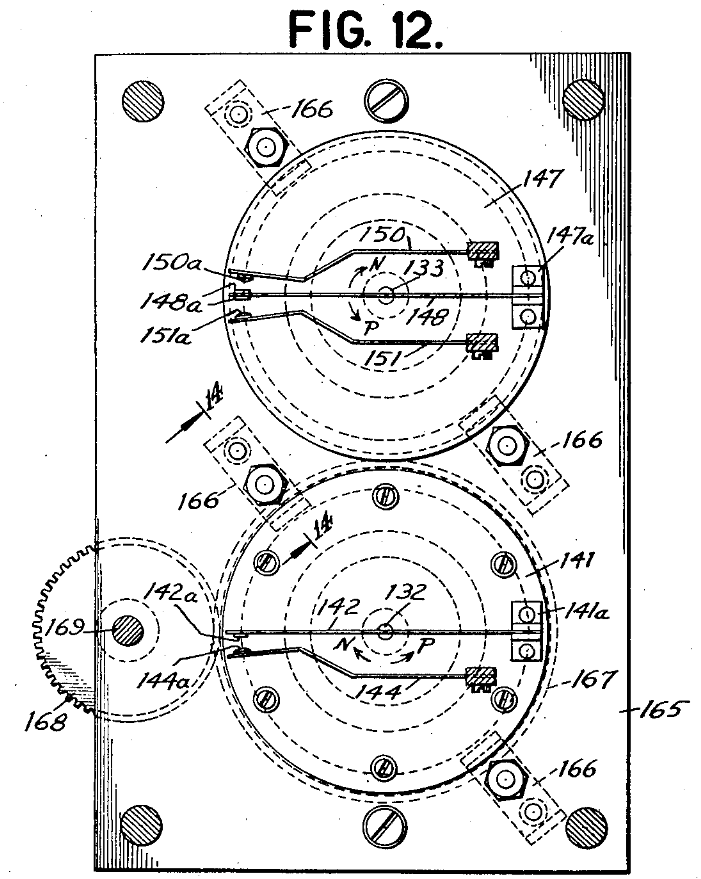
Fig. 12 is a section along lines 12—12 of Fig. 11.

The shaft 132 of the fine receiver FR carries at the upper end a thin disk 141 to the bottom of which is fastened an inertia ring 140 (see Figs. 11 and 12). The cover plate 141 carries a bracket 141a to which a contact blade 142 is anchored. The contact 142a on the blade 142 may be considered as equivalent to the contact 110c of the controller for the linear motion follow-up means (see Figs. 1 to 3).

The shaft 135 of the fine follow-up means is coaxial with and above shaft 132 (Fig. 11). At its lower end, shaft 135 carries a disk 143 of insulating material. Carried by the disk is a contact blade 144 with a contact 144a (Fig. 12) for cooperating with contact 142a. The contact 144a is equivalent to contact 126 of the linear motion follow-up means described in section 3. Engagement and disengagement of contacts 144a and 142a respectively make and break a sensing circuit which functions in the same way as the sensing circuit for the linear motion follow-up means. Briefly, upon clockwise travel of the fine follow-up means, contact 144a meets contact 142 and establishes the sensing circuit. Under control of the circuit, clearing of a previous reading is effected, the taking of a new reading is brought about, and then the motor reversal occurs. Before reversal of the shaft 135 occurs, the contact 144a travels past the make position and presses on the contact 142a to bend back the blade 142. The tendency for the shaft 132 to rotate is overcome by the inertia of the disk 140 and the other parts carried by the shaft. Meanwhile, successive contact spots on the commutators 86 and 85 (see Figs. 4 and 5) of the register attachment prepare for and time the taking of the reading from the register readouts. Upon counterclockwise travel of the fine follow-up means, the contact 144a separates from the contact 142a, breaking the sensing circuit. The breaking of the circuit initiates another reversal of the motor. Double sensing operation may be effected, if desired, whereby a reading will be taken in consequence of the break as well as the make of the sensing circuit. The lost motion drive to the units order shaft 32 of the register will serve the same purpose as for the linear motion follow-up means. A pair of stops 143a (Fig. 11) are adjustably attached to the disk 143 and are adapted to come into engagement with opposite sides of the bracket 141a to limit relative movement in either direction bteween shafts 132 and 135.

Shaft 135 carries at the upper end a slip ring 145 which is insulated from the shaft and wiped by a brush 145a which is carried by, but insulated from, a fixed block 146 (see Figs. 10 and 11) carried by top frame plate 170. A wire *w* passes through the shaft 135 and connects at opposite ends to the contact blade 144 and the terminal screw 145b screwed into the slip ring 145. This slip ring arrangement is provided so as to connect the fine follower contact into circuit in all rotative positions of the follower shaft.

The shaft 133 of the course receiver CR (Fig. 11) carries at the upper end a thin disk 147 on which is fixed a bracket 147a. Anchored to the bracket is a contact blade 148 provided with a two-sided contact 148a (see Fig. 12). Shaft 136 is hollow, coaxial with and above shaft 133. The lower end of shaft 136 carries an insulating disk 149 (Fig. 11) to which are adjustably fastened a pair of stop angle pieces 149a adapted to coact with opposite sides of the bracket 147a to limit relative movement between shafts 136 and 133. Carried by the disk 149 are a pair of contact blades 150 and 151 (Fig. 12) respectively provided with contacts 150a and 151a for coacting with opposite sides of contact 148a.

The upper end of shaft 136 (Fig. 11) carries a pair of separate slip rings 152 and 153 insulated from each other and from the shaft and respectively wiped by brushes 152a and 153a. Wires leading from the contact blades 150 and 151 pass through the hollow shaft 136 and connect to the terminal screws 152b and 153b respectively screwed into slip rings 152 and 153. The brushes 152a and 153a are carried by but insulated from a fixed block 154 mounted on top frame plate 170. One of these slip ring arrangements connects one of the blades 150 and 151 into circuit and the other slip ring arrangement connects the other of these blades into circuit in all rotative positions of the course follower shaft 133.

When the body on test is displaced sufficiently to cause about five degrees of movement of course receiver shaft 133, and concomitant displacement through about fifty degrees of the fine receiver shaft 132, the contact 148a moves into engagement with either the contact 150a or 151a, depending on the direction of movement of the shaft 133. Upon such engagement, means described in the subsequent circuit description come into operation for superseding the fine follower in the control of the sensing circuit and, thereby, of the drive motor M. It may be noted that under these conditions, the fine transmitter cannot move relatively to the fine receiver 180 degrees to unstable equilibrium or 360 degrees to stable but non-matching value relation. Movement of the fine transmitter through only about 50 degrees will be accompanied by movement of the course transmitter through about 5 degrees. The related movement of the course receiver will bring the course follower into control of the motor M. The fine follower thereby will be moved, along with the course follower. When the fine follower has moved a short distance, a stop 143a thereof engages bracket 141a, causing the fine receiver to move back into matching value, stable equilibrium position. When the course follow-up means has moved up to within about 5 degrees of the new position of displacement of the shaft 133, the fine follow-up contact 144a and coacting contact 142a take over control of the regular hunting operation.

Figure 10:
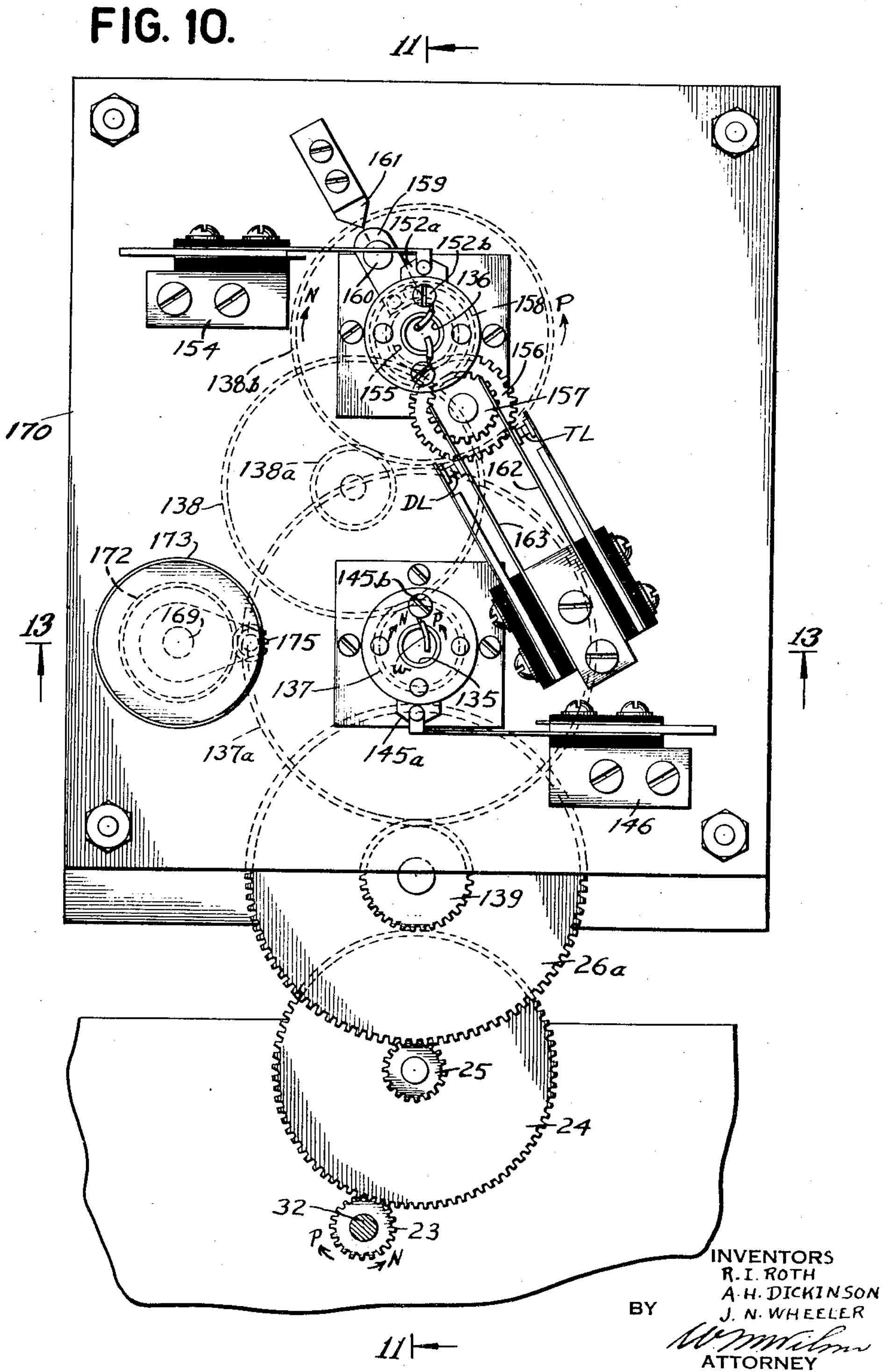
Fig. 10 is a top view of a portion of a gage unit which includes an angular motion follower.

Shaft 136 has pinned to it a pinion 155 (Figs. 10 and 11). Pinion 155 meshes with a pinion 156 rigid with a smaller pinion 157. Pinion 157 meshes with a pinion 158 free on shaft 136. Attached to pinion 158 is an index member 159 which carries a bumper 160 (see Figs. 10 and 11). When the scribe line on member 159 is directly opposite the arrow point of a fixed member 161 mounted on frame plate 170, both follow-up means are in zero position. The bumper 160, upon clockwise movement of the index member 159 (see Fig. 10) will strike a contact blade 162 to open the limit switch TL. Upon reverse movement of the index member, the bumper 160 will strike a contact blade 163 to open the opposite limit switch DL. These switches are equivalent to the similarly designated switches (Fig. 1) of the linear motion follower means. The drive ratio between shaft 136 and gear 158 is such that upon about 100 degrees of displacement, in either direction of the body on test, the bumper 160 will move far enough to open either switch TL or DL, depending on the direction of displacement. Operation of the follow-up means by the register motor M will thereupon be interrupted since it is not intended to indicate or follow displacements of the body on test exceeding 99.99 degrees in either direction from zero position.

Figure 13:
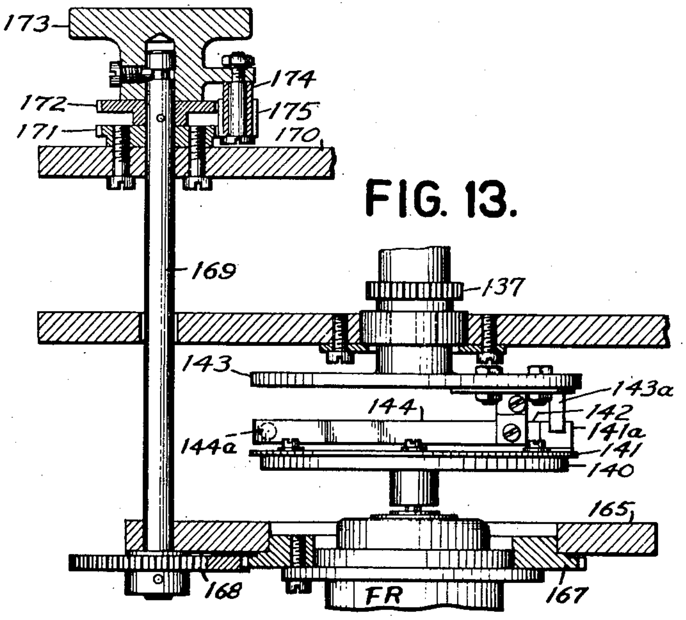
Fig. 13 is a section along lines 13—13 of Fig. 10.
Figure 14:
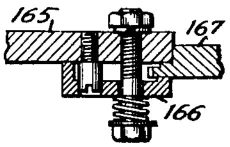
Fig. 14 is a section along lines 14—14 of Fig. 12.

The receiver CR is secured to a ring 164 which is clamped to the frame plate 165 (see Figs. 11 and 12) by means of a pair of clamp brackets 166 of a construction indicated in Fig. 14. The receiver FR is secured to a toothed ring 167 which is also clamped to the frame plate 165 by a pair of clamp brackets 166. Means are provided to turn ring 167, and the fine receiver FR carried thereby, in order to effect a zero adjustment of the fine receiver. Referring to Fig. 13, the ring 167 is meshed with a gear 168 fixed to the lower end of a shaft 169. Freely surrounding shaft 169 and fixed to the top frame plate 170 is a gear 171. A gear 172 is pinned to shaft 169 and located above the fixed gear 171. To the top of the shaft is keyed a hand knob 173 which carries a journal 174 for a pinion 175. The knob 173 is rotatable with respect to shaft 169 and the pinion 175 meshes with fixed gear 171 and with the gear 172 which turns with the shaft 169. Gears 171 and 172 have different numbers of teeth and together with pinion 175 constitute an epicyclic gear train whereby a large movement of the knob 173 produces a considerably smaller movement of the shaft 169. The gear 168 on the shaft 169 transmits movement of the shaft to the ring gear 167 to which the receiver FR is mounted. The gear ratios are such that each turn of the knob 173 produces about one tooth distance of turning movement of the ring gear 167 and the receiver FR. Thus, by turning the knob 173, the receiver FR, including its frame, armature, rotor and parts carried thereby, will be moved bodily.

Before the register attachment is mounted in cooperative relation to the angular motion follow-up means, the register orders are set at zero positions. The follow-up means is set in zero position by turning the gear 26a (Figs. 10 and 11) until the scribe line on index member 159 is in alinement with the point of the arrow-ended member 161. The register attachment is now mounted in place, with its pinion 25 in mesh with gear 26a. Both the follow-up means and the register are now in correct, coordinate zero relation.

In order to bring the receivers FR and CR into zero relation with respect to the follow-up means, their transmitters at the test station and the means for operating them are set in zero position. The operator at the follow-up station now turns the knob 173 to adjust the fine receiver FR bodily to a position in which its contact 142a is just in engagement with contact 144a. The clamp brackets 166 for clamping the ring carrier 164 of the course receiver CR to the frame plate 165 are loosened, and the course receiver turned bodily until the contact 148a is centrally positioned between contacts 150a and 151a. The registering, follow-up, and indicating means are now brought into operation. If a zero indication is not displayed, the operator turns knob 173 until the zero indication is brought into display. All the parts are then in their correct starting relationship.

5. *The recorder unit*

Figure 17:
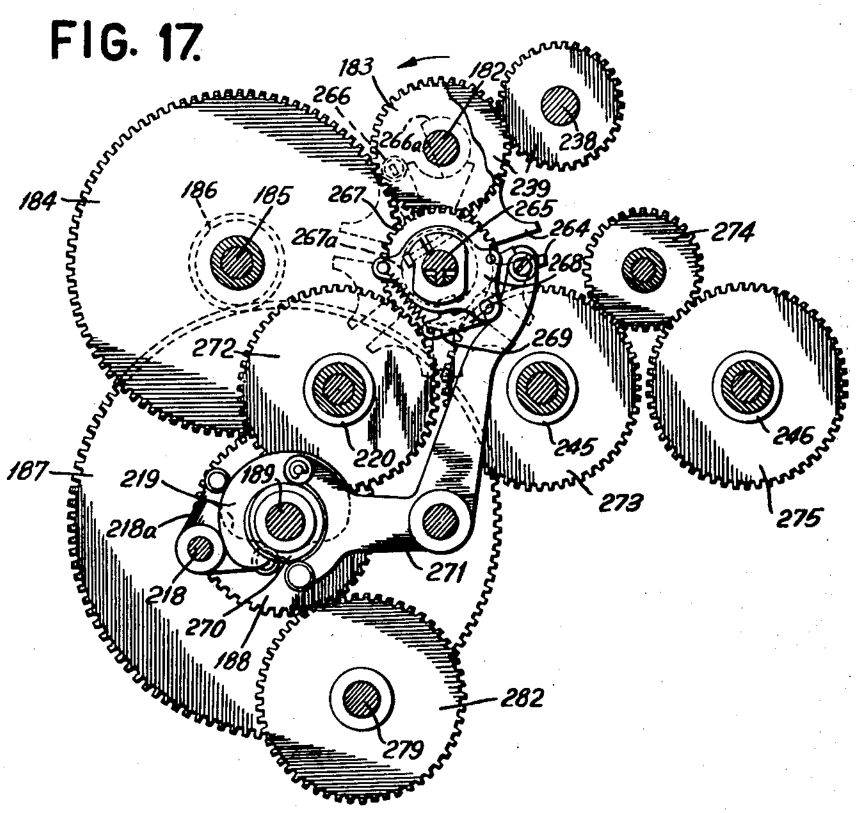
Fig. 17 is a detail view of gearing contained in the punch unit.
Figure 18:
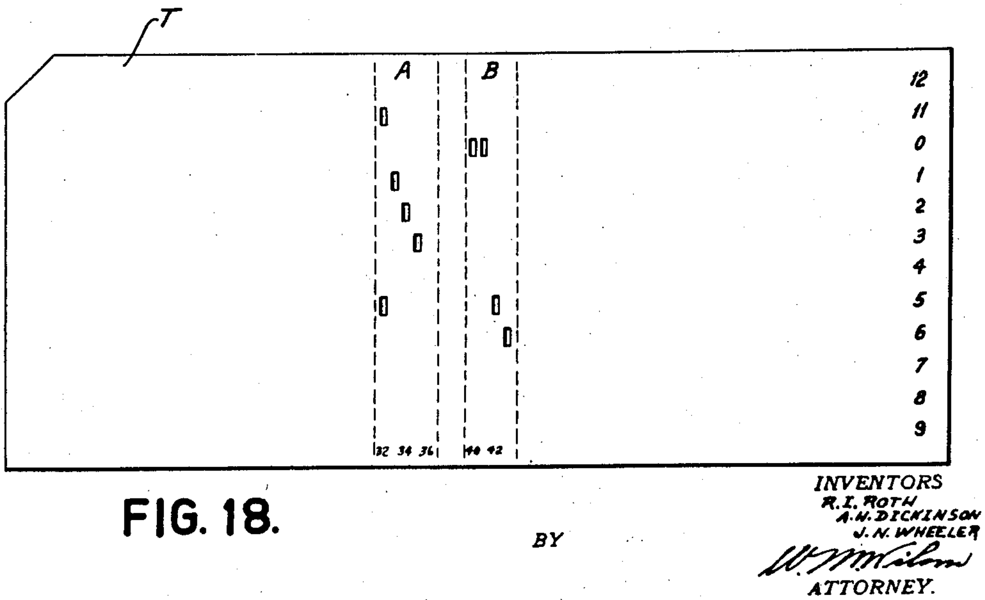
Fig. 18 shows a tabulating card punched by the punch unit.

As disclosed herein, readings taken from the registers may be permanently recorded by punching record cards T, such as the one shown in Fig. 18, with holes codally designating the measurements. Perforations in index positions 0 to 9 of a card column represent digits 0 to 9. A column may be punched in the X or 11 index position to designate the negative sign of a value recorded in a card field. It is preferred to use a recording unit of the type shown in Reissue Patent No. 21,133 to C. D. Lake, in Patent No. 2,355,389 to A. W. Mills et al, and in application Serial No. 434,773 of G. F. Daly, filed March 14, 1942, now Patent No. 2,448,781, issued September 7, 1948. The recorder unit is provided with a suitable drive motor (shown diagrammatically and designated DM in the circuit diagram, Fig. 19*a*). The motor, through a belt 180 and pulley 181 (Fig. 15) rotates a main shaft 182 (also see Fig. 17) on which is a gear 183 meshed with a gear 184 to drive a shaft 185. Pinion 186 on shaft 185 meshes with a gear 187 to rotate this gear and an attached gear 188, both gears 187 and 188 being freely mounted on a shaft 189. Gear 188 drives a gear 190 (Fig. 15) meshed with a gear 192 which through a gear 194 drives a gear 196 on a cam shaft 197 carrying a cam 198 for operating cam contacts CR. Shaft 189 on which gears 187 and 188 are rotatably mounted may be referred to as the card cycle shaft and is driven through one-revolution clutch means by gear 187. The clutch means includes an arm 199 on shaft 189 carrying a clutch dog 200 engageable in a notch of a clutch disk 201 fast to gear 187. Energization of a clutch magnet PCM releases the dog 200 to engage the notch in disk 201, establishing drive connection from gear 187 to shaft 189. A gear 202 on shaft 189 drives a gear 203 meshed with a gear 204 on a shaft 205. Shaft 205, through gearing 206 rotates a cam shaft 208 on which are cams 209 for operating certain of the cam contacts generally designated P.

A supply hopper 210 (Fig. 16) receives the cards T to be operated on in the recorder or receiving unit. The cards are placed in the hopper face down and with the "12" index position leading. A weight 211 is placed on top of the stack of cards. When the supply of cards is exhausted, the machine will stop as a result of the opening of hopper contacts PHC.

Figure 15:
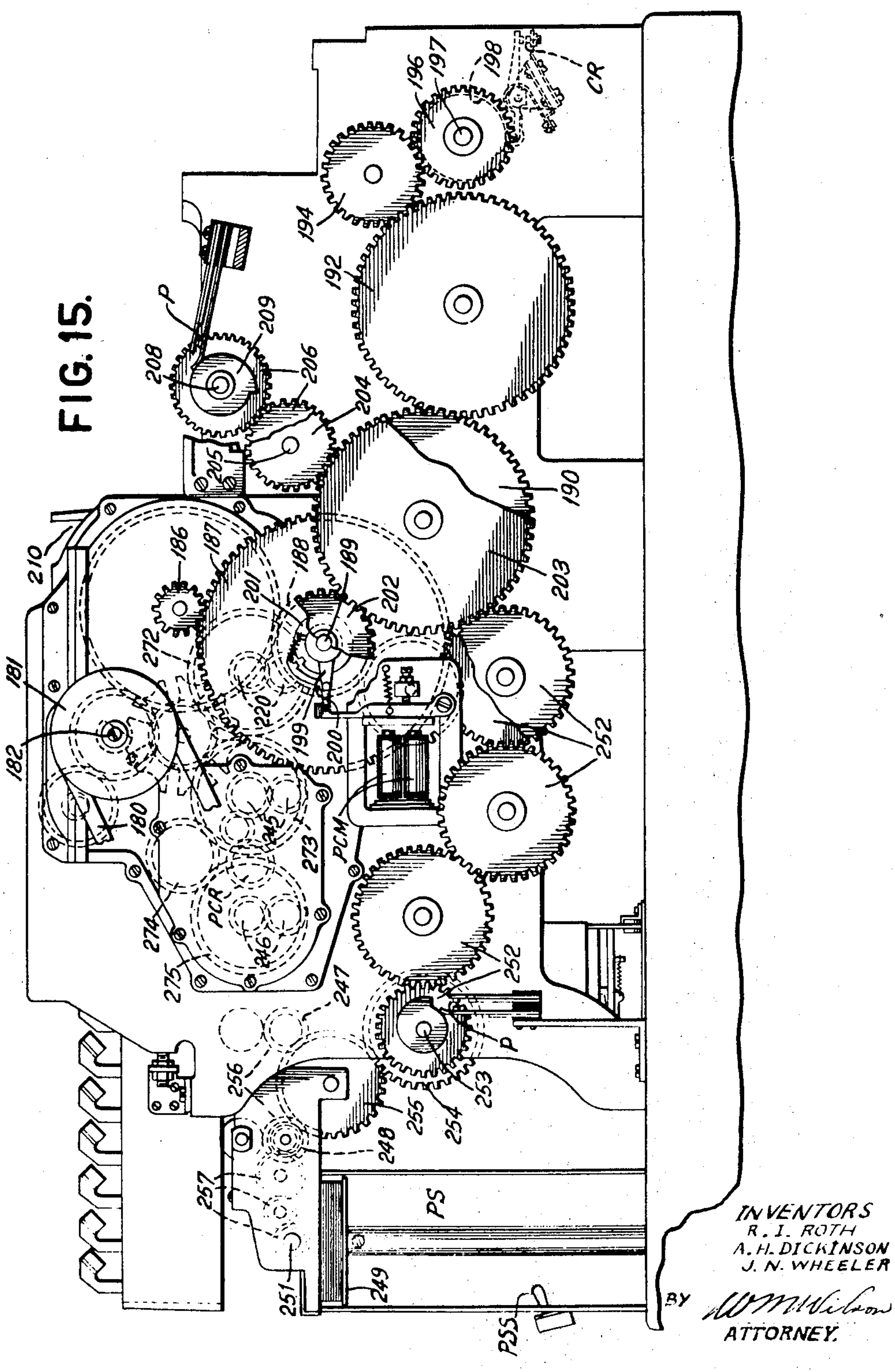
Fig. 15 is a side elevational view of the recording punch unit used herein.
Figure 16:
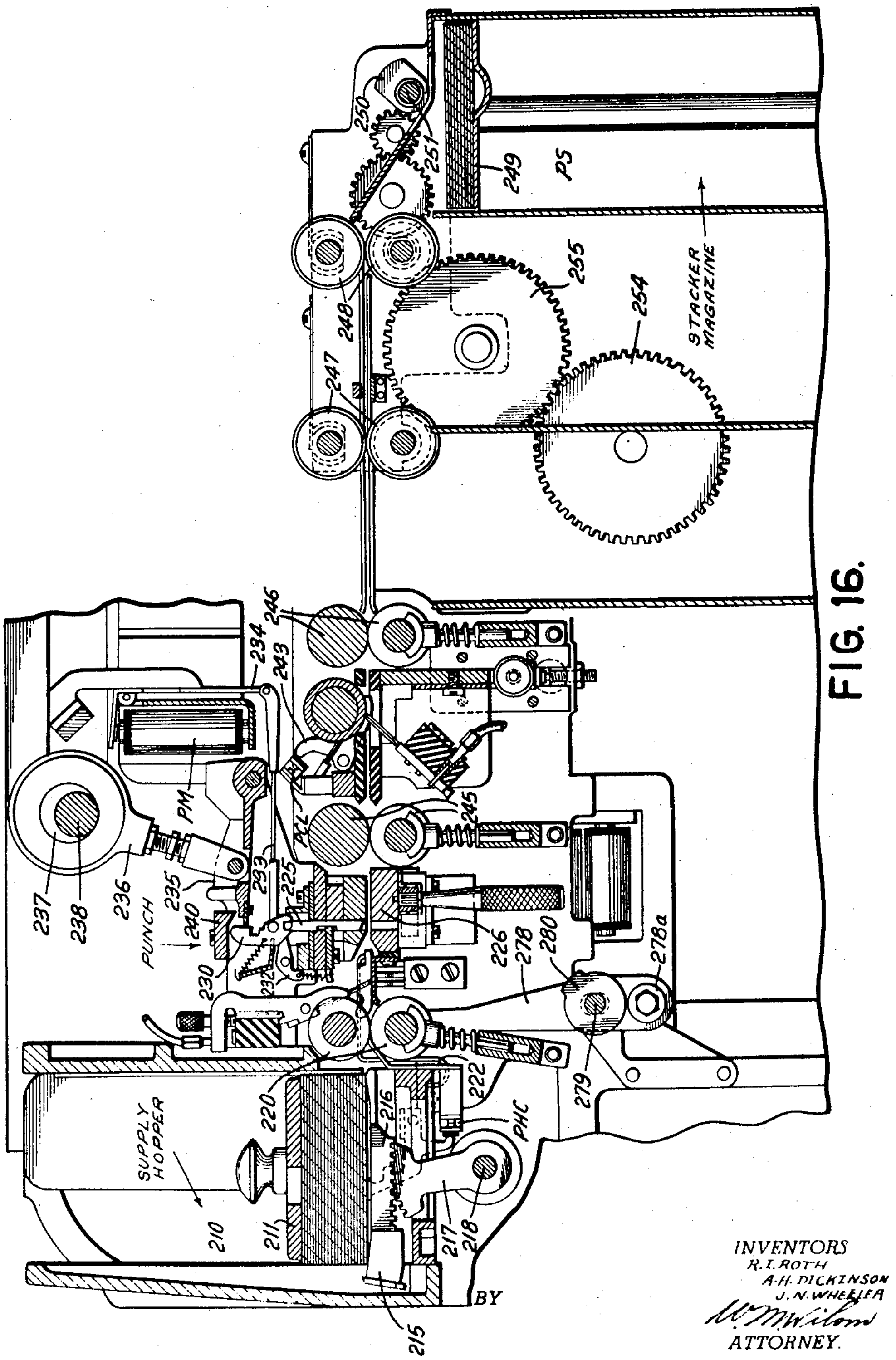
Fig. 16 is a side sectional view through the punch unit.

Card pickers 215 are carried by racks 216 meshed with gear sectors 217 fixed to a shaft 218. Card cycle shaft 189 carries complementary cams 219 (Fig. 17) acting on a two-armed lever 219*a* to oscillate shaft 218 and the gear sectors 217. The gear sectors reciprocate racks 216 and pickers 215. On their forward stroke, the pickers feed the bottom card from hopper PH to a first set of feed rolls 220 (Figs. 15 and 16). The card, as it is advanced by these feed rolls, rocks a lever 222 to close card lever contacts DCL, shown only in the circuit diagram, Fig. 19*a*.

The card then enters a punching station. Located at the punching station are punches 225, one for each card column, and a coacting die 226, The card will be fed intermittently to place the rows of index positions 12, 11, 0, 1, . . . 9 successively in punching position between the punches and die. Pivoted to the upper end of each punch 225 is an interposer hook 230 spring-urged anticlockwise against a spring-pressed stop cam 232. Hook 230 is connected by a link 233 to armature lever 234 of a punch magnet PM. Upon energization of a magnet PM, the related hook 230 is drawn towards the tip of an oscillatable punch operating frame 235. During the down stroke of this frame, the hook will receive the tip of the frame and the connected punch will be forced through the card. The cam 232 keeps the hook 230 in operative position as soon as the punch stroke starts, so that magnet PM may then be deenergized. Punch operating frame 235 is continually oscillated by connecting rods 236 from eccentric portions 237 of a shaft 238, driven by gearing 239 from main shaft 182 (Fig. 17). On the up stroke of frame 235, it restores the hook and punch to upper positions. A knock-off member 240 is provided for positively dislodging hook 230 from the punch-operating frame. There is one punch magnet PM, link 233, connected hook 230, and punch 225 for each card column. One or more of the punch magnets will be energized during each of successive cycle points of a card cycle to cause punching, in desired columns, of the index positions in the row of such positions then located in punching position. During successive cycle points, successive rows of index positions 12, 11, and 0 to 9 of a card T are under the punches, so that the punching will take place in index positions of one row, then in index positions of the next row, and so on.

As the card emerges from the punching means, it reaches a second set of feed rolls 245 which complete the feed of the card through the punching means and advance it to a third set of feed rolls 246. As the card feeds to the rolls 246, it operates on a card lever 243 to close the second card lever contacts PCL. The third set of feed rolls 246 advances the card to a set of feed rolls 247. The latter rolls bring the card to a set of eject rolls 248. Rolls 248 move the card to a stacker magazine PS where the cards stack up on the usual spring-elevated platform 249. Eject members 250 fixed to a shaft 251 complete ejection of the card into magazine PS. Eject elements 247, 248 and 250 are rotated by gearing from card cycle shaft 189. This gearing includes previously mentioned gear 203 (Fig. 15), driven by gear 202 on shaft 189. Gear 203 through gear train 252 rotates cam shaft 253. A gear 254 on this shaft acts through idler gear 255 to rotate the pinions 256 on the shafts of lower eject rolls 247 and 248. The shaft of lower rolls 248 operates through gears 257 to rotate the shaft 251 of eject members 250 (also see Fig. 16).

Shaft 253, referred to above, carries cams for operating still others of the cam contacts generally designated P. It should be noted that shafts 208 and 253 are driven by card cycle shaft 189 in one-to-one relation thereto. One such shaft also carries circuit breakers shown only in the circuit diagram, Fig. 19b, where they are designated CB. The brush of an emitter SP shown in the circuit diagram Fig. 19b, also is operated by one of these shafts.

When the stacker pocket is filled, the platform 249 operates the lever of a switch PSS to cause the machine to stop, as will be made clear in the circuit description.

Since the card is to be punched row by row the first three sets of feed rolls 220, 245, and 246 are intermittently driven my means such as disclosed in Reissue Patent No. 21,133. This means includes a Geneva gear 264 (Fig. 17) fixed to a shaft 265 and cooperating with a driving roller 266 and a locking hub 266a, both carried by gear 183 which is secured to main shaft 182. The Geneva gearing does not transmit drive to the first three sets of feed rolls except when the card cycle shaft 189 is in operation and for this purpose, clutch means is provided between the Geneva gear and a gear 267 from which drive is transmitted to these feed rolls. The clutch means between the Geneva gear and gear 267 comprises a single-notched collar 267a fixed to gear 267, both being free on shaft 265. Fastened to shaft 265 is a member 268 carrying a clutch dog 269 engageable in the notch of collar 267a to couple the gear 267 to Geneva gear 264 for common steps of rotational movement. When the card cycle shaft 189 is declutched and in home position, complementary cams 270 thereon act on a lever 271 to cause the upper end of the lever to hold the clutch dog 269 released from collar 267a, as a result of which the gear 267 will remain uncoupled from Geneva gear 264 and the first three sets of feed rolls will not operate. When the card cycle shaft 189 is in operation, complementary cams 270 act on lever 271 to permit the clutch dog 269 to couple the gear 267, each card cycle, to the Geneva gear. The main shaft 182 makes fourteen revolutions a card cycle and during a portion of each fourteenth part of the cycle, the roller 266 effects a step of rotational movement of the Geneva gear. With gear 267 coupled to the Geneva gear, it drives gears 272 and 273 fixed to the shafts of the upper feed rolls 220 and 245. Gear 273, through an idler 274, drives a gear 275 fast to the shaft of upper feed roll 246. The upper and lower feed rolls of each set are geared to each other as usual. Each step of movement of the Geneva gear 264, when gear 267 is coupled thereto, effects a step of rotational movement of the feed rolls 220, 245, and 246 to advance the card one index position row. The Geneva gear and these feed rolls idle during the punching operation occurring within a cycle point after which the feed rolls advance the card to bring the next index position row under the punches, and so on until the card has been completely punched.

Since card pickers 215 feed the card from the hopper by continuous movement while the first pair of feed rolls 220 are intermittently driven, means are provided to separate these feed rolls while the pickers are feeding a card therebetween. This means comprises arms 278 in the upper ends of which the shaft of the lower feed roll 220 is journaled. The arms 278 are slotted intermediately to allow a shaft 279 to pass therethrough. Cams 280 on shaft 279 act on rollers 278a at the lower ends of arms 278 to depress the arms and the lower feed rolls 220, separating them from the companion feed rolls while a card is being advanced therebetween by the pickers 215. Shaft 279 is continuously rotated through gear 282 from the continuously driven gear 188 (see Fig. 17).

6. *The indicating lamp bank*

The lamp bank in each gage unit is operated to visually show the amounts read out of the register. Each lamp bank includes light bulbs and character patterns selectively illuminated by the bulbs when lit. Fig. 19g shows the appearance of the face of a lamp bank, in connection with a gage unit B. There are four masks 295, one for each of the four orders, thousands (TH), hundreds (HD), tens (T), and units (U) orders. The masks are opaque except for the translucent character patterns. The masks for the units and tens orders each bear characters 9 to 0 and a decimal point above and to the right of the 9 character. The masks for the hundreds and thousands orders bear characters 9 to 0 and — and + signs, respectively. Behind each digit character, decimal point and sign character is a lamp L. The lamp circuits are shown in Fig. 19g in connection with a gage unit A. The lamp marked HI is behind the decimal point pattern in the units order mask 295 and is lit as long as the gage is operating in high range. The lamp marked LO is behind the decimal point pattern in the tens order mask and is continually lit when the gage is operating in low range which is one-tenth the high range.

7. *The circuits and operation of the gage units*

For purposes of the disclosure, an installation of two gage units A and B will be considered. Gage unit A is assumed to include a linear motion follower, while gage unit B is assumed to have an angular motion follower. The circuits for both units are generally similar. There are differences which flow from the differences in the type of follower. To avoid duplication, the circuits of gage unit A only are shown and described completely, and only the distinctive circuits for the gage unit B will be shown and described. Corresponding parts in the circuits of gage units A and B are given like reference characters but may be differentiated by prefixed letters A and B.

Common voltage supplies are provided for all the gage units of the same installation. One side of each voltage line is ground. The "hot" sides of the supply lines are connected to various binding posts of the units. Referring to Fig. 19e, the "hot" sides of the voltage lines are connected to binding posts as follows:

220 v. D. C. to A70 and B70;
110 v. A. C. to A68 and B68;
6.3 v. A. C. to A66 and B66;
25 v. A. C. to A67 and B67;
110 v. D. C. to A69 and B69; and
—45 v. D. C. to A63 and B63.

The posts A64 and B64 are connected to ground.

Referring to Fig. 19g, the "hot" side of a 2.5 v. A. C. line is connected to posts A65 and B65 to supply power for the lamps L of the indicating lamp banks.

For convenience, the binding posts and various wires which receive voltage from the voltage lines may be referred to as the voltage posts and voltage wires. For instance, post A69 (Fig. 19e) may be called the 110 D. C. post and wire 304 may be called the 110 D. C. wire.

Each unit may be brought into operation separately by closing a hand switch. The circuits and operation of unit A now will be described.

To place unit A in operation, the operator closes switch AS (Fig. 19e). A circuit is thereby established for a master relay A19, as follows: the 110 D. C. post A69, relay A19, switch AS, to ground wire 300. If double sensing is to be effected, a switch AD also is closed.

Upon the energization of relay A19, it closes several contacts (Fig. 19e) for the following purposes.

Contacts *f* connect the 25 A. C. post A67 to a wire 301 which leads to the heaters of electron tubes V1 to V5 (Fig. 19d) and V6, V7, and V8 (Fig. 19c), all of the vacuum type 25L6.

Contacts *g* connect the 6.3 A. C. post A66 to a wire 302 which leads to the heaters of electron tubes V9 and V10 (Fig. 19c) and to a thermostatic switch 303 (Fig. 19e). The tube V9 is a vacuum tube of the type 6SJ7. The tube V10 is a gaseous discharge tube of the type 2050.

Contacts *j* of the relay A19 connect the 220 D. C. post A70 to a wire 305 which connects to various relays.

Contacts *h* connect the 110 A. C. post A68 to a wire 306 which is in the motor circuit.

Contacts *k* connect the 110 D. C. post A69 to a wire 307 connected to negative reading control relays N (Fig. 19d).

Contacts *m* connect post A69 to wire 304 which leads to various relays and to the screen grids SG of tubes V1 to V9.

Contacts *i* connect —45 D. C. post A63 to a wire 308 to which connections are made from control grids of the tubes V1 to V10.

It may be noted that changes in the status of the tubes V1 to V9 will depend on changes in the potential of their control grids CG, since their screen grids remain at constant potential. The cathodes of all the tubes V1 to V10 are connected to ground. When the control grids of tubes V1 to V9 are raised to ground potential, these tubes are conductive. When the control grid of tube V10 is raised to ground potential, it is at the firing potential and the tube will ignite if the anode circuit is closed.

There are several relays of the duo-wound type. This is a well-known type of relay which has two coils on a common core. One of the coils is usually called the pick up coil and the other is called the hold coil, respectively designated P and H. Both coils act on a common armature to operate common armature contacts. The circuits may be arranged to cause coil P to be energized temporarily so as to close contacts of the relay for establishing the circuit of the hold coil H. The coil H will then maintain these contacts closed, and the circuit of the hold coil will remain in effect until other contacts in the circuit are opened. Digit relays D and sign relays DS are of the duo-wound type and their circuits are so arranged that their coils P (Fig. 19d) will be energized briefly to establish the circuits of their hold coils H (Fig. 19e). Relay A8 (Fig. 19d) also is of the same type and its coil P will be momentarily energized to establish the circuit of coil H. Relay A9 and relays N (Fig. 19d) are of the duo-wound type, but the circuits of their coils H are not established by contacts closed as a result of prior energization of their companion coils P.

There are four orders of digit relays D, one for each order of the register, to manifest the quantities read out of the register. These relays are of the duo-wound type. Their pick up coils P (Fig. 19d) will be energized selectively when tubes V1 to V5 are rendered conductive in a manner explained later. The energized coils P of the digit relays will close associated contacts *ad* to establish the circuits of their companion hold coils H (Fig. 19e). There are ten digit relays in each order, corresponding to digits 0 to 9. They will be energized selectively in accordance with the digit positions of the corresponding orders of readout commutators (hereinafter called readouts) of the register. These were explained in section 2 and the construction of a readout may be understood from Figs. 4 and 9. The readouts are diagrammatically shown in Fig. 19*d* and generally designated RO. When the brush 42 of a readout is on a particular digit segment 37 (see Fig. 9), the readout may be said to be in this particular digit position. For example, with the brush 42 on the 0 segment, the readout is said to be in 0 position. When the register contains a positive quantity, the readouts are in digit positions corresponding to the quantity, and the related digit relays will be energized. When the register contains a negative quantity, the readouts are in digit positions corresponding to the 9s complement of the negative quantity. Hence, in order to manifest the true negative quantity, the digit relays which are in 9s complementary relation to the readout positions will be energized. For this reason, the pick up coils P of the digit relays are connected through the normally closed sides of negative relay contacts to the corresponding digit segments, and upon reversal of these contacts will be connected to the complementary digit segments. The relays N—TH, N—HD, N—T, and N—U control the status of the negative relay contacts in orders TH, HD, T, and U, respectively. Relay N—U also controls the status of contacts *a* which determine whether the coil P of plus sign relay +DS or the coil P of minus sign relay —DS shall be energized.

The register moves past zero into its negative range when it is running in the negative direction. While the motor is going in this direction, the switch 96 (Fig. 5) is closed. A circuit will then be made, as soon as power is on wire 304, through a relay A23 and switch 96 (see Fig. 19*d*). When the register moves, in the negative direction, past zero, contacts 78 and 81 (Fig. 6) successively close as was described in section 2. Upon the closure of contacts 78, which follows the closure of negative direction relay contacts A23*b*, circuits are closed through coils P and H of relays N—U, N—T, N—HD, and N—TH. It may be mentioned that these coils have an equal number of turns but coil H winding has a greater resistance than the coil P winding. The circuits of coils P of these N relays extend from 110 D. C. wire 307 through parallel normally closed contacts N*b* and condensers C5, C6, C7, and C8, the coils P, and via contacts 78 and A23*b*, to ground. The circuits of coils H extend from wire 307 through these coils, and via contacts 78 and 81, to ground.

The resistance of each coil P of relays N is considerably smaller than the resistance of each coil H of the relays N. In practice, it has been found suitable to make the resistance of coil P about 32 ohms and the resistance of coil H about 600 ohms. Accordingly, the current through coils P is considerably higher, upon closure of the circuits, than through coils H. Therefore, coils P will be energized much more rapidly than the coils H. The high current flow through coils P, if maintained, would overheat these coils and possibly burn them out. For this reason, the condensers C5, C6, C7, and C8 are in the circuits of the coils P. Each of these condensers has a capacity of about 15 microfarads. Upon the closure of the circuits through coils P, the current will rise almost instantly to the peak value, rapidly energizing these coils and starting to charge up the condensers C5, C6, C7, and C8. As the condensers charge up, the current decays exponentially, until the condensers are fully charged. When the condensers are fully charged, they automatically interrupt current flow to the coils P. The condensers thus serve to limit the duration of high current flow in coils P to a brief, initial period and then to cut off the current flow entirely. On the other hand, the current flow through coils H of relays N is maintained as long as contacts 78 and A23*b* or 81 remain closed. The energization of coils P occurs rapidly, for reasons explained above, and these coils quickly start shifting the various contacts of relays N. Before coils P of these relays lose their power, coils H are fully energized and effective to maintain the contacts of the relays in their shifted status.

The purpose of contacts N*b* in the circuits of coils P of relays N is to by-pass the condensers C5, C6, C7, and C8 until coils P(N) have been effectively energized. In the absence of the contacts N*b*, there is a possibility that as a result of vibration of contacts 78 when the higher levels of cam 75 (Fig. 6) move into engagement with the follower 76, the condensers might be charged in spurts while coils P(N) fail to energize. The condensers would then prevent energization of coils P(N) after contacts 78 settled down to closed status.

Contacts 81 close shortly after contacts 78 have closed. The contacts 81 are in shunt with contacts A23*b* and provide a circuit path to ground for coils H of relays N should the contacts A23*b* open as a result of the register being reversed from negative to positive direction of movement. Accordingly, coils H of the relays N will remain energized until both contacts A23*b* and 81 are open and will hold the contacts of the relays in shifted status until then. Both contacts A23*b* and 81 are opened when the register returns to a positive, registration which can occur only while the register is moving in positive direction. With the register moving in positive direction, switch 96 is open and relay A23 (Fig. 19*d*) is deenergized. Consequently, contacts A23*b* are open. As explained in section 2, when the register moves back to a positive registration, contacts 81 and 78 open successively. When contacts 81 open, the circuits of coils H (also of relays N and condensers C5, C6, C7, and C8) are broken. The condensers thereupon discharge in their local circuits which may be traced from one side of each condenser through coils H and P to the opposite side of the condenser. Since the discharge current flows in opposite directions through these coils, their fluxes oppose each other, causing a quick restoration to normal of their associated contacts. The discharge of the condensers enables the coils P to be energized again when the register returns to a negative registration.

Assume that the register contains plus amount 9876 and that tubes V1 to V5 are conductive. Digit relays D9, D8, D7, and D6 in orders TH, HD, T, and U, respectively will be energized. Also, the relay +DS will be energized. The circuit of coil P (Fig. 19*d*) of relay D9 in order TH extends from the 220 D. C. wire 305 through this coil, the upper side of contacts 9 of relay N—TH, the 9 digit position of the readout RO of the order TH, and through tubes V1 to V5, to ground. The circuits of the coils P of the other digit relays are similarly made. Coil P of relay +DS is energized by a circuit from wire 305 through this coil, the upper side of contacts *a* of relay N—U, and through tubes V1 to V5, to ground. The energized P coils close associated contacts *ad* (Fig.

19e) to establish the circuits of their companion H coils. For example, with contacts *ad* of relay D9 of the thousands order TH closed, the coil H of this relay is energized by a circuit from wire 304 through this coil H, the related contacts *ad*, to a wire 320, thence via contacts A14*bu* (which are closed in normal operation, for reasons explained later), and via normally closed contacts A10*bd*, to ground. If the register contains a negative amount, then relays N—TH, N—HD, N—T, and N—U all are in energized status. The coils P of the digit relays having complementary relation to the digit positions of the register readouts, and the coil P of relay —DS will be energized. For instance, if the thousands order is in 9 digit position, the circuit of coil P of relay DO of this order will be routed via the lower side of contacts O of relay N—TH to the 9 segment of the readout RO of this order. Also, the relay —DS will be energized because the lower side of contacts *a* of relay N—U will be in closed status.

As shown in Fig. 19*g*, the digit relays D and sign relays DS control associated contacts *bu* in the lamp circuits. If any one of the relays D is in energized condition, its contacts *bu* are closed and the related digit lamp is lit, illuminating the character pattern in front of the lamp. For instance, if relay D9 in the thousands order is energized, the circuit of the 9 lamp L in order TH will be closed as follows: from the 2.5 A. C. post A65 via contacts A12*au* and A13*au* (the closure of which will be explained later), contacts *bu* of relay D9 of order TH, the 9 lamp L in order TH, and thence to ground. The + or — lamp L will be lit only if a significant digit relay in at least one order has been energized and if, in addition, the related relay +DS or —DS has been energized. The circuit of lamp +L is made, for example, as follows: from post A65 via contacts A12*au* and A13*au*, thence via any one of the normally closed contacts *bc* of the zero relay DO of the several orders, and via the contacts *bu* of relay +DS, through the + lamp L, to ground.

When the gage unit is to operate in its high range, a hand switch RS (Fig. 19e) is in the position shown and connects one side of a relay AH to ground. The other side of the relay is connected to the 110 D. C. wire 304. Relay AH will thus remain energized while the gage unit is in high range. When the gage unit is to operate in its low range, switch RS is moved to its reverse position where it connects a relay AL to ground. The other side of this relay is connected to wire 304. Hence, the relay AL remains energized as long as the gage unit is in low range. The energized one of relays AH and AL closes its contacts *bu* (Fig. 19*g*) to establish the circuit of the related lamp HI or LO to illuminate the decimal point in the units or tens order mask 295.

The closure of thermostatic switch 303 (Fig. 19e) requires about 30 seconds after power has been placed on the 6.3 v. A. C. wire 302, this being the approximate time required to heat the thermostatic element to operating temperature. By reason of this delay, motor M is prevented from running until the cathodes of the electron tubes V1 to V10 have heated up to proper temperature. Further, by reason of this delay, a proper sequence of operations is brought about in either single or double sensing. The sequence in double sensing will be explained later. The sequence in single sensing will be discussed first.

7A. *Single sensing*

In single sensing, the sequence is such that if follower contact 128 is initially engaged with controller contact 110c (Fig. 3), the motor will run in a direction to cause the follower contact 128 (see Fig. 1) to descend and leave controller contact 110c, after which the motor will reverse and cause the contact 128 to move up and engage contact 110c. Only then will it be possible to take a reading. If the contacts 128 and 110c are initially open, the motor will run in a direction to cause the follower contact 128 to rise and engage contact 110c, after which a reading may be taken. The manner in which the proper sequence of operations for single sensing is brought into effect is explained below.

1. As soon as power is applied to the 110 D. C. wire 304, a pair of relays A14 and A15 (Fig. 19e) are energized. These relays are connected to ground via a motor governor switch M*g* of a known type. The switch M*g* will open when the motor reaches a chosen speed. Since the switch is initially closed, the circuit of relays A14 and A15 will be established upon application of potential to wire 304.

2. A relay A10 (Fig. 19e) will be operated as soon as power is on the wire 304. The circuit for relay A10 is from wire 304 via the relay, the normally closed side of contacts A2*bu* and condenser C11 to ground. When the condenser is fully charged, it automatically shuts off current flow to relay A10. Thus, relay A10 will be energized only momentarily and its contacts A10*bd* (Fig. 19e) will open for a brief interval to break the circuits of coils H of the digit and sign relays D and DS, respectively. In this manner, the previous reading, if any has been taken, is cleared. A new reading is to be taken and in order that coils H of the digit and sign relays may be energized according to the new reading, relay A10 is energized only momentarily so as to cause contacts A10*bd* to open only long enough to clear out a previous reading. The condenser C11 remains charged and prevents re-energization of relay A10 even though contacts A2*bu* remain in normal status. In order to prepare relay A10 to be energized again, it is necessary that condenser C11 first be discharged. This will occur upon the shifting of contacts A2*bd* subsequently. After the condenser has been discharged, contacts A2*bu* must reclose to enable relay A10 to be energized. The condenser thus provides for closely controlled timing of the operation of relay A10. One phase of the timing is the time at which the condenser is allowed to discharge, and the other phase is the time at which the circuit through the relay and discharged condenser may again be closed.

3. As soon as power is on wire 304, a circuit is established from the wire through coil P of a duo-wound relay A8 (Fig. 19*d*), the normally closed sides of contacts A4*a*, A7*b*, and A5*b*, and a condenser C9, to ground. The energization of relay coil P (A8) is momentary since the condenser when fully charged stops current flow in the circuit. The utility of the condenser in this circuit in connection with coil P (A8) is similar to that of condenser C11 in connection with relay A10 (paragraph 2). Upon energization of coil P, it closes contacts A8*au*, and a circuit is completed from wire 304, through relays A22, A21, A20, and A8 (H), and via contacts A8*au*, A9*b*, and A3*b*, to ground. In single sensing, the circuit of the relays A8 (H), A20, A21, and A22 will break when contacts A3*b* are opened. Relay A22 determines the direction in which the motor M shall run. If the relay is energized, the motor M will be controlled to run in the positive direction in which it causes the follower to descend. If the relay is deenergized, it controls motor M to run in the opposite, negative direction to cause the follower to rise.

4. At the start, follower contact 126 (Fig. 3) may or may not be engaged with controller contact 110*c*. The coaction of these contacts determines whether or not a sensing circuit for raising the potential of the control grid of tube V9 (see Fig. 19*c*) shall or shall not be established. The control grid CG of the tube V9 is connected via a resistor 310 to an intermediate point of a voltage divider 311 between the —45 D. C. wire 308 and ground. This connection is effective, when contacts 126 and 110*c* are not engaged, to apply sufficient negative bias to the grid to render the tube V9 non-conductive. When contacts 126 and 110*c* are engaged, the grid of tube V9 is connected to ground by one of several possible paths which will be explained later. With the grid of tube V9 at ground potential, the tube is in conductive status. The anode of tube V9 connects through a suitable resistance to the 220 D. C. wire 305. The anode also connects to a resistor 312 which terminates at the —45 D. C. wire 308. Resistor 312 is tapped by a wire 313 which connects through suitable grid resistors to the grids of tubes V7 and V8. When the tube V9 is in conductive status, its anode is only slightly above ground potential and the point of resistor 312 tapped by the connection to the grids of tubes V7 and V8 is at such negative potential as to maintain these tubes at cut-off. When tube V9 is in non-conductive status, its anode potential is high enough to raise the grid potential of tubes V7 and V8 to cathode potential. The tubes V7 and V8 are then conductive, allowing relays A1, A2, A3, and A4 to be energized by circuits extending from the 220 D. C. wire 305 through these relays and tubes to ground. In short, when follower contact 126 is disengaged from controller contact 110*c*, the tube V9 is at cut-off, the tubes V7 and V8 are in conductive status, and the relays A1, A2, A3, and A4 are energized; when the contacts 126 and 110*c* are engaged, tube V9 is in conductive status, tubes V7 and V8 are in non-conductive status, and relays A1, A2, A3, and A4 are deenergized. It is understood, also, that operations 1, 2, and 3 will occur before the relays A1, A2, A3, and A4 can be energized, even if the contacts 110*c* and 126 are initially disengaged, because it requires time for the heaters of the tubes V7 and V8 to heat up to operating temperature.

4*a*. Assume that contacts 110*c* and 126 are initially engaged. Relay A8 is energized while relay A1 is still deenergized. Accordingly, a sensing circuit will make, connecting the control grid of tube V9 (Fig. 19*c*) to ground, via contacts A1*b*, the shifted contacts A8*b*, and the contacts 110*c* and 126. As soon as the tube V9 reaches operating temperature, the tube will become conductive and, hence, tubes V7 and V8 will remain at cut-off, and relays A1 to A4 will remain deenergized. Since relay A3 remains deenergized, its contacts A3*b* (Fig. 19*d*) stay closed, and relays A8, A20, A21, and A22 remain energized.

4*b*. Assume, instead, that contacts 110*c* and 126 are initially disengaged. Then, as soon as tubes V7 and V8 attain operating temperature, relays A1 to A4 are energized. Relay A3 opens contacts A3*b* and breaks the circuit of relays A8, A20, A21, and A22.

It may be understood now from items 4*a* and 4*b* that there are two alternative conditions. One (4*b*) is that contacts 126 and 110*c* be initially disengaged, whereby relays A1 to A4 will be energized and will open the previously closed circuit of relays A8, A20, A21, and A22. The other condition (4*a*) is that contacts 126 and 110*c* are initially engaged, whereby relays A1 to A4 will remain deenergized, and relays A8, A20, A21, and A22 continue in energized status (see paragraph 3).

5. About 30 seconds after operations 1, 2, and 3 have occurred, thermostatic switch 303 (Fig. 19*e*) closes. Provided the follower is between limits, as manifested by both upper and lower limit contacts TL and DL (Fig. 1) being closed, relays A11, A12, and A13 are energized. The circuit for these relays is from wire 304 via switch 303, thence through relays A11 and A12 and switch TL, and in parallel through relay A13 and switch DL, to ground. Relay A12 closes its contacts A12*bu* (Fig. 19*c*) in series with read control relay A5. Thereafter, at the proper time, the read control relay may be energized. Relays A11 and A13 close their contacts A11*b* and A13*ad* (Fig. 19*e*) to allow motor circuits to be established. Relays A12 and A13 close contacts A12*au* and A13*au* (Fig. 19*g*) so that the lamp bank circuits may be established. Relay contacts A11*a* and A13*bu* (Fig. 19*c*) close so that a recording circuit may be established.

6. Since contacts A11*b* and A13*ad* have now closed, circuits through motor M (Fig. 19*e*) may be established. The circuit for running the motor in positive direction will close if relay A22 is in energized status, which will be the case if the contacts 126 and 110*c* are initially engaged. On the other hand, if these contacts are initially separated, relay A22 will be in deenergized status (see paragraph 4) and the circuit for running motor M in negative direction will be completed. The circuit for running motor M in positive direction extends from the 110 A. C. wire 306 via contacts A13*ad*, the upper side of contacts A22*b*, resistor 309, the motor armature, the upper side of contacts A22*a*, and through the motor field, to ground. The circuit for running motor M in the negative direction extends from wire 306, via A11*b*, the lower side of A22*a*, the motor armature, resistor 309, the lower side of A22*b*, and the motor field, to ground.

7*a*. Further considerations dependent on condition 4*a* will be discussed. Under condition 4*a*, the contacts 126 and 110*c* are initially engaged, whereby relays A1, A2, A3, and A4 (Fig. 19*c*) remain deenergized and relay A8(H), A20, A21, and A22 remain energized. Since relay A22 is energized, motor M will run in the positive direction (see paragraph 6), driving the follower contact 126 downwardly and actuating the register orders in their positive, count increasing direction. During descent of contact 126, it leaves contact 110*c* so that tube V9 non-conductive (see paragraph 4), and relays A1, A2, A3, and A4 (Fig. 19*c*) become energized. Contacts A3*b* (Fig. 19*d*) open to break the circuit of relay A8(H), A20, A21, and A22. With relay A22 now deenergized, motor M will be controlled to run in the negative direction (see paragraph 6), driving the follower contact upwardly, and actuating the register orders in their respective, count decreasing direction. Nothing further happens in single sensing until contact 126 reengages contact 110*c*.

7b. Considerations dependent on condition 4b will now be discussed. Under condition 4b, contacts 126 and 110c are initially disengaged, relays A1, A2, A3, and A4 are energized, and relays A8(H), A20, A21, and A22 are deenergized, and motor M is running in the negative direction, driving the follower contact 126 upwardy. Since the motor driven shaft 20 (Figs. 4 and 7) is rotating in the negative direction, the contacts 96 (Fig. 5) are closed, establishing the circuit of relay A23 (Fig. 19d). Since relay A8 is deenergized and relay A23 is energized, the sensing circuit will now make upon engagement of contact 126 with contact 110c as follows: the control grid CG of tube V9 (Fig. 19c), contacts A23c, the left side of contacts A8b, and contacts 110c and 126 to ground. Tube V9 will become conductive and tubes V7 and V8 non-conductive, whereby relays A1, A2, A3, and A4 will be deenergized. Reversal of the motor circuit will not occur as yet, however, because coil P of relay A8 (Fig. 19d) cannot again be energized until the condenser C9 has been discharged (see item 3). Condenser C9 will not be discharged until contacts A5b shift. Thus, relay A5 must be energized to allow condenser C9 to discharge and must be again deenergized to allow the circuit of coil P of relay A8 to be made. It is clear, then, that relay A5 must be energized and deenergized in succession before the motor can be reversed to run in the positive direction, to cause downward travel of the follower. Meanwhile, relay A8 remains deenergized although relay A1 is deenergized and its contacts A1b (Fig. 19c) have reclosed. To assure maintenance of the control grid of tube V9 at ground potential and of the tube in conductive state, so that relays A1, A2, A3, and A4 shall remain deenergized until a reading has been taken, a shunt circuit for the control grid is provided. This shunt circuit extends from the control grid via contacts A1b and A8ad to ground. Hence, even if the contacts 126 and 110c, after engaging, should disengage owing to vibration or to sudden ascent of the contact 110c, the shunt circuit will maintain the control grid at ground potential until a reading has been taken and relay A8 has been energized to break contacts A8ad. Relays A1, A2, A3, and A4, therefore, will remain deenergized until the proper time has arrived for the relays A8, A20, A21, and A22 to be energized, which is after the reading has been taken.

8. Relay A21 is in deenergized status while the motor is running in negative direction (paragraph 6). The motor is then driving contact 126 upwardly. When the contact 126, on its rise, meets contact 110c, a sensing circuit is made (paragraph 7b), causing relay A1 to deenergize. Hence, relays A1 and A21 are both in deenergized status only when the contact 126 is moved upwardly and upon such movement engages contact 110c. With both relays A1 and A21 simultaneously deenergized, the first contact spot, on commutator 86, which reaches brush position after relay A1 has been deenergized, is effective to bring about energization of the relay A5. This is accomplished as follows: The control grid of gas tube V10 (Fig. 19c) is raised to firing potential by a connection via grid resistor 314, the normally closed sides of contacts A21b and A1a, and the control commutator 86, to ground. Assuming all the digit relays D and the sign relays DS have properly cleared (see item 2), their contacts bd (Fig. 19c) are all closed. Contacts A12bu are now in closed status (see item 5) and contacts A14au also are in closed status (see item 1). Accordingly, the anode circuit of tube V10 is now in closed condition and the tube fires since the control grid has been raised to firing potential. As the tube fires, the relay A5 is energized by the circuit extending from the 220 D. C. wire 305, through this relay, the contacts A12bu, A6ad, A14au, the parallel rows of contacts bd of relays DS and D, resistor 315, thence through tube V10 to ground.

9. Relay A5 now closes contacts A5au (Fig. 19d) in series with digit commutator 85 (also see Fig. 4) and also shifts contacts A5b, allowing condenser C9 (Fig. 19d) to discharge. Before coil P of relay A8 can be energized to bring about reversal of the motor, the contacts A5b must return to normal status. Relay A5 will not deenergize, however, until a proper reading has been taken under control of commutator 85. Such a reading is one in which a digit relay D in each order and also one of the sign relays DS has been energized. This must occur in order that all the parallel paths provided by their contacts bd (Fig. 19c) in the circuit of relay A5 shall be open. If any one of these paths remains closed, relay A5 will not be deenergized, even though the contact spots of control commutator 86 are off the brushes. This is because the gas tube V10, once fired, will remain conductive until the anode circuit is broken. By this means, the deenergization of relay A5 is properly timed.

10. When the contact spot, of digit commutator 85, following the spot of commutator 86 under control of which relay A5 has been energized, reaches brush position, the control grids of tubes V1 to V5 are raised to ground potential. The circuit path for this purpose is from ground, through the commutator 85, contacts A5au, the upper side of contacts A18ad, and thence via grid resistors to the control grids of tubes V1 to V5. With these tubes now in conductive status, the digit relays D and sign relays DS are selectively energized in the manner already explained. As a result, relay A5 is deenergized. Thus, a reading must be taken before relay A5 may be deenergized and cause reversal of the motor to occur. When relay A5 deenergizes, contacts A5b (Fig. 19d) return to normal, allowing the circuit of coil P of relay A8 to make. Relays A8, A20, A21, and A22 will then be energized, and the motor will be reversed. The follower will now be moved down until contacts 126 and 110c disengage. When this occurs, tube V9 (Fig. 19c) is driven to cut-off, and relays A1, A2, A3, and A4 are energized. As a result, relays A8, A20, A21, and A22 are deenergized and the motor is again reversed, causing the follower to again move upwardly.

11. With regard to relay A10 (Fig. 19e) which was initially momentarily energized by the charging circuit for condenser C11 (see item 2), it cannot be energized again until contacts A2bu and A2bd have been reversed in status and then returned to normal status. This will occur only upon successive energization and deenergization of relay A2. If contacts 126 and 110c are initially engaged, then relay A2 is in deenergized status and will not be energized until the contacts break. Upon energization of relay A2, contacts A2bu and A2bd shift and condenser C11 discharges via contacts A2bd (Fig. 19e). The relay A10 will not be energized again, however, until relay A2 is again deenergized and contacts A2bu return to normal. But relay A2 will not be deenergized until contacts 126 and 110c again make, which will occur only after a reading has been taken, as was explained in item 10. Under the assumed condition, then, the initial clearing operation (see item 2) for the digit and sign relays precedes the taking of the first reading, as is proper. If it is assumed that contacts 126 and 110c initially are disengaged, then relay A2 is in energized status and contacts A2bd are shifted to allow condenser C11 to discharge. The relay A2 will be deenergized when contacts 126 and 110c make. When this occurs, contacts A2bu return to normal, and relay A10 is again momentarily energized. The digit and sign relays will thereby be cleared a second time before the first reading is taken. Thereafter, the sequence of operations is such, in single sensing, that relay A10 is momentarily energized after each break and successive make of the contacts 126 and 110c, whereby each reading will be cleared when the conditions for taking a new reading have been satisfied and just before the new reading is taken.

To sum up, the sequence of operations for single sensing, assuming normal operating conditions have been attained, and starting with contacts 126 and 110c out of engagement is as follows:

*Single sensing sequence*

A. Contact 126 is below and out of engagement with contact 110c, relays A1, A2, A3, and A4 (Fig. 19c) are energized and relays A8, A20, A21, and A22 (Fig. 19d) are deenergized; motor M is running in negative direction for driving the register orders in count decreasing direction and is driving the follower contact 126 upwardly.

B. Contact 126 meets contact 110c, establishing the sensing circuit and, in consequence, relays A1, A2, A3, and A4 are deenergized (see paragraph 7b).

C. Relay A10 is momentarily energized, its contacts A10bd (Fig. 19e) open, and the previous reading is cleared (see paragraphs 2 and 11).

D. Relay A5 (Fig. 19c) is energized (see paragraph 8).

E. Condenser C9 (Fig. 19d) is discharged owing to contacts A5b shifting (see paragraph 9).

F. A new reading is taken under control of contacts A5au (Fig. 19d) and the digit commutator 85 (see paragraph 10).

G. Relay A5 is deenergized (see paragraphs 9 and 10).

H. Coil P of relay A8 (Fig. 19d) is momentarily energized (condenser C9 meanwhile being charged), owing to contacts A5b returning to normal (Fig. 19d), and coil H of relay A8, and relays A20, A21, and A22 are then energized (see paragraph 10).

I. The motor M is reversed so that it is running in the positive direction and driving the follower down (see paragraphs 6 and 10).

J. Contacts 126 and 110c break, and relays A1, A2, A3, and A4 (Fig. 19c) are energized (see paragraph 10).

K. Condenser C11 is discharged (see Fig. 19e) owing to the shifting of contacts A2bd (see paragraphs 2 and 11).

L. Relays A8, A20, A21, and A22 are deenergized because contacts A3b (Fig. 19d) open (see paragraph 4b).

M. The motor is reversed to run in the negative direction and drive the follower up (see paragraphs 6 and 10). This completes the single sensing sequence, since step A has again been reached.

7B. *Double sensing*

In double sensing, readings are taken each time the sensing circuit makes or breaks. To set the gage unit A for double sensing, the operator, besides closing switch AS, also closes switch AD (Fig. 19e). As soon as potential is applied to wire 304, the double sensing master relay A16 is energized via switch AD.

12. The relay A16 closes contacts A16au (Fig. 19c) whereby relay A5 may be energized upon the break of the sensing circuit. Relay A5 will be energized upon the make of the sensing circuit in exactly the same way as in single sensing. Briefly, the tube V10 will be triggered upon connection of the control grid of the tube to ground via the normal sides of contacts A21b, A1a, and the first contact spot on commutator 86 which reaches the brush 88 after the sensing circuit makes. A reading will be taken under control of commutator 85 (Fig. 19d) after contacts A5au have been closed. The relays A8 (H), A20, A21, and A22 will then be energized and the motor reversed to move the follower in positive direction. The follower contact 126, while moving in the positive direction, leaves contact 110c, breaking the sensing circuit. Thereupon, relay A1 is energized. With both relays A1 and A21 simultaneously energized, and with double sensing master relay A16 also energized, a triggering circuit for tube V10 is established under control of commutator 86. This triggering circuit extends from ground to the control grid via the first contact spot of commutator 86 which reaches the brush after the break of the sensing circuit, thence via the left side of contacts A1a, the now-closed contacts A16au, and the left side of contacts A21b. A reading will then be taken under control of commutator 85 (Fig. 19d) since contacts A5au have been closed. Thus, in double sensing, read conditioning relay A5 (Fig. 19c) is energized both upon the breaking and making of the sensing circuit and a reading is taken each time the relay is energized.

13. The double sensing master relay A16, when energized, also closes contacts A16ad (Fig. 19e). This enables the clearing relay A10 to be energized upon the breaking of the sensing circuit. The relay A10 is energized upon the making of the sensing circuit in the same way as in single sensing (see paragraph 11). Briefly, the relay is momentarily energized as condenser C11 is charged by a circuit extending via the normally closed side of contacts A2bu. Upon the breaking of the sensing circuit, relay A2 is energized and shifts contacts A2bu and A2bd. Condenser C11 discharges via shifted contacts A2bd. At the same time, relay A10 is momentarily energized by a circuit extending via the shifted side of contacts A2bu, now-closed contacts A16ad, and a condenser C10. The condenser C10 functions in the same way as condenser C11 (see paragraph 2). Upon the next make of the sensing circuit, the relay A2 is deenergized and contacts A2bu and A2bd return to normal. Condenser C10 discharges via the normally closed side of contacts A2bd, while relay A10 is again energized via the normally closed side of contacts A2bu and the condenser C11. Thus, in double sensing, relay A10 is energized momertarily each time the sensing circuit makes or breaks. Upon its energization on the break of the sensing circuit, it clears the reading taken on the preceding make of the sensing circuit. Upon its energization on the make of the sensing circuit, it clears the reading taken on the preceding break of the sensing circuit.

14. Double sensing master relay A16, when energized, closes contacts A16bu (Fig. 19d) which shunt out the contacts A3b. During single sensing, the circuit of relays A8 (H), A20, A21, and A22 is broken upon the opening of contacts A3b, which occurs as a result of the break of the sensing circuit. During double sensing, the circuit of these relays is broken upon the opening of contacts A9b, which will occur after a reading has been taken as a result of the break of the sensing circuit. In single or double sensing, after a reading has been taken as a result of the make of the sensing circuit, coil P (A8) is energized momentarily while condenser C8 is charged. The contacts A8au close and establish the circuit of relays A8 (H), A20, A21, and A22. As relay A22 is energized, the motor is reversed to its positive direction and follower contact 126 is moved downwardly. In single sensing, when the contact 126, on its descent, leaves contact 118c, the relay A3 is energized and opens its contacts A3b, breaking the circuit of relays A8 (H), A20, A21, and A22, whereby the motor is reversed to its negative direction. Since relay A5 has not been energized, during single sensing, upon the break of the sensing circuit, the contacts A5b do not shift and condenser C9 remains in charged status. The relay A4 has been energized in consequence of the break of the sensing circuit and has shifted contacts A4a. As a result, a circuit path is closed from wire 403 via coil P (A9), the shifted side of contacts A4a and the normal sides of contacts A7b and A5b to the condenser C9. But in single sensing, the condenser C9 is still in charged status, preventing current flow through coil P (A9). Thus, coil P (A9) is not operative during single sensing. It is operative during double sensing because relay A5 is energized upon the break of the sensing circuit, causing a reading to be taken, and deenergized when this reading has been properly taken. Upon energization of relay A5, the contacts A5b shift and condenser C9 is discharged. Upon the deenergization of the relay A5, following the taking of the reading, contacts A5b return to normal condition. Since condenser C9 has been discharged, it allows current to flow momentarily in the circuit of coil P (A9) which extends via the shifted side of contacts A4a. Thus, in double sensing, condenser C9 is discharged upon the break as well as upon the make of the sensing circuit, allowing the coil P (A9) to be energized momentarily after a reading has been taken on the break of the sensing circuit, and the coil P (A8) to be energized momentarily after a reading has been taken on the make of the sensing circuit. When coil P (A9) is energized, it breaks the circuit of relays A8 (H), A20, A21, and A22, and in consequence of deenergization of relay A22, the motor is reversed to its negative direction. When coil P (A8) is energized, it establishes the circuit of relays A8 (H), A20, A21, and A22, whereby the motor is reversed to its positive direction.

15. There is a time lag between the taking of a reading and reversal of the motor. This time lag results from the time necessary for relay A5 to deenergize after a proper reading has been taken, for coil P (A8) or P (A9) to be energized, for relay A22 to be energized or deenergized, and for the momentum of the motor driven parts to be dissipated. Though the time lag is extremely short, it allows shaft 32 to move further after the reading spot, on commutator 85, reaches brush position until at least the next conditioning spot traverses the brush position. Shaft 32 may move still further and successive contact spots on commutators 86 and 85 may traverse their brush positions after a reading has been taken, but a second reading will not be taken because relay A5 has been deenergized as a result of the taking of the first reading. Relay A5 cannot be energized again until this reading has been cleared which cannot occur until the follower has been reversed and another sensing operation (make or break of the sensing circuit) has occurred. Thus, only a single reading will be taken as a result of each sensing operation. This is true of single sensing as well as double sensing. In single sensing, clearing operation will occur only upon each make of the sensing circuit following the break thereof. Hence, relay A5 may be energized only upon each make of the sensing circuit and when a reading is taken, it will be deenergized and remain so until the sensing circuit breaks and makes again. In double sensing, clearing occurs upon each break as well as each make of the sensing circuit. Hence, relay A5 may be energized upon the make of the sensing circuit, then deenergized in consequence of the reading, and not energized again until the sensing circuit has broken. It will then be deenergized upon the taking of a reading and remain so until the sensing circuit again makes. Thus, only a single reading can be taken upon each make or break of the sensing circuit in double sensing and only a single reading can be taken upon each make of the sensing circuit in single sensing.

16. Upon reversal of the motor, shaft 20 and follower contact 126 start moving in the reverse direction, but units order register shaft 32 remains stationary until the lost motion has been taken up. This lost motion is slightly more than two value steps, and its extent is based upon the following considerations. Suppose at the time the follower contact reaches the sensing point and causes a sensing operation to occur, the trailing portion of a contact spot on commutator 86 is crossing the brush position. The sensing operation must result in a change of status of relays A1, A2, A3, and A4. The relay A2 must upon its change in status, initiate energization of clearing relay A10, and the reading must be cleared before the anode circuit, via relay A5 of tube V10 can be closed. Only then can the tube be triggered by firing potential applied to its control grid via a spot on commutator 86. The shaft 32, to which the commutators are fixed, is traveling at fairly high speed and if the trailing portion of a contact spot on commutator 86 is crossing the brush position as the sensing circuit makes or breaks, it may be ineffective to apply firing potential to tube V10 by the time the anode circuit of the tube is closed by the clearing of the previous reading. Shaft 32 continues to rotate in the same direction until another contact spot on commutator 86 traverses its brush position, whereupon tube V10 is triggered, and relay A5 is energized. Shaft 32 continues rotating in the same direction and the following spot on commutator 85 times the taking of a reading. Rotation of shaft 32 should still continue in the same direction until at least the contact spot, on commutator 86, following the reading spot traverses brush position. This is necessary in order that if the load should remain the same, the latter spot on commutator 86 should time the conditioning operation following the return of the follower contact to the sensing point. Upon return of the follower contact to the same sensing point, another sensing operation will occur, the conditioning operation should occur under control of the conditioning spot on commutator 86 following the reading spot in the previous direction of travel of the shaft 32, and then a reading should be taken under control of the same reading spot as the one which timed the previous reading. It will be seen that under the assumed condition, the minimum travel of shaft 32 and the follower contact in one direction, after the follower contact reached the sensing point, is approximately two value steps. Upon reversal of the follower contact, it will return to the sensing point after the same extent of movement, equivalent to about two value steps. A sensing operation will occur, and the conditioning operation must take place under control of the contact spot on commutator 86 which followed the reading spot in the previous direction. Thus, this spot on commutator 86 must not move out of brush position until the follower contact has returned, through about two value steps, to the sensing point. This result is obtained by providing the lost motion of about two value steps between the follower and the shaft 32. It does not matter if the lost motion should be greater than this minimum of about two value steps since this will insure that the proper conditioning spot shall remain in brush position until the sensing operation has been completed. Further, it does not matter if the follower and shaft 32 overtravel the sensing point by more than the extent of lost motion. The lost motion will then be taken up before the follower contact returns to the sensing point, and the shaft 32 will be returned to the same position as though the overtravel had been equal to the lost motion. It does not matter if the follower and shaft 32 overtravel the sensing point by less than the extent of lost motion provided the overtravel is sufficient to cause the contact spot, on commutator 86, following the reading spot, to traverse brush position. In that case, the follower contact will return to the sensing point and a sensing operation will occur before the lost motion is taken up, so that the proper conditioning spot on commutator 86, will be effective. It is desirable, however, to provide an overtravel of about three value steps in order to take care of the possibility of the load changing, between successive sensing operations, in the same direction as that in which the overtravel occurs. For example, assume that the follower contact is traveling upwardly, meets the contact 110c and makes the sensing circuit. The shaft 32 is then in counterclockwise rotation and under control of successive spots on commutators 86 and 85, the conditioning and reading operations occur. Shaft 32 continues in counterclockwise rotation and say, two more conditioning spots traverse the brush position. Meanwhile, the follower contact continues to rise. Assume that after the reading was taken, the load suddenly decreases, so that the contact 110c rises and separates from the follower contact 126 before reversal of the motor to its positive direction occurs. Reversal of the motor to positive direction then occurs upon energization of relays A8 (H), A20, A21, and A22. Contacts A8*ad* (Fig. 19*c*) open and since contacts 126 and 110c have already separated, the sensing circuit is broken. Relay A1 thereupon is energized and since relay A21 also is in energized status, conditioning relay A5 will be energized under control of the conditioning spot on commutator 86, which last traversed the brush position while shaft 32 was previously rotating counterclockwise. A new reading will then be taken under control of the reading spot, on commutator 85, following the latter conditioning spot, in clockwise direction, after the lost motion is taken up. In short, a reading will be taken before the register has returned, in clockwise direction, to its previous reading position, and, therefore, the new reading will be less than the previous reading, consistent with the fact that the load has decreased after the taking of the previous reading. In the same manner, if the follower contact is moving down, breaks the sensing circuit to initiate the taking of a new reading, and the load then increases, the next reading will show an increase in load because the sensing circuit will make again sooner than if the load had remained the same. It is desirable, for these considerations, to provide an overtravel beyond the sensing point of about three value steps, or enough for two conditioning spots, following the reading spot, to traverse the brush positions of the commutators.

The sequence in double sensing is such that if the contact 126 is initially engaged with the contact 110*c*, the motor will drive the contact 126 downwardly and a reading will be taken as a result of the break of these contacts. If the contact 126 is initially disengaged from contact 110*c*, a reading will be taken after which the contact 126 will be driven upwardly. As in single sensing, as soon as power is on wire 304, relays A14 and A15 (Fig. 19*e*) are energized (paragraph 1); clearing relay A10 is momentarily energized while condenser C11 is charged (paragraph 2); and the relay coil P (A8) is energized while condenser C9 (Fig. 19*d*) is charged and then relays A8 (H), A20, A21 and A22 are energized (paragraph 3). The stick circuit of these relays, during double sensing, will not break until relay contacts A9*b* open, as previously explained. If the contact 126 is initially engaged with contact 110*c*, then the relays A1, A2, A3, and A4 (Fig. 19*c*) remain deenergized as in single sensing (see paragraph 4*a*). When relays A11, A12, and A13 (Fig. 19*e*) then become energized (see paragraph 5), the motor will be set running in the positive direction (paragraph 6). The contact 126 is driven down and upon separating from contact 110*c*, the sensing circuit breaks and relays A1, A2, A3, and A4 become energized (see paragraph 7*a*). In double sensing, the relay A5 (Fig. 19*c*) is then energized under control of commutator 86 (see paragraph 12), clearing relay A10 (Fig. 19*e*) is energized (paragraph 13), condenser C9 (Fig. 19*d*) is discharged, a first reading is taken, the coil P (A9) is energized, and the circuit of relays A8 (H), A20, A21, and A22 is broken whereupon the motor is reversed to its negative direction. If the contact 126 is initially disengaged from contact 110*c*, then relays A1, A2, A3, and A4 (Fig. 19*c*) are energized as in single sensing (paragraph 4*b*). Condenser C11 (Fig. 19*e*) is discharged and relay A10 momentarily energized while condenser C10 is charged. Since both relays A1 and A21 are simultaneously in energized status, the relay A5 will be energized under control of commutator 86, condenser C9 (Fig. 19*d*) will be discharged, a first reading will be taken, and then coil P (A9) energized, breaking the circuit of relays A8 (H), A20, A21, and A22. The negative direction motor circuit will make as soon as relay A13 (Fig. 19*e*) is energized (see paragraphs 5 and 6).

The double sensing sequence will now be briefly summarized. Assume normal operating conditions have been attained and that contact 126 is moving upwardly and has not yet reached contact 110c.

*The double sensing sequence*

Steps A to J are the same as in the Single sensing sequence.

A. Relays A1 to A4 (Fig. 19c) are energized, relays A8 (H), A20, A21, and A22 (Fig. 19d) are deenergized, and motor M is running in negative direction.

B. Contact 126 engages contact 110c, whereupon relays A1 to A4 are deenergized.

C. Relay A10 (Fig. 19e) is momentarily energized to clear out the previous reading.

D. Relay A5 (Fig. 19c) is energized under control of the first spot of commutator 86 which reaches the brush 88 after the making of the sensing circuit.

E. Condenser C9 (Fig. 19d) discharges, owing to the shifting of contacts A5b.

F. A new reading is taken under control of the contact spot on the commutator 85 (Fig. 19d) following the right conditioning spot in negative or counterclockwise direction (Fig. 5).

G. Relay A5 is deenergized.

H. Coil P of relay A8 and their coils A8 (H), A20, A21, and A22 (Fig. 19d) are energized.

I. Motor M is reversed to run in the positive direction, driving contact 126 downwardly. The units order shaft 32 remains at rest owing to the lost motion between the motor driven shaft 20 and the shaft 32 (see Fig. 7).

J. Contact 126, on its descent, disengages contact 110c, causing relays A1, A2, A3, and A4 to be energized.

The following steps mention operations peculiar to double sensing.

K. As in step K of the Single sensing sequence, condenser C11 is discharged upon the shifting of contacts A2bd (Fig. 19e). At the same time, contacts A2bu shift to place the clearing relay A10 in circuit with condenser C10. Relay A10 is momentarily energized, clearing out the previous reading (note paragraph 13).

L. The relay A5 is energized under control of the first contact spot on commutator 86 which engages its brush 88 after the sensing circuit breaks.

M. Contacts A5b (Fig. 19d) shift, discharging condenser C9.

N. A new reading is taken. It should be noted that the motor is now rotating in the positive direction, and driving shaft 20 clockwise (see Fig. 7). If the load has not changed since step F, the same reading spot, of commutator 85, which timed the taking of a reading resulting from the previous make of the sensing circuit would now time the taking of the next reading. If the load has changed since the previous reading was taken (step I), then a different contact spot of commutator 85 may time the taking of the new reading.

O. Relay A5 is deenergized.

P. Coil P of relay A9 (Fig. 19) is energized as condenser C9 is charged (see paragraph 14). Contacts A9b open, breaking the circuit of coils A8 (H), A20, A21, and A22.

Q. Motor M is reversed to run in the negative direction. The lost motion between shafts 20 and 32 (Fig. 7) allows the shaft 32 to remain stationary until the shaft 20 and follower contact 126 have moved in the negative direction the equivalent of substantially two value steps. The motor is now running in negative direction, relay A1 to A4 are energized (see step J) and coils A8 (H), A20, A21, and A22 are now deenergized (see step P). Thus, the conditions of step A have been produced again, completing the double sensing sequence.

16C. *Out of limit conditions*

If the follower contact 126 moves upwardly past its negative limit; contacts TL (Fig. 1) open as explained in section 3. If the follower contact moves downwardly past its positive limit, contacts DL open. In the first case, relays A11 and A12 (Fig. 19e) are deenergized. In the second case, relay A13 is deenergized. Out-of-limit condition will be signaled to the operator by sustained extinction of the lamp bank as a result of the opening of either contacts A12au or A13au (Fig. 19g). The negative direction circuit of the motor M will be broken by the opening of contacts A11b (Fig. 19e) if the follower rises past its negative limit. The positive direction circuit of the motor will be broken by the opening of contacts A13ad if the follower descends past its positive limit. To restart normal operation, the operator must return the load responsive means into the range of the follower.

17. Assume that the load on the scale has been reduced to a negative amount which exceeds the negative limit of the follower. This may occur while the follower contact 126 is moving in either direction. If the follower contact is moving down, then the reversal of its movement occurs in the normal manner (see step M of the Single sensing sequence and step Q of the Double sensing sequence).

17a. Considering single sensing, the follower contact 126 may rise past its upper, negative limit while step A of the Single sensing sequence is being performed. Before then, a reading was taken (step F), condenser C9 (Fig. 19d) was charged (step H), relays A1, A2, A3, and A4 (Fig. 19c) were energized (step J), condenser C11 (Fig. 19e) was discharged (step K), and relays A8, A20, A21, and A22 (Fig. 19d) were deenergized (step L). When the follower contact 126 exceeds its negative limit, contacts TL (Fig. 1) open, and relays A11 and A12 (Fig. 19e) are deenergized. Contacts A12au (Fig. 19g) reopen to prevent the lighting of the lamp bank. Contacts A11b (Fig. 19e) reopen and break the negative direction circuit of the motor which thereupon stops. Contacts A12ad (Fig. 19c), connected to the control grid CG of tube V9 reclose. Contacts A12bu (Fig. 19c) reopen to prevent energization of read conditioning relay A5. Contacts A12bd (Fig. 19d) reclose to prepare for the subsequent energization of relays A8, A20, A21, and A22. To restart operations, the operator increases the load on the scale to bring the controller contact 110c down into engagement with contact 126. A sensing circuit thereupon makes from ground (Fig. 19c), via now engaged contacts 126 and 110c, the left side of contacts A8b, and via contacts A12ad, to the control grid of tube V9. Consequently, relays A1, A2, A3, and A4 are deenergized. Contacts A2bu (Fig. 19e) return to normal, allowing clearing relay A10 to be energized momentarily and condenser C11 to be charged. Contacts A10bd open to clear the previous reading. Since contacts A12bu (Fig. 19c) are open, relay A5 is not energized and a new reading is not taken. Further, condenser C9 (Fig. 19d) remains in charged status. The contacts A2ad have now returned to normal, completing a circuit which extends from 110 D. C. wire 304, through relays A22, A21, A20, and A8 (H), thence via now-closed contacts A12*bd* and the left side of contacts A2*ad*, to ground. Contacts A8*b* (Fig. 19*c*) shift to establish the sensing circuit via the right side of these contacts and the now-closed side of contacts A1*b*, whereby the relays A1, A2, A3, and A4 are maintained in deenergized status. Relay A22, having been energized, its contacts A22*b* (Fig. 19*e*) close and establish the positive direction circuit of the motor. The motor now drives the follower contact downwardly. Eventually, it moves down to a within-limit position, and contacts TL reclose. Relays A11 and A12 (Fig. 19*e*) thereupon are energized again. Contacts A12*au* reclose to allow the lamp bank (Fig. 19*g*) to function. Contacts A11*bu* (Fig. 19*c*) reclose, but relay A5 will not be energized because contacts A21*b* are now in shifted state while contacts A1*a* are in normal state. Hence, a new reading will not be taken, and condenser C9 (Fig. 19*d*) remains charged. It may be noted that relays A8 (H), A20, A21, and A22 now are being held energized by the stick circuit extending via contacts A8*au*, A9*b*, and A3*b*. Therefore, the motor continues running in the negative direction, and the follower contact 126 continues to descend. In other words, step I of the normal, single sensing sequence is taking place, and normal operations have been resumed.

17*b*. Considering double sensing, the follower contact 126 may rise past its upper, negative limit while step A of the Double sensing sequence is taking place. Before then, relays A1, A2, A3, and A4 were energized (step J), condenser C11 was discharged and condenser C10 (Fig. 19*e*) was charged (step K), a new reading was taken (step N), the condenser C9 (Fig. 19*d*) was charged and relays A8 (H), A20, A21, and A22 were deenergized (step P). When the follower contact now rises past its upper limit, contacts TL open and relays A11 and A12 are deenergized, with the same results as in single sensing. To restart operations, the operator increases the load to bring the controller contact 110*c* into the range of contact 126. These two contacts engage, establishing the sensing circuit via contacts A12*ad* (Fig. 19*c*), whereby relays A1, A2, A3, and A4 are deenergized. Contacts A2*bu* (Fig. 19*e*) return to normal, allowing clearing relay A10 to be energized while condenser C11 is charged. Contacts A10*bd* open, clearing the previous reading. Contacts A2*bd* return to normal, allowing condenser C10 to discharge. Contacts A2*ad* return to normal, completing the circuit of relays A8 (H), A20, A21, and A22 via contacts A12*bd* which are now closed (see Fig. 19*d*). Contacts A8*b* (Fig. 19*c*) shift to establish a sensing circuit which results in relays A1, A2, A3, and A4 remaining deenergized. Contacts A22*b* (Fig. 19*e*) close, and the motor is reversed to its positive direction. When contact 126 descends to a within-limit position, contacts TL reclose and relays A11 and A12 are re-energized. Contacts A12*au* (Fig. 19*g*) reclose to allow the lamp bank to function. The relays A8 (H), A20, A21, and A22 (Fig. 19) are now held in energized status by the stick circuit extending via contacts A8*au*, A9*b*, and A16*bu*. Condenser C9 remains charged since a new reading is not taken for the same reasons as in single sensing (see paragraph 15*a*). The contact 126 continues to descend and eventually separates from contact 110*c*. Thereupon, the sensing circuit is broken, and relays A1, A2, A3, and A4 are again energized. The same stage of operations has now been reached as in step J of the Double sensing sequence and normal operations follow.

18. Assume the load has increased beyond the range of the follower. The follower contact will move down past its lower limit position without disengaging contact 110*c*. The contacts DL (Fig. 1) will open, deenergizing relay A13 (Fig. 19*e*). Contacts A13*au* (Fig. 19*g*) open, preventing the lamp bank from lighting, whereby the operator is notified that the range of the follower and register have been exceeded. Contacts A13*ad* (Fig. 19*e*) open, breaking the positive direction motor circuit, and the motor stops. The relays A8 (H), A20, A21, and A22 (Fig. 19*d*) are in energized status since the motor has been running in positive direction, driving the follower contact downwardly past its lower limit position. Before the motor can be reversed, the circuit of relays A8 (H), A20, A21, and A22 must be broken. The operator first decreases the load to bring it within the range of the follower. This results in contact 110*c* being separated from contact 126. The sensing circuit is thereby broken, and relays A1, A2, A3, and A4 are energized. For single sensing, it would suffice that relay contacts A3*b* open upon energization of relay A3 and break the circuit of relays A8 (H), A20, A21, and A22, whereupon the negative direction motor circuit is established. For double sensing, the relay contacts A9*b* must open to break the circuit of relays A8 (H), A20, A21, and A22. When relay A2 is energized, it shifts its contacts A2*ad* (Fig. 19*d*, lower right corner). Contacts A13*bd* have reclosed since limit relay A13 has been deenergized. A circuit makes from wire 304 through coil H of relay A8, contacts A13*bd* and the shifted side of contacts A2*ad*, to ground. Contacts A9*b* now open, deenergizing the relays A8 (H), A20, A21, and A22, allowing the negative direction motor circuit to be established.

7D. *High speed operation*

19. If the load remains steady or changes gradually, the motor reversals occur at short intervals, so that the motor runs only a short time in either direction. If the load change is so great that the motor runs longer than usual in the same direction, its speed accelerates until governor contacts M*g* (Fig. 19*e*) open. Relays A14 and A15 are deenergized (note paragraph 1). Contacts A15*ad* reclose, shunting out a portion of motor resistor 309, causing the motor to run at still higher speed. This situation may arise as a result of an increase or decrease in load. Upon a larger decrease in load than that allowing for normal speed of the follower, contact 126 is required to ascend a greater distance than the normal hunting distance in order to meet contact 110*c*. The motor will then run at accelerating speed, and then at still higher speed, until contact 126 overtakes contact 110*c*. The sensing circuit thereupon makes, deenergizing relays A1, A2, A3, and A4. With the motor running in negative direction, the relays A8, A20, A21, and A22 are in deenergized status. Hence, upon deenergization of relay A3, a circuit makes through a relay A7 (Fig. 19*d*). This circuit is from wire 304, through relay A7, normally closed sides of contacts A21*a* and A3*a* and now-closed contacts A14*bd*, to ground. Contacts A7*a* close, providing a stick circuit extending via contacts A14*bd*. For reasons which will be explained in paragraph 21, the relay A5 will not be energized during high speed operations. Hence, condenser C9 (Fig. 19*d*) will remain charged and the circuit of coil P (A8) will be unable to make therethrough when the contacts A4a return to normal upon the making of the sensing circuit. Instead, coil P (A9) now is energized by a circuit extending from wire 304 through this coil, the normal side of contacts A4a, now shifted contacts A7b and a suitable resistor, to ground. Relays A8 (H), A20, A21, and A22 now are energized. The motor reverses, and governor contacts Mg reclose. Thereupon, relays A14 and A15 are energized again. Contacts A14bd open, breaking the stick circuit of relay A7. Normal speed operation now resumes.

20. When the load increases to a greater extent than that allowing for normal speed operations, the contacts 126 must descend longer than usual to withdraw from contact 110c. The motor will then run in positive direction at accelerating speed and then at still higher speed until contact 126 separates from contact 110c. Since the motor is running in positive direction, relays A8 (H), A20, A21, and A22 are in energized status. When the contact 126 separates from contact 110c, the sensing circuit breaks, whereby relays A1, A2, A3, and A4 are energized. It may be noted that during high speed operation, contacts A15bd (Fig. 19c) are in closed status. With relay A20 energized, its contacts A20a are closed. With contacts A20a and A15bd both closed, a condenser C20 is connected between a portion of the resistor 312 and the −45 D. C. line 300. The purpose of this condenser circuit is to prevent a momentary increase in impedance of the tube V9 from driving the tubes V7 and V8 to conductive condition. Such momentary increase in impedance of V9 may occur when, during high speed descent of the contact 126 it momentarily separates from the contact 110c. Upon the resulting momentary increase in impedance of the tube V9, it tends to increase the potential of the control grids of tubes V7 and V8, but such increase is delayed by the condenser C20. Only when the contact 126 separates and stays separated from contact 110c during high speed descent of the contact 126 does the increase in impedance of tube V9 effectively bring the tubes V7 and V8 to conductive status, allowing relays A1, A2, A3, and A4 to be energized. A circuit then makes through relay A7 from wire 304, through the relay, the shifted sides of contacts A21a and A3a and contacts A14bd, to ground. The stick circuit of relay A7 is established via its contacts A7a and contacts A14bd. For single sensing, it would be sufficient that relay A3 upon its energization open contacts A3b to break the circuit of relays A8 (H), A20, A21, and A22. But for considerations of double sensing, the circuit of these relays is broken by energization of coil P (A9) to open contacts A9b. The circuit of coil P (A9) will be established from wire 304, through this coil, the shifted side of contacts A4a, the shifted side of contacts A7b, and the connected resistor, to ground. Coil P (A9) will open contacts A9b, breaking the circuit of relays A8 (H), A20, A21, and A22. The motor thereupon will stop running in positive direction and will reverse to its negative direction. The governor contacts will reclose, and relays A14 and A15 will again be energized. Contacts A14bd open, and relay A7 is deenergized. Normal speed operation then resumes.

21. During high speed operation, relay A5 (Fig. 19c) is continually deenergized owing to the reopening of contacts A14au. Contacts A15bu (Fig. 19d) re-open and prevent a reading being taken in the units order. If such units order reading were taken at high speed, it would be of no value since it would change too rapidly to be readable on the indicating lamp bank. Readings in the other orders are taken under control of commutator 92 (see Fig. 4). This commutator makes one quarter of a revolution each time the units order goes through its carry position, as explained in section 2. During each quarter of a revolution of the commutator 92, one of its four contact segments passes the related brushes 93. During high speed operation, contacts A14ad are closed and the control grids of tubes V1 to V5 are brought to ground potential via the commutator 92 and contacts A14ad. Hence the coils P of the digit relays D of tens, hundreds and thousands orders, as well as the sign relays DS are selectively energized under control of the register orders. The units order digit relays are not energized because contacts A15bu are open. Nor are the hold coils of relays D and DS energized, because contacts A14bu (Fig. 19e) are open during high speed operation. In the foregoing manner, during high speed operation, readings are taken of the high orders so that the operator, by watching the lamp bank, can tell in what direction and to what general effect the gage unit is operating.

Upon the return to normal speed operation of the follower means, a normal reading will not be taken until the follower contact 126 is reversed to depart from sensing coaction with contact 110c and then again reversed to return to such sensing coaction. Thus, when the contact 126 meets the contact 110c during high speed operation, relay A1 is deenergized and at the same time relay A21 is energized. Hence, upon return to normal speed operation, in consequence of which contacts A14au (Fig. 19c) reclose, energization of relay A5 cannot occur because the contacts A1a and A21b in the control grid circuit of tube V10 are in reverse conditions. Accordingly, the contact 126 must first move down out of engagement with the contact 110c and then move up again to reengage the contact 110c before relay A5 may be energized. Hence, the first sensing operation following the return of the gage unit to normal speed operation will not produce a reading. For similar considerations, the disengagement of the contact 126 from 110c and consequent termination of high speed operation will not result in energization of relay A5 during double sensing operation.

7E. *Circuits for gage unit B*

Fig. 19f shows circuits peculiar to gage unit B which includes an angular motion follower. Circuits which are similar for gage units A and B are not repeated in Fig. 19f, except for the circuit of relay B19.

To place unit B in operation, the operator closes switch BS, whereby relay B19 is energized. In addition to the contacts of relay B19 performing the functions described for gage unit A, contacts *e* and *m* close the circuit of a control relay BR3. This circuit extends from ground via contact *e* of relay B19, through relay BR3, and then via contacts *m* of relay B19, to the 110 D. C. terminal post B69. Relay BR3 closes contacts *a* to *f* which connect the course and fine receivers CR and FR to wires, in a cable 350, which lead to the course and fine transmitters (not shown). Contacts *g* of the relay BR3 connect the wire 351 to the 220 D. C. wire B305. Contacts *h* of relay BR3 connect the wire 352 to the 110 D. C. wire B304. Contacts *i* of relay BR3 connect the filaments of tubes V12 and V13, which are of the 25L6 type, to the 25 A. C. wire B301.

Contacts *f* of relay BR3 connect the wire 353 to the −45 D. C. wire B308. The sensing tube V9 of gage unit B functions in the same manner as the tube V9 of gage unit A. When a sensing circuit is established, the tube is conductive and relays B1, B2, B3, and B4 are deenergized. When the sensing circuit is not made, then tube V9 is non-conductive and relays B1 to B4 are energized. Assuming the fine follower contact 144*a* is moving in negative direction and comes into engagement with the fine receiver contact 142*a* (also see Fig. 12), a sensing circuit is established from ground wire B300 via contacts 144*a* and 142*a*, normally closed contacts BR1*a*, the left side of contacts B8*b*, and the now-closed negative direction relay contacts B23*a* to the grid of tube V9. The tube becomes conductive and relays B1 to B4 become deenergized. The previous reading is thereupon cleared, a new reading is taken, and then the motor is reversed in the same manner as explained for gage unit A.

If the course receiver contact 148*a* moves about 5 degrees in negative direction with respect to the course follower, it engages contact 150*a*, as explained in previous section 4. Thereupon, a circuit is established from ground to the control grid of tube V13, whereby tube V13 is rendered conductive. The circuit to the control grid of tube V13 extends from ground, via contacts 148*a* and 150*a*, thence via normally closed relay contacts BR2*b* and grid resistor 354, to the control grid. With tube V13 rendered conductive, it allows coil P of duo-wound relay BR1 to be energized. Coil P opens contacts BR1*a* in the sensing circuit previously traced. The tube V9, therefore, will be maintained in non-conductive status and relays B1 to B4 in energized status regardless of the relationship between contacts 142*a* and 144*a* of the fine receiver and fine follower. The motor M will then continue to turn both the course and fine followers in negative direction until the contact 150*a* separates from contact 148*a*. The course follower is then within about five degrees of the new position assumed by the course receiver. When contact 150*a* separates from contact 148*a*, tube V13 again is rendered non-conductive, relay BR1 is deenergized, and contacts BR1*a* reopen. The further negative directional movement of both followers is then again under control of the fine follower contact 144*a* and the fine receiver contact 142*a*. The sensing circuit will be established upon engagement of the latter two contacts, the previous reading will be cleared and a new reading taken, after which the motor M will reverse to the positive direction. In the foregoing manner, when the negative directional displacement of the body on test is such as to cause negative directional displacement of the course receiver through about 5 degrees, the course follower means supersedes the fine follower means in controlling the follow-up action of the two followers, until the course follower is again within 5 degrees of the position of the course receiver.

If the course receiver moves about 5 degrees in positive direction with respect to the course follower, contact 148*a* engages contact 151*a*. This brings the control grid of tube V12 to ground potential via a circuit path through contacts 148*a* and 151*a* and grid resistor 355. Tube V12 becomes conductive, allowing coil P of a relay BR2 to be energized. When the course receiver is moved in the positive direction through about 5 degrees, the fine receiver contact 142*a* is in maintained engagement with contact 144*a*. However, the relay BR2 closes contacts BR2*a*, shunting out and superseding contacts 142*a* and 144*a*, for establishing a sensing circuit which extends also via contacts BR1*a*, the right side of now-shifted contacts B8*b*, and the now-closed contacts B1*b* to the control grid of tube V9. This sensing circuit will remain in effect until contact 151*a* separates from contact 148*a*, which occurs when contact 151*a* is within about 5 degrees of the new position of contact 148*a*. The contacts 142*a* and 144*a* will then take over control of the further positive movement of both followers.

If the switch BS is opened, relays B19 and BR3 will be deenergized. Contacts *a* to *f* of relay BR3 will reopen and the electrical coupling between the receiver and transmitter motors will be broken. While the coupling between the receiver and transmitter motors is broken, the transmitters might possibly be moved 180 degrees to unstable equilibrium positions with respect to the receivers or the transmitters might be moved through a revolution to stable equilibrium but not value matching positions with respect to the receivers. Under either of these conditions, before power is reapplied to the receiver motors, the operator will move switch BRS into engagement with either terminal NT or PT. If the transmitters have been displaced relative to the receivers in the positive direction, then switch BRS will be moved to terminal PT. Accordingly, upon resumption of operation of gage unit B, relay BR2 will be energized. Contacts BR2*a* will close and the sensing circuit will be established to cause the follower shafts 135 and 136 (Fig. 11) to move in positive direction. The stops 143*a* and 149*a* engage brackets 141*a* and 147*a* to force the receivers to move in the positive direction with the followers. The receivers may thereby be moved back toward matching value relation with the transmitters. The contact BR2*b* is in series with the contact 150*a* in order that the above described control by coil H of relay BR2 should be effective even if contact 150*a* be engaged with contact 148*a* while the course receiver is being returned in the positive direction to matched value relation. When the receivers approach matched value relation to the transmitters, switch BRS is returned to neutral position. The receivers return the rest of the way to matching value positions under the influence of the normal, automatic controls.

If, while gage unit B is out of operation, the course transmitter has been moved in the negative direction either 180 degrees or 360 degrees, the switch BRS will be shifted to the terminal NT before unit B is again put in operation. Accordingly, upon unit B being put back into operation, coil H of relay BR1 will be energized. Contacts BR1*a* will open and prevent a sensing circuit from being established. Accordingly, the followers will move in the negative direction, and the engagement of stops 143*a* and 149*a* with brackets 141*a* and 147*a* forces the receiver to return in the negative direction toward matched value relation to the transmitters. It may be understood that the engagement of contact 151*a* with contact 148*a*, during this operation will cause coil P of relay BR2 to be energized. Contacts BR2*a* will close but the sensing circuit will nevertheless be opened since contacts BR1*a* will be held open by coil H of relay BR1. When matched value relation is approached, the switch BRS is returned to neutral position. The regular controls then take over and cause the receivers to move to matched value positions.

*Circuits for the recording unit*

The recording unit previously described in section 5 and shown in Figs. 15, 16 and 17 is used to punch record cards T (see Fig. 18) with coded designations of readings of the gage units. The circuits of the recording unit per se are shown in Figs. 19*a* and 19*b*. Controls for the recording unit are in the gage units and the control circuits are shown in Figs. 19*c*, *d*, *e*, and *h*. Fig. 19*h* shows a network of recording control contacts of the digit, the negative sign, and low range relays of gage unit A. Similar contact networks are provided in the other gage units, such as unit B except that for some of them, as for unit B, low range relays are not needed. The recording control contacts of the digit and sign relays, and of the low range relay when present, of each gage unit are connected by wires in a cable to terminals of the recording unit.

The readings of a plurality of the gage units will be recorded in a single recording cycle in separate fields of a record card T. A card T is shown in Fig. 18 with two fields A and B, respectively containing chosen columns 32 to 36 and 40 to 43. Card fields A are to receive records of gage unit A and fields B are to receive records of gage unit B. The columns of each field, from left to right, are in descending denominational order relation. Thus, in field A, columns 32, 33, 34, and 35 are the thousands, hundreds, tens, and units fields. When unit A is operating in low range, the readings have $1/10$ the value they have when the unit is in high range. Accordingly, if unit A is in low range, the readings will be recorded in columns 33 to 36 of field A. For unit B, there is assumed to be a single range; hence, readings of unit B are recorded only in chosen columns 40 to 43 of card fields B. Values are designated according to the Hollerith code, where perforations in index positions 0 to 9 respectively designate digits 0 to 9 and where only one digit perforation is made in each column. If a reading of a gage unit is positive, then no classifying perforation is made in the related field. If the reading is negative, a classifying perforation is made in the 11 index position of a chosen column, which is column 32, for example, in field A. Before setting the apparatus, including the gage and recording units in operation, the recording unit is plugged in accordance with the chosen fields assigned to the gage units. Referring to Fig. 19*b*, the plugging is between sockets AP and PP for gage unit A and between BP and PP for gage unit B. The sockets PP are wired to the punch magnets PM. For the sake of simplicity in illustration, only a few of sockets PP and magnets PM are shown. The magnets PM and sockets PP are numbered in accordance with the card columns to which they pertain. Sockets AP2 to 6 are wired via contacts *a* of a relay R113 to terminals T108 to 111 which connect via wires 378 in a cable A379 (also see Fig. 19*h*) to terminals A58 to A61 of gage unit A. Terminals A58 to A61 are wired to orders of digit relay contacts *au* of unit A. When unit A is in high range, contacts *a* of relay R113 are in normal status (Fig. 19*b*) and the orders of digit relay contacts *au* are connected to sockets AP2 to 5. When unit A is in low range, the contacts *a* of relay R113 are in shifted status, connecting the digit relay contacts *au* to plug sockets AP3 to 6. Sockets AP3 to 6 are plugged to sockets PP33 to 36, so that if the unit A is in low range, values will be punched in columns 33 to 36 of field A. Socket AP2 is indirectly plugged to socket PP32 through a so-called column split. This is because, when unit A is in high range, column 32 is intended to receive a value designation 0 to 9 and also, if the reading is negative, a negative sign designation 11. The column split separates the circuit for punching a value designation from the circuit for punching the sign designation. The column split comprises sockets CS1, 2, and 3. Socket CS3 is plugged to socket PP32, socket CS1 is plugged to socket AP1, and socket CS2 is plugged to socket AP2. Socket CS1 is connected via contacts R11*b* in shifted status to socket CS3 and thereby to socket PP32 while socket CS2 is connected via contacts R11*b* in normal status to socket CS3 and thereby to socket PP32. The contacts R11*b* are in shifted status during the 11 punching time of a cycle and are in normal status during the 0 to 9 punching time of the cycle. Thus, if the unit A is in high range, the thousands order of *au* contacts of the digit relays are connected during the 0 to 9 punching time with socket PP32. During the 11 punching time, socket PP32 is connected to socket AP1. Socket AP1 is wired to terminal T107 which is connected by a wire 387 in cable A379 to terminal A57 (Fig. 19*h*) of gage unit A. The terminal A57 is connected via the parallel zero digit relay contacts *ac* of the four orders to the contacts *au* of negative sign relay DS(−). Hence, if there is a negative reading, an 11 perforation will be made in column 32, in a manner described later.

Similar plugging is provided between sockets BP1 to 5 relating to gage unit B and sockets PP40 to 43. Since unit B is assumed to have a single range, the sockets BP2 to 5 are wired directly to terminals T114 to 117 which lead via wires in a cable B379 to terminals B57 to 61 of gage unit B diagrammatically indicated by the dotted line box in Fig. 19*h*. Sockets BP1 and 2 are wired via a column split, including relay contacts R11*c*, to socket PP40, because column 40 may be punched with a negative sign designation 11 as well as a digit designation 0 to 9.

Referring to Fig. 19*a*, the recorder unit is prepared for operation by closing hand switches 358, 359, and 361. Switch 361 connects an A. C. supply to lines 362 and 363 to bring into operation a motor-generator M-G. The generator supplies 40 v. D. C. power to lines 365 and 366, line 365 being grounded. Switch 358, when closed, allows a relay R22 to be energized, while closure of switch 359 allows a relay RX to be energized.

With a stack of cards in supply hopper 210 (Fig. 16), contacts PHC are closed, whereby the circuit of a relay R3 is made.

The first card is fed from the hopper to the line of punches 225 (Fig. 16) during a first cycle initiated by depressing the start key ST, closing contacts ST*a*. A circuit is established from line 365, via safety contacts KO and DY to a wire 370, thence via stop key contacts SK and start key contacts ST*a*, through relay contacts R1*m* and through start relay R10, to line 366. Relay contacts R10*ad* close to provide a stick circuit for relay R10 by way of cam contacts P5 (see Fig. 20 for timing of P5).

Relay R10 also closes contacts R10*bd*, and a circuit is thereby established through parallel relays HD and R9. Contacts R9*a* provide a stick circuit for relays HD and R9 by way of cam contacts CR (also see Fig. 15).

Relay HD closes switch HD1 to bring the motor DM into operation.

Relay R10 also has closed the contacts R10*bu* so that the circuit of punch clutch magnet PCM (also see Fig. 15) is completed by way of cam contacts P1 which open shortly after the start of the cycle.

With the motor DM and clutch magnet PCM in operation, the recorder unit performs a card cycle. In this cycle, the first card feeds from the supply hopper to a position where its leading edge is just about at the line of punches. On its way, the first card acts on card lever 222 to close card lever contacts DCL, whereby a relay R1 (Fig. 19*a*) is energized. As long as a card is in position to pass through the punches, relay R1 will remain energized. The contacts R1*m* will open to render the start circuit via contacts ST*a* ineffective. Hence, maintained depression of the start key will have no effect. In short, after the first card has been fed to the punching position, the start key circuit is no longer effective. The contacts RX*ad* are open since relay RX has been energized. If the start key circuit is to be rendered effective even though relay R1 is energized, then switch 359 is opened, whereby relay RX will be deenergized. Contacts RX*ad* will be deenergized. Contacts RX*ad* will reclose and provide a shunt around contacts R1*m*.

The contacts RX*au* are opened to prevent a second stick circuit for start relay R10 from being established by way of contacts R10*au*, shifted contacts R22*a*, contacts R2*b*, R1*au*, R3*a*, etc.

Cam contacts P5 open towards the close of the cycle to break the stick circuit of relay R10. Contacts R10*bu* thereupon open to prevent the clutch magnet PCM from being re-energized. Contacts R10*bd* open to break the pick up circuit of relays HD and R9. Cam contacts CR then open and break the stick circuit of these relays. With relay HD deenergized, the switch HD1 opens, whereby motor DM stops. Just before the end of the cycle, cam contacts P3 close and a circuit is established via contacts P3 and R1*b* through pick up coil P of a duo-wound relay R2. Contacts R2*a* close and coil H of relay R2 is energized via these contacts and cam contacts P4 which do not open until after the 9 punching time of a following cycle. Relay R2 is thus energized each card cycle as long as cards are feeding to the punching station and maintaining card lever contacts DCL closed and relay R1 energized.

A first card cycle has been performed in the foregoing manner, bringing a card to a position for being punched in the next cycle. The next and following cycles will be started under control of the gage units and the card will be punched during these cycles with designations codally representing the readings in the gage units.

Assuming gage units A and B are both in operation, their relays A19 and B19 are in energized status. To initiate a recording cycle, the operator depresses a recording key RK (Fig. 19*c*), closing contacts RK*a*. A circuit thereby is completed from ground, via contacts RK*a*, to terminal T156, thence to terminal A74, high speed relay contacts A15*au* (closed if the unit A is operating at normal speed), thence via limit relay contacts A13*bu* and A11*a* (both of which are closed if the gage unit is operating within limits) to terminal A73, thence to terminal B74, and via contacts B15*au*, B13*bu* and B11*a* of gage unit B, to terminal B73, thence to wire 364 (also see Fig. 19*b*), terminal T155, now-closed relay contacts R1*bu* and R3*b*, and through a relay R101, to circuit line 366. Contacts R101*a* close, establishing a stick circuit for relay R101 which extends via normally closed contacts R106*bu*. It should be noted that the circuit of relay R101 may be established upon closure of key contacts RK*a* if at least one of the gage units has been placed in operation. Thus, if unit A has been placed in operation but not unit B, then the circuit would extend from terminal A73 to terminal B74 and thence via normally closed B19*a* contacts to terminal B73. Similarly, if unit A were not in operation, its relay A19 would not be energized; hence contacts A19*a* would be closed, providing a shunt path from key contacts RK*a* to terminal B74. It may be noted also that if any of the gage units is in high speed or out-of-limit status, the circuit of relay R101 will be unable to make.

As explained in section 7A, if single sensing is being effected in a gage unit, the reading will be taken under control of only the make of a sensing circuit occurring during negative directional movement of the follower. Considering gage unit A, the relays A1 to A4 (Fig. 19*c*) will be deenergized in consequence of the make of the sensing circuit. The clearing relay A10 (Fig. 19*e*) then will be energized, after which conditioning relay A5 (Fig. 19*c*) will be energized. A reading will then be taken under control of commutator 85 (Fig. 19*d*), relay A5 will be deenergized, and then coil P of relay A8 (Fig. 19*d*) will be energized. Relays A8 (H), A20, A21, and A22 are then energized, and the motor M reverses. For a short time, until the follower contact 126 is moved down out of engagement with contact 110*c* (Fig. 19*c*), the relay A4 is in deenergized status while relay A20 is in energized and relay A5 is in deenergized status. At this point, after a reading has been taken under normal conditions during single sensing, the requirements have been met for energizing a relay A17 (Fig. 19*e*), after depression of the recording key RK.

If the gage unit is in double sensing operation, the readings will be taken both upon make and break of the sensing circuit, as explained in section 7B. The requirements for energizing relay A17 are normally satisfied after a reading has been taken under control of the make of the sensing circuit in the same way as in single sensing. Upon the break of the sensing circuit, the previous reading will be cleared, relay A5 will be energized, a reading will be taken, relay A5 will be deenergized, and then coil P of relay A9 (Fig. 19*d*) will be energized. At this point, relay A4 is in energized status, relay A5 is in deenergized status, coil P of relay A9 is in energized status and requirements for energizing relay A17, after a reading has been taken as a result of break of the sensing circuit, have been satisfied.

When the requirements for energizing relay A17 have been met, the energization of recording control relay R101 is effective, by closing contacts R101*au*, to complete the circuit of relay A17. The circuit extends from ground via contacts R101*au* (Fig. 19*e*), to terminal A75, thence via contacts A5*ad*, contacts A18*bd*, A24*bd*, A4*b*, A9*au* or A20*au*, and through relay A17 to 110 D. C. wire 304. Relay contacts A17*au* provide a stick circuit for the relay by way of contacts R106*b*.

Contacts A17*bu* close and the coil P of a relay A18 is energized. The hold coil H of relay A18 is then energized via contacts A18*au* and A10*ad*.

Contacts A17*a* close to shunt out the clearing relay contacts A10*bd* and the high speed relay contacts A14*bu*. The reading last taken will thus be "locked in" until relay A17 is deenergized which will not occur until the reading has been recorded.

In a similar manner, a relay B17 of gage unit B will be energized when requirements for recording a reading in this unit have been met. When all the gage units in operation have had their respective relays similar to relay A17 of gage unit A energized, then the following circuit is established:

*Relay R23 circuit.*—From ground (Fig. 19 ), via contacts A19*d* to terminal A79 or via contacts B19*d* to terminal B79 and thence to terminal A79; thence to terminal A78, and via contacts A17*b* to terminal A77; thence to terminal B78 and through B17*b* to terminal B77; thence to wire 371 (turn to Fig. 19*b*), to terminal T159, and through a relay R23 to the line 366.

It may be noted that when gage unit B is in operation, its contacts B19*b* (Fig. 19*c*) are open. Hence, the above circuit must pass through contacts B17*b* which will be closed only if a reading in gage unit B is ready to be recorded. But if gage unit B is not in operation, contacts B19*b* remain closed and the circuit for relay R23 passes through these contacts. Similarly, if gage unit A is in operation, the above circuit must pass via contacts A17*b*, but if the gage unit A is not in operation, the circuit will be routed via contacts B19*d* and A19*b*. If none of the gage units is in operation, the circuit of relay R23 will not be made because all the relay 19*d* contacts connecting the post A79 to ground will remain open. Thus, if both gage units A and B are not in operation, then both contacts A19*d* and B19*d* are open and the circuit of relay R23 cannot make.

The relay R23 (Fig. 19*b*) will cause the recording unit to go through a card cycle during which the card will be punched with codal representations of the readings locked in the gage unit. The hunting operation of the gage units will not be interrupted during recording operation. Thus, the positions of the variable-responsive elements of the gage units may be changed while recording is taking place and the gage followers will hunt for these new positions and be ready to control the digit and sign relays to flash the new readings as soon as the recording operation is over. The hunting operation requires the operation of relay A5. Since, during the recording period, the last reading has been "locked in," a contact *bd* in each of the five rows of digit and sign relay contacts (Fig. 19*c*) is open, so that relay A5 cannot be energized by the regular circuit. The relay A18 has been energized under control of relay A17, as previously described. Hence, the circuit of relay A5 can now make by way of contacts A18*bu* which shunt the *bd* contacts of the digit and sign relays. Normally, the relay A5 is deenergized when a proper reading has been taken and a contact *bd* in each of the five rows of these contacts of the digit and sign relays has been opened. But since the relay A5 is now being energized under control of relay contacts A18*bu*, the circuit of the relay cannot be broken in the normal manner. Instead, the circuit will be broken by the opening of contacts A6*ad*.

Assume a reading has been "locked in" for recording, and the sensing circuit thereafter makes again, whereby relays A1 to A4 (Fig. 19*c*) are deenergized. Clearing relay A10 (Fig. 19*e*) is energized as a result, in the manner described in section 7. The previous reading, however, is not cleared since it is being held by now-closed contacts A17*a*. The control grid of tube V10 (Fig. 19*c*) is raised to triggering potential in the usual way via the commutator 86. The relay A5 is now energized via contacts A12*bu*, A6*ad*, A14*au*, A18*bu*, and via tube V10. Contacts A5*au* (Fig. 19*d*) close but a new reading is not taken under control of commutator 85 because contacts A18*ad* have now been shifted. Instead, a circuit makes from ground, via commutator 85, contacts A5*au*, the lower side of contacts A18*ad* to a wire 374 (also see Fig. 19*c*), thence to the control grid of a tube V6. The tube V6 becomes conductive, allowing coil P of relay A6 to be energized. Contacts A6*au* (Fig. 19*e*) close, and coil H of relay A6 is energized via contacts A6*au* and A10*ad*. Contacts A6*ad* (Fig. 19*c*) open, breaking the circuit of relay A5. Hunting operation, therefore, continues and the next time the position of the variable-responsive means is sensed, the clearing relay A10 is again energized. Contacts A10*ad* open, whereby the coil H of relay A6 is deenergized. Relay A5 may now be energized again by the circuit via A6*ad* and A18*bu*.

In the foregoing manner, hunting continues without interruption during recording operation but new readings are not set up.

In a manner explained later, the relay R106 (Fig. 19*b*) will be energized towards the end of the recording cycle. Contacts R106*b* (Fig. 19*e*) will open, breaking the stick circuit of relay A17. Contacts A17*bu* open, breaking the circuit of coil P (A18). The pick up circuit of the relay A17 will not be able to make again, even though the recording key RK (Fig. 19*c*) is held down, until the coil H of relay A18 (Fig. 19*e*) is first deenergized to allow contacts A18*bd* to reclose. Coil H of relay A18 will remain energized until clearing relay A10 has been energized to open contacts A10*ad*. Since contacts A17*a* will have reopened, the reading which has been recorded also will be cleared then upon energization of relay A10. In the foregoing manner, even though the recording key may be kept down, only one recording cycle will take place for each "locked in" reading. In other words, a single reading (setting of the digit and sign relays) will control only a single recording operation.

The depression of the recording key RK (Fig. 19*c*) has no effect during high speed operation of any of the gage units since the contacts A15*au* or B15*au* (Fig. 19*c*) will be open. It will be understood from section 7D that when a gage unit is in high speed operation, the coils P of the sign relays and of the digit relays of the tens, hundreds, and thousands order, but not of the units order, are being continually operated under control of commutator 92 (Fig. 19*d*). The hold coils H of these relays are not being energized because, considering gage unit A, the high speed relay contacts A14*bu* (Fig. 19*e*) remain open. However, as soon as normal speed operation is resumed, contacts A14*bu* reclose and it is possible for the last high speed reading to be held because the coils P of the digit and sign relays may be in a state of energization just at the time the high speed operation stops. This reading is not a desirable one for recording because it was determined during high speed operation and is merely approximate, if for no other reason than because it is blank in the units order. Should the operator be holding the recording key down continuously during high speed operation, then as soon as normal speed operation is resumed, the relay R101 (Fig. 19*b*) will be energized. The contacts R101*au* (Fig. 19*e*) will close, and if relay A17 could be energized now, the last reading determined during high speed operation may be "locked in" by contacts A17*a*. To prevent this, means are provided to delay energization of relay A17 until after there has been a clearing operation following high speed operation. For this purpose, a relay A24 has a pick up coil P (Fig. 19d) in series with contacts A14bd which stay closed during high speed operation. Coil P of relay A24 will thereby be energized during high speed operation. It will close contacts A24au, whereby the coil H of relay A24 will be energized via contacts A24au and normally closed relay contacts A5bu. Relay A24 opens contacts A24bd in the pick up circuit of relay A17 (Fig. 19c). When the high speed operation ends, coil P(A24) is deenergized but coil H(A24) remains energized until relay A5 is energized and opens contacts A5bu. This cannot occur until normal speed operation resumes and a sensing operation has occurred to cause energization of clearing relay A10 after which relay A5 may be energized. Contacts A10bd open and the last high speed reading, if present, is cleared. Coil H(A24) will then be deenergized, in consequence of energization of relay A5 to open contacts A5bu, and contacts A24bd in the circuit of relay A17 will reclose. Thus, relay A17 will not be energized, even if the recording key is held down continuously, until after high speed operation has been ended and an entirely new reading taken at normal speed operation.

When relays A17 of all the gage units have been operated, then the relay R23 (Fig. 19b) is energized by the circuit previously traced.

Cam contacts P16 (Fig. 19b) are initially closed and upon closure of relay contacts R23bu, the following circuit closes if gage unit A is set in low range: Line 365, contacts P16, R8ad, RXbu, R23bu, wire 375, terminal T90, wire 376—11 in cable 377 (also see Fig. 19h), then in cable branch A377, to terminal A46, thence via contacts au of low range relay AL to terminal A62, thence via wire 385 in cable A379 (see Fig. 19b also), to terminal T112, thence by wire 386 (also see Fig. 19a) through pick up coil P of duo wound relay R113, to line 366. Contacts b of relay R113 close and the hold coil H of relay R113 is energized via these contacts, RXbd (now closed), and cam contacts P4. Relay R113 shifts the group of R113a contacts (Fig. 19b), whereby the amount read out of gage unit A will be punched, subsequently during the cycle, in columns 33 to 36 of field A of the card (Fig. 18).

Energized relay R23 has closed the contacts R23bd (Fig. 19a) and a circuit for start relay R10 is established via contacts R23bd, R8b, R1au, R3a, PSS, SK, DY, and KO. Relay R10 closes contacts R10bd, establishing the circuit of relays R9 and HD. Switch HD1 (Fig. 19a) closes and starts motor DM in operation. Contacts R10bu close and clutch magnet PCM is energized, whereby a second card cycle takes place. Upon closure of contacts R9b, which occurs after contacts R23ad have closed, a circuit is established through a relay R8 (Fig. 19a). Relay R8 holds via its stick contacts R8a and the contacts R23ad. Contacts R8b open and break the start relay R10 circuit previously established by closure of contacts R23bd. Relay R10 now holds only via its contacts ad and cam contacts P5. Contacts R8ad (Fig. 19b) open, breaking the pick up circuit of column shift relay coil P(R113), previously traced.

During the second card cycle, the first card feeds through the punching station, presenting its index rows 12, 11, 0, 1 . . . 9 successively to the punching line. In step with the feed of the index rows 12, 11, 0, 1 . . . 9 to the punching line, the brush of emitter SP (Fig. 19b) wipes the contact spots 12, 11, 0, 1 . . . 9 of the emitter. During this period, cam contacts P12 close, establishing the circuit of relays R43 to R56. These relays close their a contacts which connect the punch magnets PM to line 366.

Relay R11 (Fig. 19b) is in energized status until cam contacts P2 open after the 11 punching time of the cycle and before the 0 punching time. Hence, relay contacts R11b and R11c, of the two column splits shown, are in shifted status during the 11 punching time, thereby associating plug sockets AP1 and BP1 with sockets PP32 and 40, respectively. Before the 0 punching time, the cam contacts P2 open, relay R11 is deenergized, and the contacts R11b and c return to normal, thereby associating sockets AP2 and BP2 with sockets PP32 and 40 during the 0 to 9 punching period.

At the 11 punching time of the cycle, if the negative sign relay DS has been energized, a circuit will be completed for causing punching of the 11 perforation in a chosen column of the card. The circuit will extend from line 365 (Fig. 19b) via circuit breakers CB, thence via contacts R2c, R23c, the brush and the 11 spot of emitter SP, to terminal T90, wire 376, in cable 377 (see also Fig. 19h), in cable branch A377, to terminal A46, thence via contacts au of the minus sign relay DS, thence via any one of the ac contacts of the orders of digit relays DO, to terminal A57, thence via wire 387, in cable A379, to terminal T107 (Fig. 19b), thence to socket AP1, plug wire to socket CS1, now shifted contacts R11b, plug socket CS3, plugwire to socket PP32, punch magnet PM for column 32, one of the contacts a of relay R43, and to line 366. Energization of this punch magnet at this time causes the 11 position of the card column 32 to be punched. It should be noted that if the reading is zero, then none of the ac contacts of the four denominationally ordered zero digit relays DO will be closed, and the above circuit will not be able to make. Hence, a negative sign designation will not be punched when the reading is zero.

The circuits for causing punching of the digit values will be clear from the tracing of a typical circuit. Assume that the reading "locked" in gage unit has a 7 in the hundreds order. A circuit is closed at the 7 punching time of the cycle as follows: Line 365 (Fig. 19b), circuit breakers CB, contacts R2c, R23c, the brush and 7 spot of emitter SP, to terminal T98, wire in cable 377 and cable branch A377 (Fig. 19h), to terminal A54, the au contacts of relay D7 of the order HD, to terminal A59, wire in cable A379 (also see Fig. 19b) to terminal T109, thence via the left side of the connected contacts a of relay R113 (if unit A is in high range) to socket AP3 or via the right side of these contacts, if the gage unit is in low range, to socket AP4, thence by plugwire from either socket AP3 or AP4 to either socket PP33 or PP34 (not shown), and thence via a punch magnet PM and a contact a of relay R43 to line 366.

Just before the 9 punching time of the cycle, the card closes card lever contacts PCL (Fig. 16) whereby relay R7 (Fig. 19a) is energized. Cam contacts P7 and SCR are both in closed status shortly after the 9 punching time of the cycle, and a circuit is established as follows (Fig. 19b): Line 365, contacts R7au, R22b, P7, SCR, RXcd, and through relay R106, to line 366.

Relay R106 opens contacts R106b (Fig. 19e), breaking the stick circuit of the relay A17 of gage unit A and of the similar relay (not shown) of gage unit B. Contacts A17b and B17b (Fig. 19c) open, breaking the circuit of relay A23. Contacts R106bu (Fig. 19b) open, breaking the stick circuit of relay R101. Upon the opening of cam contacts P7, relay R106 is deenergized.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a gage unit or the like, the combination with deflectable means positionable according to a variable, of means to sense the positions of the deflectable means, means for driving the sensing means in one direction to effect sensing coaction with the deflectable means and in the opposite direction away from sensing coaction, registering means driven by said driving means for registering an amount dependent on the position of the sensing means, means controlled by said sensing coaction for taking a reading of the amount registered by the registering means, and means automatically effective after the reading is taken for reversing the direction of movement of the sensing means by the driving means.

2. In a gage unit or the like, the combination with deflectable means positionable according to a variable, of means to sense the positions of the deflectable means, means for driving the sensing means in one direction into sensing coaction with the deflectable means and in the opposite direction away from sensing coaction, means controlled by said sensing coaction for taking a reading dependent on the position of the deflectable means, means to manifest completion of the operation of taking a reading, and means controlled by said manifesting means for automatically bringing about reversal of movement of the sensing means by the driving means.

3. In a gage unit or the like, the combination with means displaceable according to a variable, of means for sensing the positions of the displaceable means, storage means for taking a reading of the position of the displaceable means, means controlled by the sensing means upon sensing the position of the displaceable means for zeroizing the storage means, and means thereafter controlled by the sensing means for operating the storage means to take a new reading.

4. In a gage unit or the like, the combination with deflectable means positionable according to a variable, of sensing means to sense the positions of the deflectable means, means for driving the sensing means in one direction to effect sensing coaction with the deflectable means and in the opposite direction away from sensing coaction, amount storage means operable to store amounts dependent upon the positions of the deflectable means, a sensing circuit operated upon the sensing means effecting sensing coaction with the deflectable means, and means controlled by the sensing circuit for bringing about, in sequence, the clearing of the storage means, the entry therein of an amount dependent upon the currently sensed position of the deflectable means, and the reversal of movement of the sensing means by the driving means.

5. A gage unit or the like, including deflectable means positionable according to a variable, in combination with sensing means to follow the deflectable means and effect sensing coaction therewith upon reaching a position matching the position of the deflectable means, a totalizer including denominationally ordered electrical readout commutators, means for operating the sensing means to follow the deflectable means and coordinately operating the totalizer to register a total dependent on the increments of movement of the sensing means from an index position to the matching position, and means automatically brought into operation jointly by the sensing means and deflectable means upon sensing coaction for electrically reading out the total from the readout commutators.

6. A gage unit or the like having, in combination with a device deflectable in negative or positive direction from an index position, sensing means movable in corresponding negative or positive direction to sense the deflection of the device, a register movable in corresponding negative or positive directions to register positive or negative amounts dependent upon the deflections of the device, driving means for coordinately actuating the sensing means and the register in corresponding directions, means for automatically reading out of the register the true figures either of a positive or negative amount registered thereby and negative direction detecting means effective upon the sensing means moving in negative direction for controlling said reading out means to read out the true figures of a negative amount in the register.

7. In a gage unit or the like, the combination with a variably positionable device, of means movable in either of opposite directions to sense the device, drive means for actuating the sensing means in either direction, a value register actuated by said drive means coordinately with the sensing means, selectively conditionable means altered from one condition to a different condition under control of the sensing means upon the sensing of the device while moving in one direction and altered back to its former condition upon the sensing means, in moving in the reverse direction, sensing the device, and means controlled by the conditionable means upon each alteration in its condition for taking a reading from the register of a value dependent on the position of the device.

8. In a gage unit or the like, the combination with a device mounted for vertical displacement in response to a variable, of a rider freely supported by the device to follow it down by gravity and to be moved upwardly by rising movement of the device, whereby said rider normally assumes vertical positions corresponding to such positions of the device, a sensing member movable upwardly to engage the rider, and measuring means controlled by such engagement for producing measurements dependent on the positions of the device, said sensing member upon movement upwardly past the point of engagement lifting the rider wholly out of supporting engagement with the device, whereby, upon such movement of the sensing member past the point of engagement, mutual reaction between the member and device is obviated.

9. In a gage unit or the like, the combination with a device linearly and vertically displaceable according to a variable, of a rider loosely guided by the device for linear, vertical movement and having a free abutting, resting engagement with the device so as to follow it down by gravity and be moved upwardly upon ascent of the device, whereby the device and rider normally occupy corresponding positions, said rider being movable upwardly relative to the device to lift it out of engagement with the device, sensing means movable upwardly to engage the rider, and measuring means controlled by such engagement to produce measurements dependent upon the positions of the device, said sensing means upon moving upwardly past the point of engagement with the rider lifting it out of engagement by the device and itself relieving the device completely of the weight of the rider.

10. In a gage unit or the like, the combination with a device vertically displaceable according to a variable, of a contact element freely supported by the device to assume positions corresponding to positions of the device, a sensing contact engageable with the contact element, a sensing circuit controlled by such engagement, and means controlled by the circuit for producing measurements dependent upon the positions of the device, said contact element and device being movable relatively to relieve the device of supporting the contact element either upon movement of the device downwardly while the contact element is engaged with the sensing contact or upon movement of the sensing contact upwardly past its point of engagement with the contact element, whereby mutual reaction between the device and sensing contact is obviated.

11. In a gage unit or the like, the combination with a device vertically and linearly displaceable according to a variable and provided with a round pin, of a rider formed with a vertical slot through which said pin passes and provided with a round element at the upper end of the slot disposed at right angles to the pin and adapted to rest freely on the pin, whereby the rider is freely supported at a single point by the device and capable of following it down by gravity and of being moved upwardly by ascent of the device, and means for producing measurements dependent upon the positions of the device including a follower member movable upwardly to engage the rider and thereby sense the position of the device, said follower member upon movement upwardly past the point of engagement lifting the rider so as to separate the round element thereof from the round pin on the device and upon movement downwardly past the point of engagement with the rider allowing the rider to drop into reengagement with the device, said round element and pin, by reason of their point engagement, assuring a predetermined position of the rider with respect to the device upon the rider reengaging the device.

12. In a gage unit or the like, the combination with a device deflectable according to a variable, of storage relays to store amounts dependent on the deflections of the device, means for sensing deflections of the device, means controlled by the sensing means upon sensing the deflection of the device for clearing the storage relays, means also controlled by the sensing means for then operating the relays to store the amount dependent on the sensed deflection, recording means controlled by the relays to record the amount stored therein, and means for suppressing the clearing operation during recording operation.

13. In a gage unit or the like, the combination with a device deflectable according to a variable, of sensing means continually hunting the device, means for representing amounts dependent on the deflection of the aforementioned device, means controlled by the sensing means to enter amounts dependent on the positions of the deflectable device into the representing means, means to zeroize the representing means, means controlled by the sensing means upon sensing the device during each hunting reciprocation for successively operating the zeroizing means and the amount entering means, whereby the representing means is intermittently zeroized and operated to represent amounts in step with the intermittent sensing of the device by the sensing means during its hunting operation, a recording unit including recording means controlled by the representing means to record the represented amount, means to initiate operation of the recording unit during which the recording means effects the recording of the amount represented by the representing means, and means controlled by the initiating means for interrupting the zeroizing operation and "locking in" the amount last entered in the representing means so that this amount will be recorded.

14. In a gage unit or the like, the combination with a device deflectable according to a variable, of sensing means for the device, means for operating the sensing means to follow the device to its position of deflection and then to reciprocate about this position until a change in deflection of the device occurs, and means controlled by the sensing means for recording an amount dependent on the sensed position of the device while the sensing means and device continue in operation, whereby upon a change in position of the device during the occurrence of recording operation, the sensing means will follow the device to its new position.

15. In a gage unit or the like, the combination with a device deflectable according to a variable, of sensing means for following the device, means for driving the sensing means alternatively at high or low speed, means controlled by the sensing means for producing multi-order value manifestations dependent on the deflections of the device, and means for suppressing low order value manifestation during high speed operation.

16. In a gage unit or the like, the combination with a device deflectable according to a variable, means for following and sensing the device, means for driving the sensing means, value manifesting means, including a value registering structure and circuits for reading out values from the registering structure, controlled by the sensing means upon sensing the device for producing a value manifestation dependent on the sensed deflection of the device, and other means for operating the manifesting means to continually produce successive value manifestations dependent on the successive positions of the sensing means.

17. In a gage unit or the like, the combination with a device deflectable according to a variable, of follower means for moving into sensing coaction with the device, means for driving the follower means, value storage means, means controlled by the follower means upon effecting sensing coaction with the device for operating the storage means to store a value dependent on the sensed deflection of the device and to retain this value until a succeeding sensing coaction is effected, and alternative means for intermittently operating the storage means to temporarily store successive values, regardless of sensing coaction, indicative of successive positions of the follower means.

18. In a gage unit or the like, a variably positionable device, sensing means for the device, means for operating the sensing means to follow the device to any position thereof within a given range, representing means controlled by the sensing means upon sensing the device for representing an amount dependent upon the sensed position of the device, means coacting with the representing means to record the represented amount, means for detecting travel of the sensing means past said range, and means thereupon controlled by the detecting means for preventing operation of the recording means.

19. In a gage unit or the like, the combination with a variably positionable device, of a follower therefor, said device and follower being movable relatively to each other into matching position, whereupon the device and follower are in sensing coaction, a sensing circuit operated under joint control of the device and follower upon their sensing coaction and including means so conditioned as to prevent operation of the sensing circuit when such sensing coaction is effected in consequence of the device moving towards the follower into matching position unless the follower also is moving towards the device, and means controlled by the sensing circuit in consequence of its operation for manifesting a value dependent on the matched position of the device.

20. In a gage unit or the like, the combination with a variably positionable device, of a follower therefor, driving means for moving the follower in one direction into sensing relation to the device and in the reverse direction out of sensing relation, electrical value manifesting agencies, circuits controlled by the follower upon reaching sensing relation to the device for operating said agencies to manifest a value dependent on the sensed position of the device, means automatically effective after the value has been manifested for reversing the movement of the follower by the driving means, and alternative means effective automatically for reversing the movement of the follower before a value has been manifested.

21. In a gage unit or the like, the combination with a variably positionable device, of sensing means for the device, means for automatically operating the sensing means to follow the device into matching and sensing position and to then reciprocate about such position, whereby the sensing means is continually hunting the follower, value manifesting means, means controlled by the sensing means upon reaching matching and sensing position for enabling the value manifesting means to manifest a value dependent on the sensed position of the device, and means for suppressing operation of said enabling means and compelling the sensing means to depart from sensing position and then return to sensing position before the enabling means may operate.

22. In a gage unit or the like, the combination with a variably positionable device having a given range of positions to be sensed, sensing means for the device, means for moving the sensing means to sense the device in any of its positions within said range, means for interrupting movement of the sensing means upon its travel beyond a limit position of said range without sensing the device, and means for automatically resuming movement of the sensing means upon the return of the device to a position within said range.

23. In a gage unit or the like, the combination with a variably deflectable device, of sensing means therefor, driving means for actuating the sensing means into sensing position with respect to the device, a counting register with denominationally ordered electrical digital value readouts driven by the driving means coordinately with the sensing means for counting the total of value increments proportional to the distance between an index position and the sensing position, a sensing circuit operated under control of the sensing means upon arriving at sensing position, a circuit closer driven coordinately with the units order of the register, a read-out conditioning relay, electrical means rendered effective by the sensing circuit for operating said relay, and readout circuits for the counter established under control of the relay, the circuit closer, and the value readouts of the counter.

24. In a gage unit or the like, the combination with a variably positionable device, of sensing means movable into sensing position with respect to the device, registering means for registering totals dependent on the position of the device, a timing means synchronized with the registering means, other timing means off-timed with respect to the first mentioned timing means, common actuating means for the sensing means, registering means, and both timing means, conditioning means operated under joint control of the second-mentioned timing means and of the sensing means upon reaching sensing position, and means under joint control of the conditioning means and the first-named timing means for coacting with the register to produce a manifestation of the total present therein.

25. In a gage unit or the like, the combination with a variably deflectable device, of sensing means therefor, driving means for driving the sensing means into sensing position with respect to the device, a plural order counting register driven by the driving means coordinately with the sensing means to count the value increments proportional to the distance between an index position of the device and the sensing position, a conditioning commutator and a read commutator driven coordinately with the units order of the register, brush means for wiping contact spots of each commutator, those of the conditioning commutator being wiped in staggered time relation to those of the read commutator, a sensing circuit operated under control of the sensing means upon arriving at sensing position, relay means operated under control of the sensing means and the conditioning commutator, and means effective under control of the relay means and the read commutator for coacting with the register to produce a manifestation of the count present therein.

26. In a gage unit or the like, the combination with a variably deflectable device, of a follower therefor, a register for registering a total of full increments of value dependent on the distance between an index position of the follower and a sensing position thereof with respect to the device, driving means for actuating the follower in a suitable direction to the sensing position and coordinately operating the register, said follower continuing to move in said direction after arriving at the sensing position and said register correspondingly continuing its operation, conditioning means operated under control of the follower in consequence of its arrival at the sensing position, and means rendered effective under control of the conditioning means for coacting with the register, when in its continued operation it registers a total of full value increments, for producing a manifestation of this total.

27. In a gage unit or the like, the combination with a variably deflectable device, of a follower therefor, driving means for actuating the follower in a suitable direction into sensing position with respect to the device, a register driven coordinately with the follower for registering a total of value increments proportional to the distance of the follower, when at its sensing position, from an index position, a sensing circuit established by coaction of the follower with the device upon the follower arriving at the sensing position, said follower continuing to move in said direction and the register continuing in operation after the sensing circuit has been established, a timing means driven coordinately with the register, and means under control of the sensing circuit and said timing means for coacting with the register when, in its continued operation it registers a total of full value increments, to produce a manifestation of said total.

28. In a gage unit or the like, the combination with a variably positionable device, of a follower therefor moved in either of opposite directions to sense a position of the device, a register movable in either of opposite directions for registering a value dependent on the sensed position of the device, reversible drive means for actuating the follower and, through a lost motion connection, coordinately operating the register, a circuit operated under control of the follower upon its sensing the position of the device while moving in either of said directions, and means brought into operation under control of the circuit and after continued movement of the follower and register in their present directions for coacting with the register to produce a manifestation of the value then registered thereby, said lost-motion connection enabling the register to remain stationary upon subsequent reversal of the drive means and the follower until the lost-motion is taken up so as to compensate for the travel of the follower past the sensing position while moving in either direction.

29. Apparatus including a plurality of gage units, each including means operable according to a variable and means controlled thereby for representing a value dependent on the variable, each gage unit being individually settable in operation and including an element conditionable selectively according to whether the gage unit is in or out of operation, each gage unit also including means operated to detect recording condition for the gage unit, a common recording unit for the plurality of gage units operable under control of the value representing means of all the gage units for recording the values represented thereby, and means to bring about recording operation and rendered effective under conjoint control of the recording condition detecting means and the conditionable elements of all the gage units when all the gage units are in recording condition or when a gage unit not in recording condition is out of operation.

30. In a gage unit or the like, the combination with a variably displaceable device, of a follower movable into engagement with said device, means for driving the follower, a sensing circuit including a circuit path closed upon the engagement of said follower with said device, and means including a shunt circuit path controlled by the sensing circuit for maintaining the sensing circuit closed upon momentary disengagement of the follower from the device and the consequent breaking of the first circuit path.

31. In a gage unit or the like, means for sensing the magnitude of a variable, value registering means controlled by the sensing means in accordance with the magnitude of the variable, readout circuits for reading out a value from the registering means and including relays and electronic tube means brought automatically into operation by the sensing means upon sensing the magnitude of the variable in series with the relays, means for initiating the reading out operation, and means controlled thereby for rendering the tube means conductive so as to allow current to flow through the readout circuits for selectively energizing the relays in accordance with the value in the registering means.

ROBERT I. ROTH.
ARTHUR H. DICKINSON.
JOHN N. WHEELER.

REFERENCES CITED

The following references are of record in the file of this patent:

UNITED STATES PATENTS

| Number | Name | Date |
|---|---|---|
| 1,091,653 | Hall | Mar. 11, 1914 |
| 1,100,748 | Laycock | June 23, 1914 |
| 1,102,234 | Bliss | July 7, 1914 |
| 1,123,067 | Barkhausen | Dec. 29, 1914 |
| 1,295,406 | Wolf | Feb. 25, 1919 |
| 1,508,796 | Kaminski | Sept. 16, 1924 |
| 1,542,850 | Curtis | June 23, 1925 |
| 1,587,122 | Harlaw | June 1, 1926 |
| 1,626,123 | Sperry | Apr. 26, 1927 |
| 1,664,265 | Rieber | Mar. 27, 1928 |
| 1,742,235 | Cooley | Jan. 7, 1930 |
| 1,835,907 | Shiland | Dec. 8, 1931 |
| 1,838,084 | Drake | Dec. 29, 1931 |
| 1,898,183 | Harrison | Feb. 21, 1933 |
| 1,914,388 | Von Pein et al. | June 20, 1933 |
| 1,925,881 | Rhea et al. | Sept. 5, 1933 |
| 1,946,924 | Allen et al. | Feb. 13, 1934 |
| 1,969,536 | Winne | Aug. 7, 1934 |
| 1,976,298 | Richter | Oct. 9, 1934 |
| 1,980,816 | McDill | Nov. 13, 1934 |
| 2,010,554 | Melas | Aug. 6, 1935 |
| 2,030,244 | Cox | Feb. 11, 1936 |
| 2,080,273 | Holmes | May 11, 1937 |
| 2,089,914 | Freeman | Aug. 10, 1937 |
| 2,091,303 | Brelsford | Aug. 31, 1937 |
| 2,113,069 | Ross et al. | Apr. 5, 1938 |
| 2,132,213 | Locke | Oct. 4, 1938 |
| 2,136,631 | Moore et al. | Nov. 15, 1938 |
| 2,146,863 | Stansbury | Feb. 14, 1939 |
| 2,150,502 | Harrison et al. | Mar. 14, 1939 |
| 2,206,853 | Poupitch | July 2, 1940 |
| 2,207,343 | Fairchild | July 9, 1940 |
| 2,207,344 | Fairchild | July 9, 1940 |
| 2,207,744 | Larson | July 16, 1940 |
| 2,209,717 | Fairchild | July 30, 1940 |
| 2,292,937 | Harrison | Aug. 11, 1942 |
| 2,347,481 | Hooven | Apr. 25, 1944 |
| 2,366,913 | Le Clair | Jan. 9, 1945 |
| 2,391,123 | Carliss | Dec. 18, 1945 |